(12) United States Patent
Kamath

(10) Patent No.: US 12,073,487 B2
(45) Date of Patent: Aug. 27, 2024

(54) WATERMARKING ARRANGEMENTS PERMITTING VECTOR GRAPHICS EDITING

(71) Applicant: Digimarc Corporation, Beaverton, OR (US)

(72) Inventor: Ajith M. Kamath, Beaverton, OR (US)

(73) Assignee: Digimarc Corporation, Beaverton, OR (US)

( * ) Notice: Subject to any disclaimer, the term of this patent is extended or adjusted under 35 U.S.C. 154(b) by 0 days.

(21) Appl. No.: 17/704,984

(22) Filed: Mar. 25, 2022

(65) Prior Publication Data

US 2022/0284535 A1  Sep. 8, 2022

Related U.S. Application Data

(63) Continuation of application No. 16/918,809, filed on Jul. 1, 2020, now Pat. No. 11,288,764.

(60) Provisional application No. 62/938,872, filed on Nov. 21, 2019, provisional application No. 62/869,509, filed on Jul. 1, 2019.

(51) Int. Cl.
*G06T 1/00* (2006.01)
*G06T 7/90* (2017.01)
*G06T 11/20* (2006.01)
*G06T 11/40* (2006.01)

(52) U.S. Cl.
CPC .............. *G06T 1/0028* (2013.01); *G06T 7/90* (2017.01); *G06T 11/203* (2013.01); *G06T 11/40* (2013.01)

(58) Field of Classification Search
None
See application file for complete search history.

(56) References Cited

U.S. PATENT DOCUMENTS

| | | | |
|---|---|---|---|
| 5,315,098 A | 5/1994 | Tow | |
| 5,486,686 A | 1/1996 | Zdybel, Jr. | |
| 5,629,770 A | 5/1997 | Brassil | |
| 5,765,176 A | 6/1998 | Bloomberg | |
| 6,076,738 A | 6/2000 | Bloomberg | |
| 6,166,716 A * | 12/2000 | Kashino | G09G 5/377 726/19 |

(Continued)

OTHER PUBLICATIONS

Excerpts, through Jan. 18, 2022, from prosecution of corresponding PCT application PCT/US2020/040540, published as WO2021/003294.

(Continued)

*Primary Examiner* — Martin Mushambo
(74) *Attorney, Agent, or Firm* — Digimarc Corporation

(57) ABSTRACT

A vector graphics file includes at least one artwork layer and at least one watermark layer. The watermark layer comprises a pattern of vector graphics primitives, each of which is filled with a color that is a tinted variant of the color of the location in the artwork that the primitive overlies. Such layered arrangement enables the watermark to be added or omitted, and varied in strength, payload and appearance, at will. Yet the artwork is left unchanged through such manipulations. In some embodiments the watermark conveys a multi-symbol Global Trade Item Number (GTIN), and the file is used to generate a label or packaging for a food or general merchandise retail item. A great number of other arrangements, features and advantages are also detailed.

26 Claims, 31 Drawing Sheets
(17 of 31 Drawing Sheet(s) Filed in Color)

(56) References Cited

U.S. PATENT DOCUMENTS

| | | |
|---|---|---|
| 6,307,949 B1 | 10/2001 | Rhoads |
| 6,449,377 B1 | 9/2002 | Rhoads |
| 6,590,996 B1* | 7/2003 | Reed ................ H04N 1/32352 348/460 |
| 6,961,442 B2* | 11/2005 | Hannigan .......... H04N 1/32144 283/113 |
| 6,993,149 B2* | 1/2006 | Brunk ................. G06T 1/0028 382/162 |
| 6,993,152 B2* | 1/2006 | Patterson .......... H04N 1/32144 704/E19.009 |
| 7,385,612 B1* | 6/2008 | Peterson ............... G06T 11/60 345/581 |
| 7,684,089 B2* | 3/2010 | Yamada ................ G03G 21/04 358/468 |
| 8,045,748 B2 | 10/2011 | Levy |
| 8,237,710 B1* | 8/2012 | Marketsmueller .... G06T 11/203 345/419 |
| 8,667,394 B1* | 3/2014 | Spencer ................ G06F 16/93 715/224 |
| 9,565,335 B2* | 2/2017 | Reed ................... G06T 1/0028 |
| 9,614,995 B1 | 4/2017 | Chapman |
| 9,661,186 B1 | 5/2017 | Chapman |
| 9,684,941 B2 | 6/2017 | Filler |
| 9,781,294 B1 | 10/2017 | Chapman |
| 10,007,964 B1* | 6/2018 | Calhoon ................ G06V 10/44 |
| 10,042,038 B1 | 8/2018 | Lord |
| 10,182,170 B1* | 1/2019 | Evans ................ G06K 7/10722 |
| 10,192,222 B2* | 1/2019 | Witkin ................. G06Q 30/00 |
| 10,198,782 B1* | 2/2019 | Bradley ................ G06T 1/0064 |
| 10,565,669 B2 | 2/2020 | Filler |
| 10,930,019 B2 | 2/2021 | Schultz |
| 11,288,764 B2 | 3/2022 | Kamath |
| 2001/0017705 A1* | 8/2001 | Hashizume ............ G06K 15/00 358/1.9 |
| 2001/0054150 A1* | 12/2001 | Levy ........................ G06F 21/10 713/176 |
| 2001/0055408 A1* | 12/2001 | Reefman ................ H04H 60/37 |
| 2002/0018228 A1* | 2/2002 | Torigoe .................. B42D 25/29 358/1.14 |
| 2002/0029253 A1 | 3/2002 | Rhoads |
| 2002/0126873 A1* | 9/2002 | Alattar ............. H04N 21/23892 707/E17.028 |
| 2002/0130908 A1* | 9/2002 | Wilensky ................ G06T 11/00 715/863 |
| 2002/0164051 A1* | 11/2002 | Reed ..................... G06T 1/0028 382/100 |
| 2002/0164052 A1* | 11/2002 | Reed .................... H04N 1/00005 382/100 |
| 2003/0032033 A1* | 2/2003 | Anglin .................. G06T 1/0021 435/6.12 |
| 2003/0037173 A1* | 2/2003 | Pace ....................... H04L 67/34 719/310 |
| 2003/0058477 A1* | 3/2003 | Brunk .................. H04N 1/32208 358/3.28 |
| 2003/0215110 A1* | 11/2003 | Rhoads .................. G06F 16/58 382/100 |
| 2004/0001606 A1 | 1/2004 | Levy |
| 2004/0032972 A1* | 2/2004 | Stach ..................... G06T 1/0021 382/104 |
| 2004/0044894 A1 | 3/2004 | Lofgren |
| 2004/0133427 A1* | 7/2004 | Alattar ................... G06T 1/0064 704/273 |
| 2004/0133924 A1 | 7/2004 | Wilkins |
| 2004/0207861 A1* | 10/2004 | Hattori ................. G06K 15/1851 358/1.7 |
| 2005/0052469 A1 | 3/2005 | Crosby |
| 2005/0123135 A1* | 6/2005 | Hunt .................... H04N 21/4181 380/200 |
| 2005/0259820 A1* | 11/2005 | Jones ................... H04N 19/467 380/201 |
| 2006/0008112 A1* | 1/2006 | Reed ..................... G06T 1/0085 382/100 |
| 2006/0075241 A1* | 4/2006 | Deguillaume ..... H04N 1/32203 713/176 |
| 2006/0285152 A1* | 12/2006 | Skillen .................... G06F 16/29 358/1.15 |
| 2007/0064973 A1* | 3/2007 | Meaney ................ H04N 1/3232 382/100 |
| 2007/0147655 A1* | 6/2007 | Chuang ................. G06T 1/0021 382/100 |
| 2007/0240124 A1* | 10/2007 | Taneda ................. G06F 9/45504 717/129 |
| 2007/0242082 A1* | 10/2007 | Lathrop .................. G06F 16/56 345/619 |
| 2007/0245238 A1* | 10/2007 | Fugitt ................... G06F 3/0481 715/700 |
| 2007/0258100 A1* | 11/2007 | Kano ...................... G06F 40/10 358/1.5 |
| 2007/0273936 A1* | 11/2007 | Fujimaki ............... G06F 40/169 358/474 |
| 2007/0286450 A1* | 12/2007 | Van Der Veen ....... G10L 19/018 704/E19.009 |
| 2008/0005154 A1* | 1/2008 | Fujimaki ................ G06F 16/95 707/999.102 |
| 2008/0037071 A1* | 2/2008 | Ohta ...................... G06F 16/93 369/14 |
| 2008/0046254 A1* | 2/2008 | Nuno ..................... G06F 40/151 705/305 |
| 2008/0055315 A1* | 3/2008 | Ducharme .............. G06T 13/00 345/473 |
| 2008/0088886 A1* | 4/2008 | Silverbrook .......... G06F 3/0321 358/403 |
| 2008/0226125 A1* | 9/2008 | Van Leest ............. G10L 19/018 704/E19.009 |
| 2009/0180133 A1* | 7/2009 | Yamamoto ............ G06F 3/1285 358/1.15 |
| 2010/0228675 A1* | 9/2010 | Sato ....................... G06Q 40/06 705/37 |
| 2011/0085209 A1* | 4/2011 | Man .................... H04N 1/00883 358/3.28 |
| 2011/0191670 A1* | 8/2011 | Hoppenot ............... G06F 17/00 715/255 |
| 2011/0214044 A1* | 9/2011 | Davis ..................... G06T 11/40 427/256 |
| 2012/0226823 A1* | 9/2012 | Livnat ................... G06F 21/6209 709/246 |
| 2012/0257249 A1* | 10/2012 | Natarajan ............... G06F 16/93 358/1.15 |
| 2012/0307269 A1* | 12/2012 | Okamura ............... G06K 15/189 358/1.9 |
| 2013/0127874 A1* | 5/2013 | Peterson ................. G06T 13/80 345/473 |
| 2013/0151953 A1* | 6/2013 | Konno ................... G06V 30/414 715/245 |
| 2013/0223673 A1* | 8/2013 | Davis ..................... G06F 3/147 235/375 |
| 2014/0037129 A1* | 2/2014 | Reed ..................... G06T 1/0085 382/100 |
| 2014/0052555 A1* | 2/2014 | MacIntosh ............ G06V 20/10 705/23 |
| 2014/0119593 A1 | 5/2014 | Filler |
| 2014/0185070 A1* | 7/2014 | Muramoto ......... H04N 1/00278 358/1.9 |
| 2014/0204085 A1* | 7/2014 | Stroila ................... G09B 29/007 345/420 |
| 2014/0229318 A1* | 8/2014 | Natarajan ............. G06F 40/143 705/26.5 |
| 2014/0293344 A1* | 10/2014 | Umezawa ............. G06F 3/1258 358/1.15 |
| 2014/0313206 A1* | 10/2014 | George ................... G06T 11/60 345/441 |
| 2015/0156369 A1* | 6/2015 | Reed ..................... H04N 1/32309 382/100 |
| 2015/0324946 A1* | 11/2015 | Arce ...................... G06T 1/0007 382/251 |
| 2015/0370763 A1* | 12/2015 | Wang .................... G06F 40/106 715/235 |

(56) References Cited

U.S. PATENT DOCUMENTS

| | | | |
|---|---|---|---|
| 2016/0198064 A1* | 7/2016 | Bai | H04N 1/32229 382/100 |
| 2016/0217547 A1* | 7/2016 | Stach | G06T 1/0064 |
| 2016/0253289 A1* | 9/2016 | Grams | G06F 40/103 715/205 |
| 2016/0267620 A1* | 9/2016 | Calhoon | G06T 1/0028 |
| 2016/0316098 A1* | 10/2016 | Reed | G06T 1/0028 |
| 2017/0024840 A1* | 1/2017 | Holub | G06T 1/0028 |
| 2017/0024845 A1* | 1/2017 | Filler | G06F 3/122 |
| 2017/0286022 A1* | 10/2017 | Omagari | G06F 3/125 |
| 2018/0004471 A1* | 1/2018 | Suzuki | G06F 3/121 |
| 2018/0213112 A1 | 7/2018 | Chapman | |
| 2018/0341831 A1* | 11/2018 | Szalavari | G06K 19/06037 |
| 2018/0342038 A1* | 11/2018 | Majoros | H04N 1/32267 |
| 2019/0087889 A1* | 3/2019 | Rice | G06Q 30/0643 |
| 2019/0139176 A1* | 5/2019 | Stach | G06T 5/30 |
| 2019/0160700 A1* | 5/2019 | Witkin | B31D 1/027 |
| 2019/0171856 A1* | 6/2019 | Sharma | G06K 19/06103 |
| 2019/0332840 A1* | 10/2019 | Sharma | G06K 7/1447 |
| 2019/0346981 A1* | 11/2019 | Pasala | G06F 8/33 |
| 2019/0354261 A1 | 11/2019 | Zhao | |
| 2019/0378235 A1* | 12/2019 | Kamath | H04N 1/3232 |
| 2020/0311505 A1 | 10/2020 | Kamath | |
| 2020/0410576 A1* | 12/2020 | Salmonson | G06T 19/20 |
| 2022/0301094 A1* | 9/2022 | Filler | H04N 1/32256 |

OTHER PUBLICATIONS

Excerpts, through May 26, 2022, from prosecution of corresponding EP application 20743526.

Haowen Yan et al: "A key points-based blind watermarking approach for vector geo-spatial data", Computers Environment and Urban Systems, New York, NY, US, vol. 35, No. 6, Oct. 26, 2010 (Oct. 26, 2010), pp. 485-492, XP028304991, ISSN: 0198-9715, DOI: 10.1016/J.COMPENVURBSYS.2010.10.004 [retrieved on Nov. 13, 2010].

Kamath et al, Hiding in Plain Sight: Enabling the Vision of Signal Rich Art, Electronic Imaging, Jan. 13, 2019 (5):527-1.

Kamath, Signal Rich Art: Improvements and Applications, presentation at Electronic Imaging Conference, Jan. 27, 2020.

Kim, Robust Vector Digital Watermarking Using Angles and a Random Table, Adv. Inf. Sci. Serv. Sci.. Dec. 2010;2 (4): 79-90.

Kitamura et al, Copyright Protection of Vector Map Using Digital Watermarking Method Based on Discrete Fourier Transform, InIGARSS 2001, Scanning the Present and Resolving the Future. Proceedings, IEEE 2001 International Geoscience and Remote Sensing Symposium (Cat. No. 01CH37217) Jul. 9, 2001 (vol. 3, pp. 1191-1193).

Ohbuchi et al, Watermarking 2D Vector Maps in the Mesh-Spectral Domain, 2003 IEEE Shape Modeling International, May 12, 2003 (pp. 216-225).

\* cited by examiner

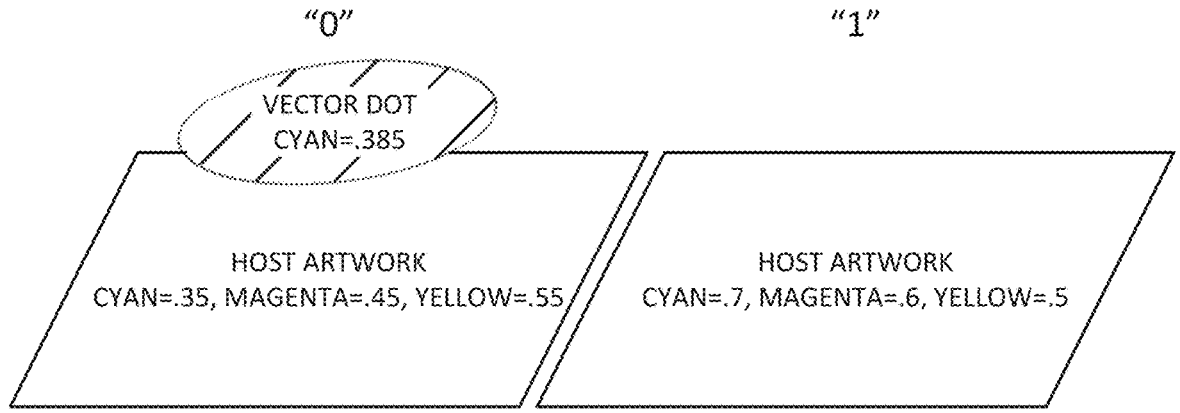
FIG. 5 – CYAN BINARY (0,+1)
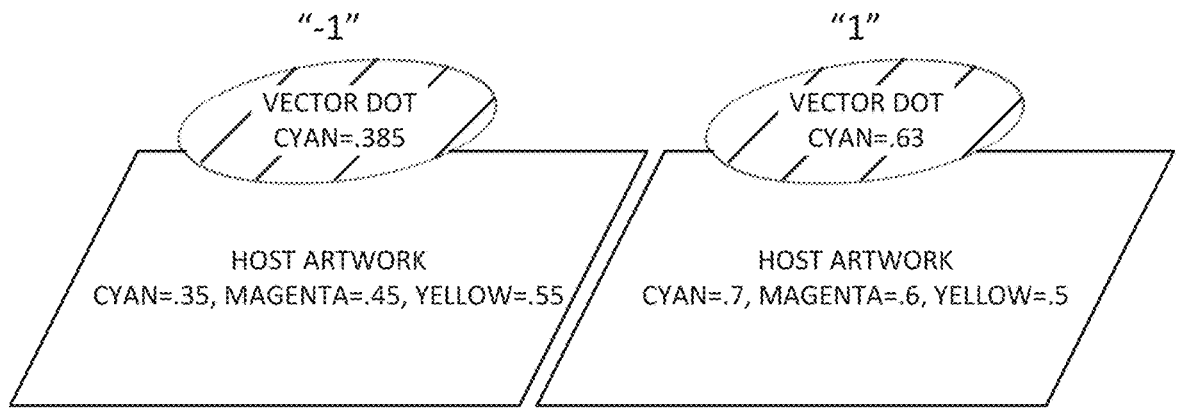
FIG. 6 – CYAN BINARY (-1,+1)
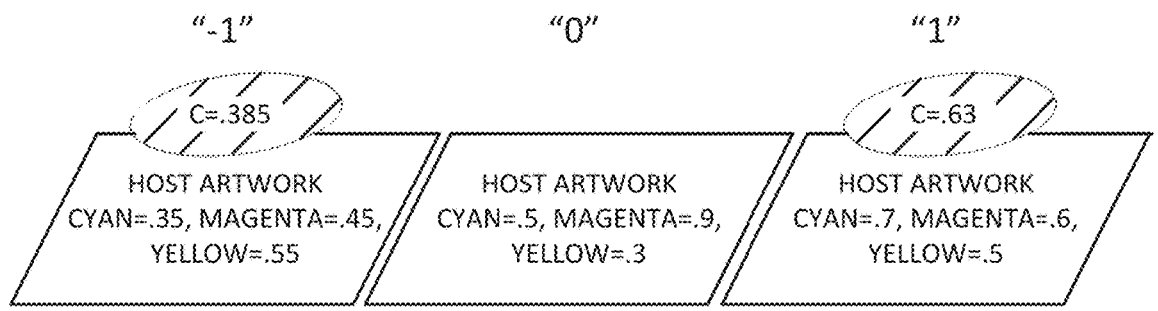
FIG. 7 – CYAN TERNARY (-1,0,+1)

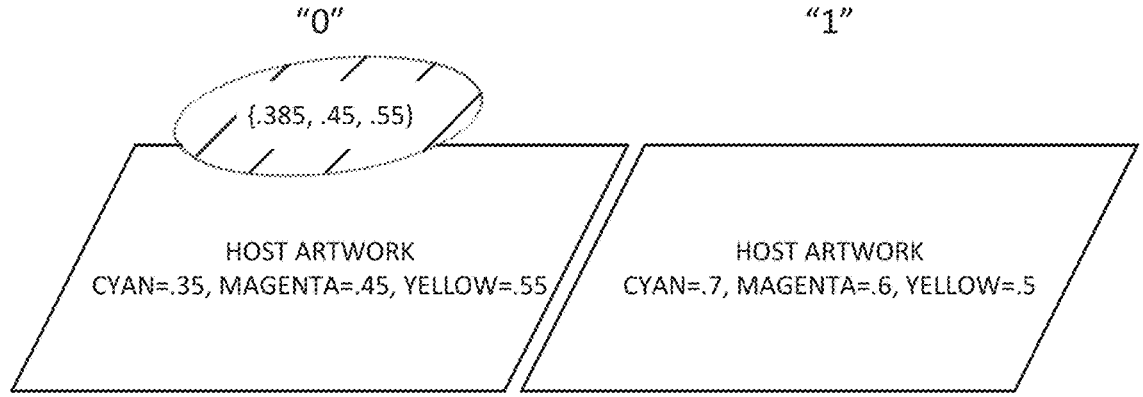
FIG. 8 – CYAN-ADJUSTED LOCAL COLOR BINARY (0,+1)
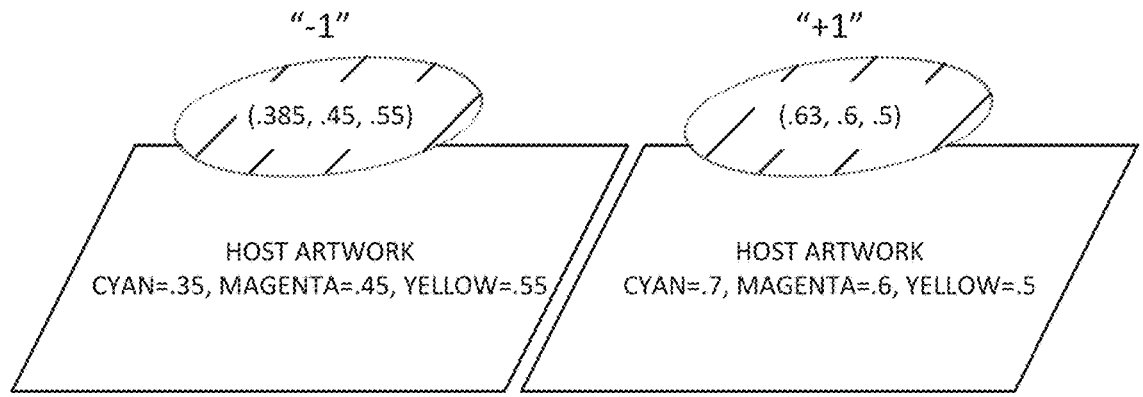
FIG. 9 – CYAN-ADJUSTED LOCAL COLOR BINARY (-1,+1)
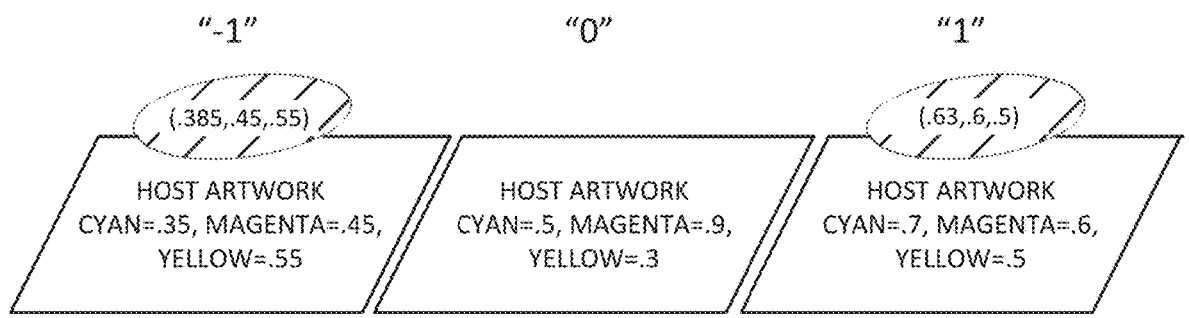
FIG. 10 – CYAN-ADJUSTED LOCAL COLOR TERNARY (-1,0,+1)

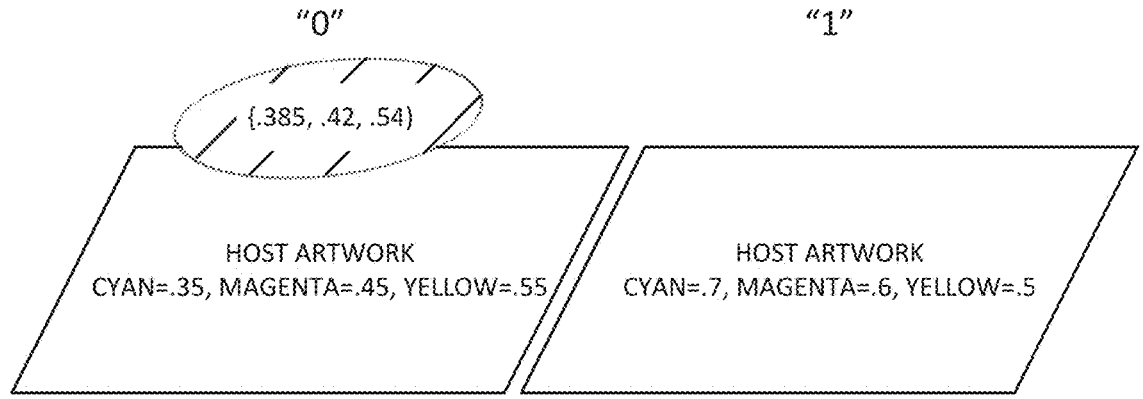
FIG. 11 – CME-ADJUSTED LOCAL COLOR BINARY (0,1)
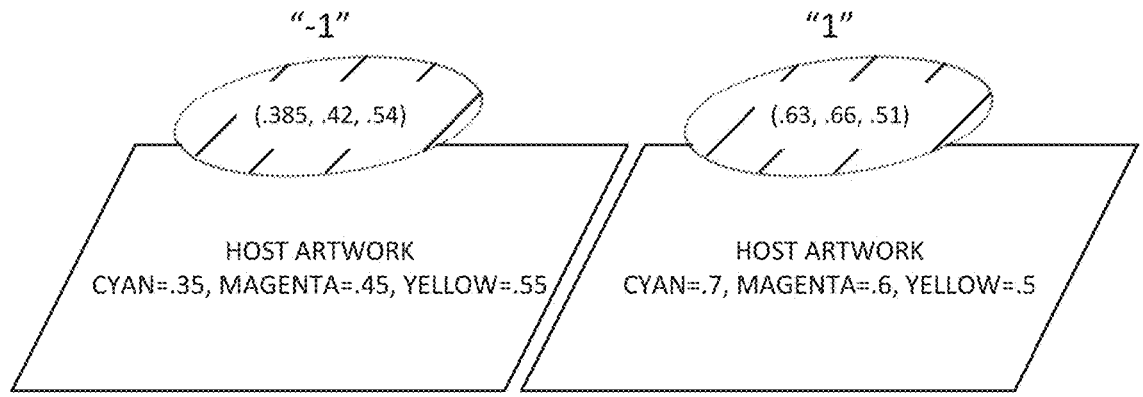
FIG. 12 – CME-ADJUSTED LOCAL COLOR BINARY (-1,1)
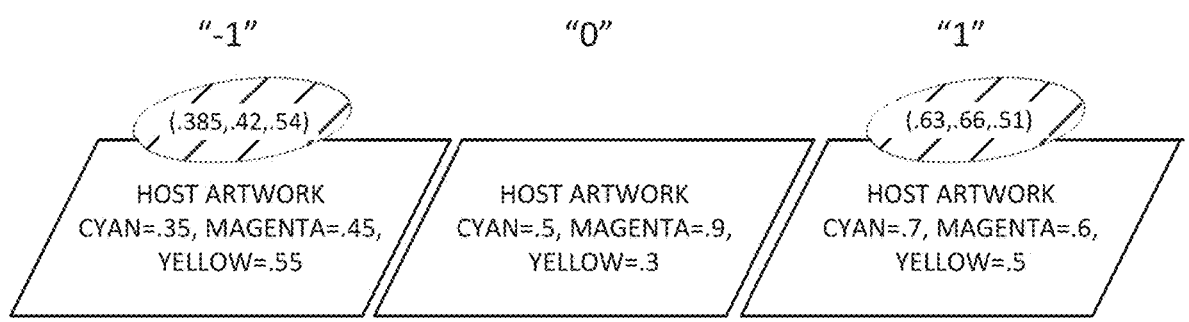
FIG. 13 – CME-ADJUSTED LOCAL COLOR TERNARY (-1,0,1)

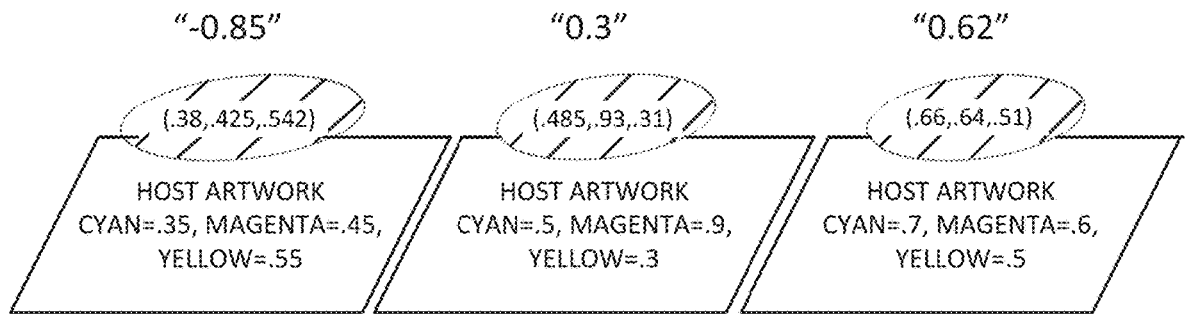
FIG. 14 – CME-ADJUSTED LOCAL COLOR CONTINUOUS TONE
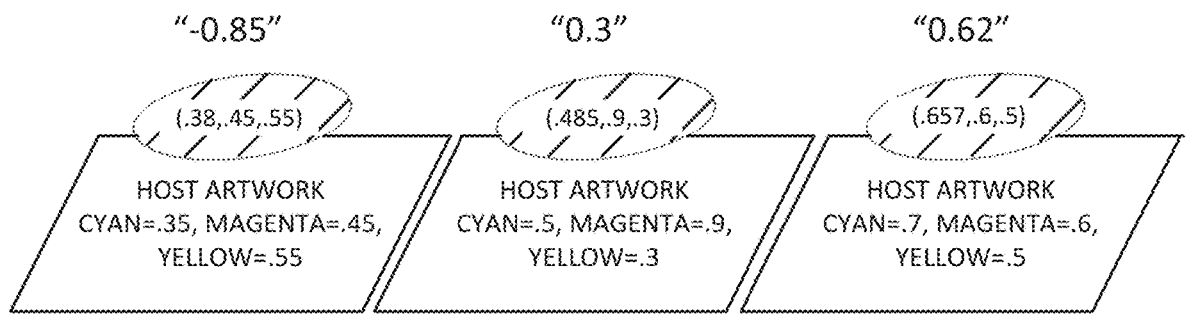
FIG. 15 – CYAN-ADJUSTED LOCAL COLOR CONTINUOUS TONE

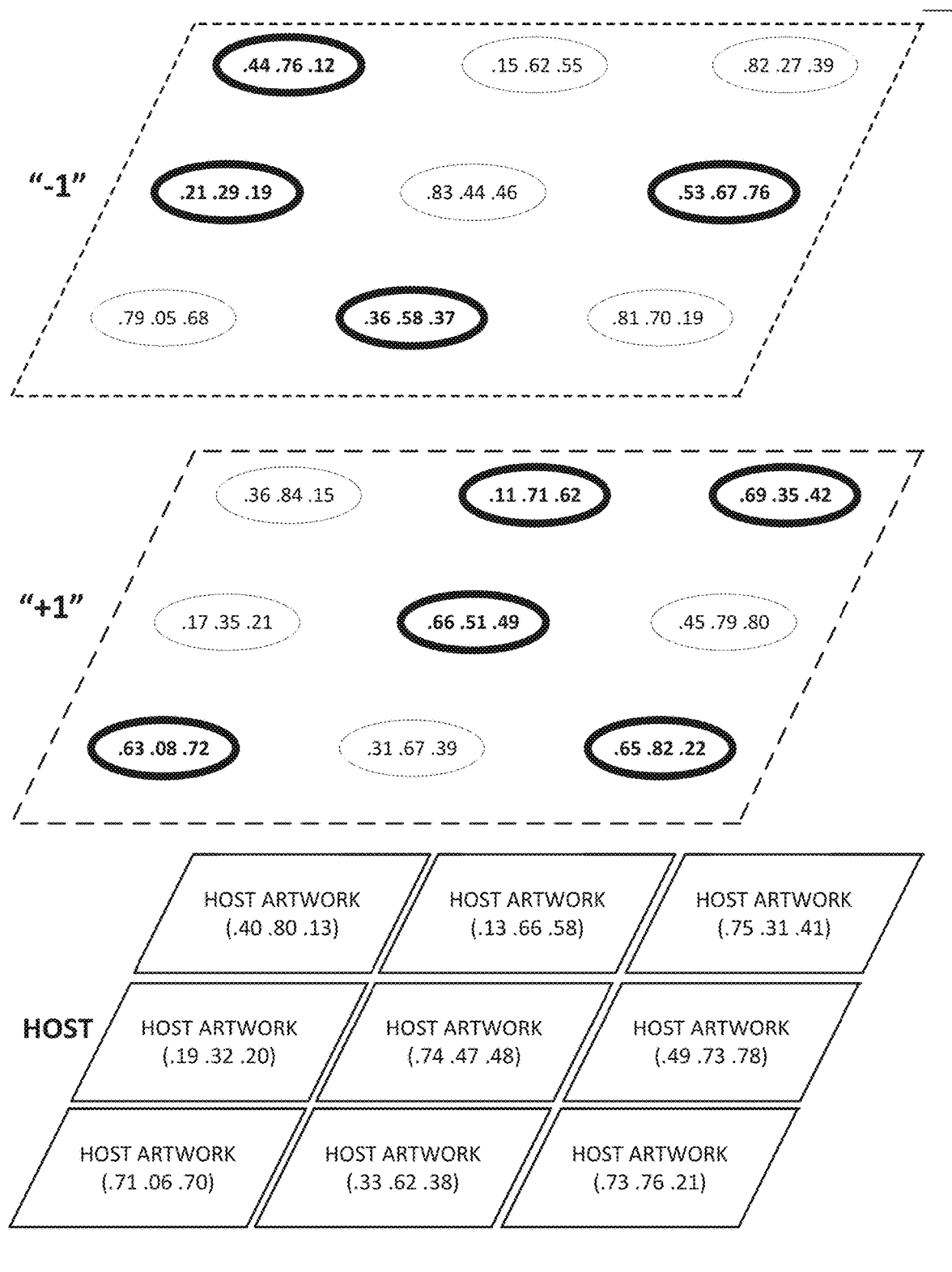
FIG. 16 – CME-ADJUSTED LOCAL COLOR BINARY (-1,+1)

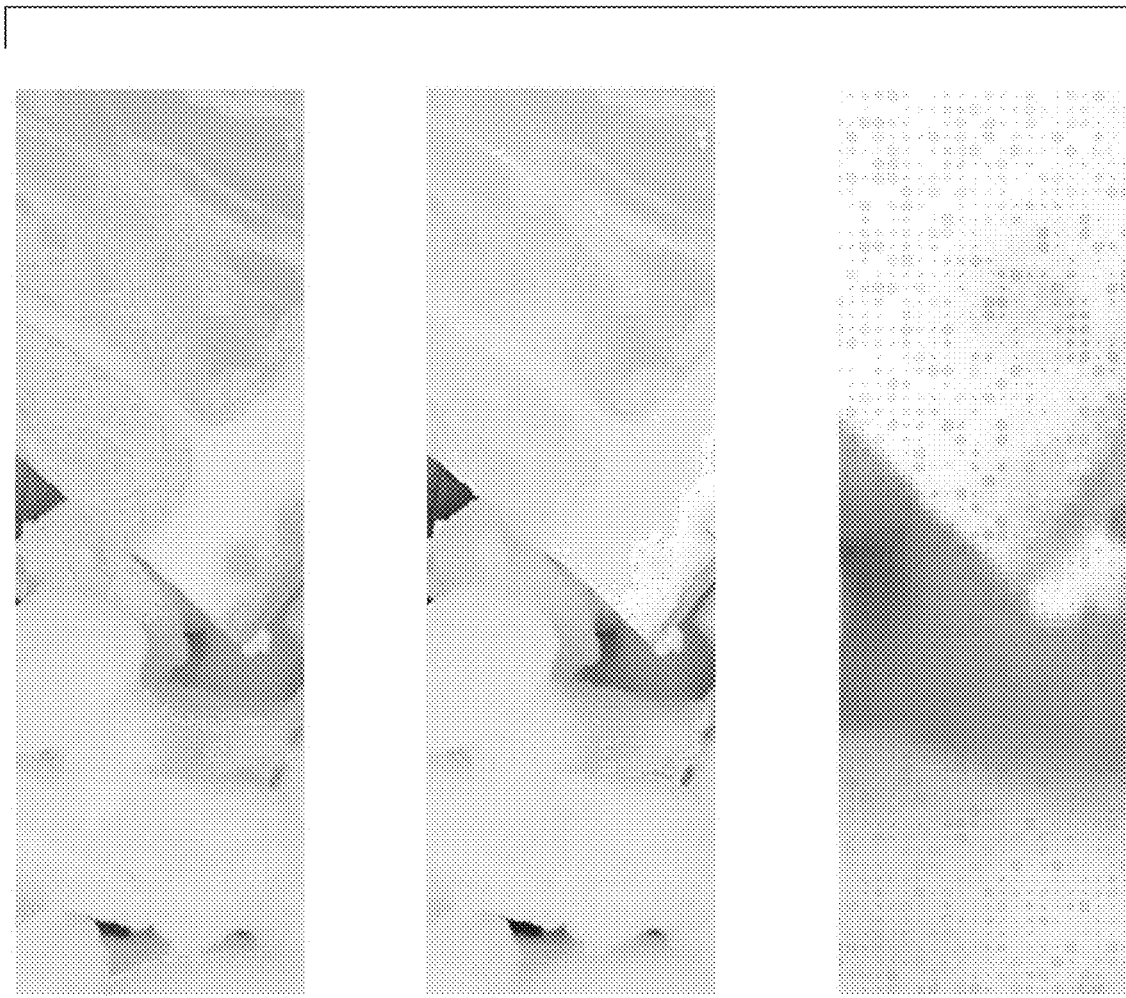
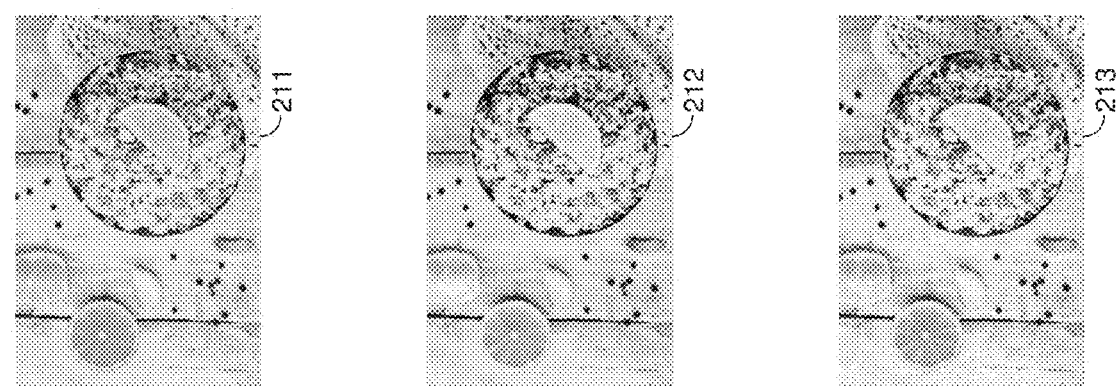
FIG. 21

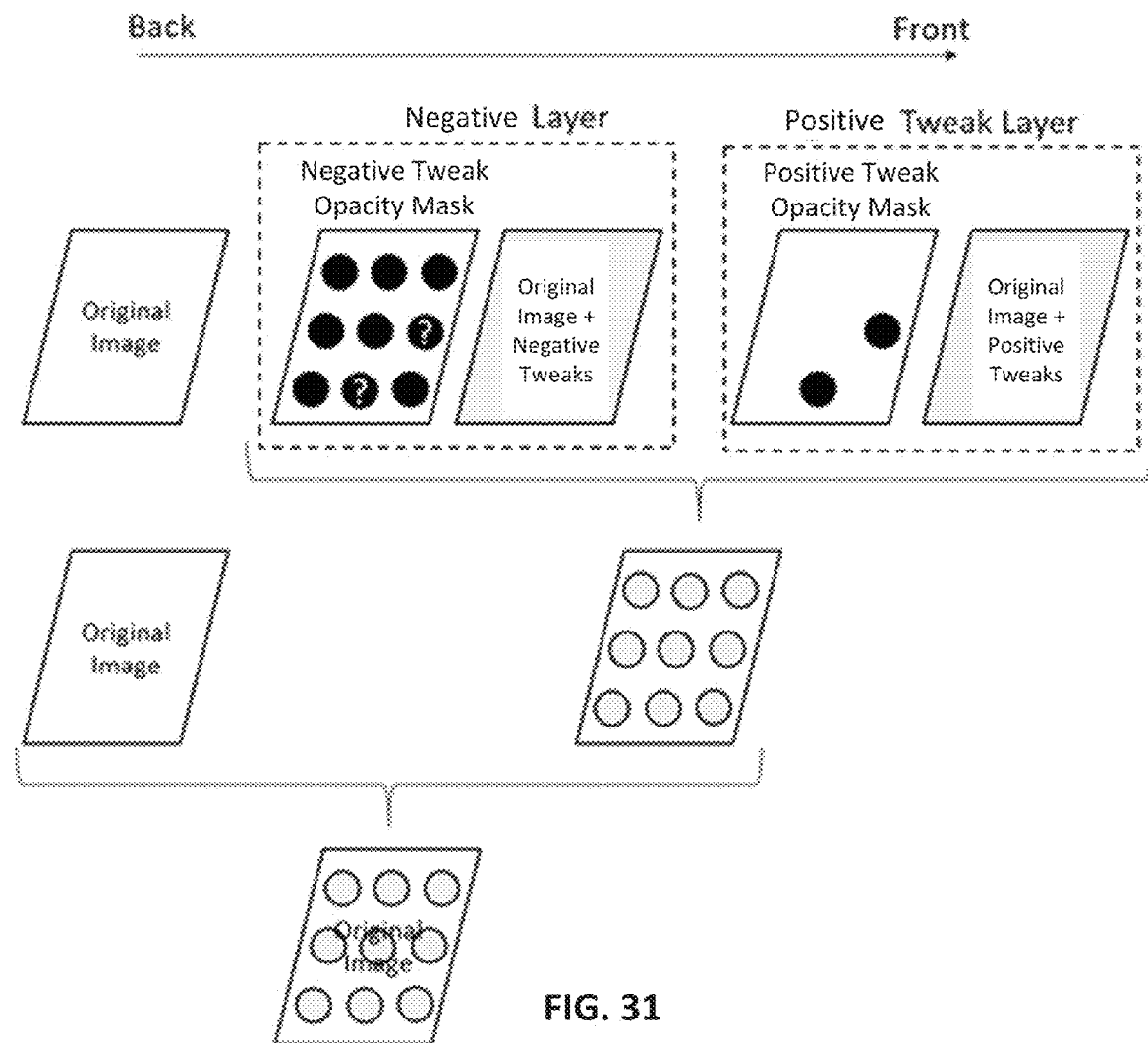
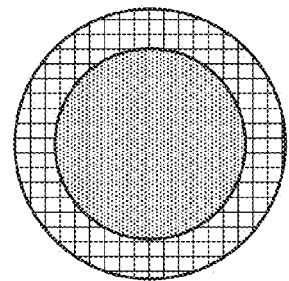
FIG. 31
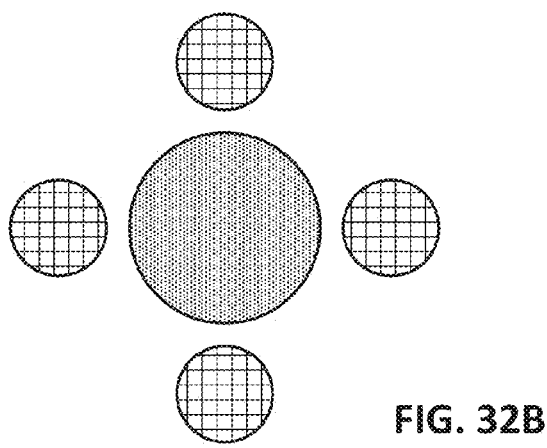
FIG 32A    FIG. 32B

| | |
|---|---|
| INPUT FILE: | BROWSE |

STRENGTH: [ 5 ]  (0 – 12)

VARY: ● COLOR
○ AREA

PRIMITIVES: ○ CIRCLES
● SQUARES    AREA: [ 40 % ]
○ STARS

DITHER? [ NO ] (YES/NO)

MARK WITH: ○ POSITIVE TWEAKS ONLY
○ NEGATIVE TWEAKS ONLY
● BOTH TWEAKS

PAYLOAD: [                    ]

[ APPLY ]

WATERMARKING ARRANGEMENTS PERMITTING VECTOR GRAPHICS EDITING

RELATED APPLICATION DATA

This application is a continuation of U.S. application Ser. No. 16/918,809, filed Jul. 1, 2020 (now U.S. Pat. No. 11,288,764), which claims priority benefit to provisional application 62/938,872, filed Nov. 21, 2019, and to provisional application 62/869,509, filed Jul. 1, 2019. The disclosures of these applications are incorporated herein by reference.

This application expands on previous work by applicant that is detailed in the patent documents cited below.

INTRODUCTION

Digital watermarking has commonly been performed using raster image data, e.g., comprising arrays of pixels—each with an integer value (or a set of integer values, e.g., for red/green/blue). However, much commercial art, such as product packaging and labeling, is composed of vector graphics.

Vector graphics are computer images that are defined in terms of 2D points specified in an {x,y} coordinate system, with an accompanying list of instructions that specify connection of the points by lines and curves to form polygons and other shapes. (Some common shapes, such as circles, ellipses and rectangles, are available as primitives, and need not be defined by lines.) The instructions can also define various properties, including values for stroke color, shape, curve, thickness, and fill. (Raster graphics—such as photographs—can also be included in vector graphics, as component elements.) Popular vector graphics file formats include SVG, EPS and PDF. These are intrinsically different from raster graphics file formats such as TIF, PNG, GIF and JPEG.

To apply a watermark to vector artwork first requires converting the vector artwork to raster form ("rasterization"). This is a destructive, one-way function; the original vector graphic cannot readily be recreated from the raster form. For example, many vector images comprise multiple layers, e.g., of different color separations, artwork elements, transparency and other masks, etc. The rasterization process merges or "flattens" these layers into a lesser number (commonly just color layers red/green/blue, or cyan/magenta/yellow/black). Rasterization thus limits the utility of the resulting data, e.g., by preventing subsequent editing of original parts of the artwork (e.g., individual layers) apart from the whole. When a watermark is then added to the rasterized artwork, then it too cannot readily be changed.

Additionally, rasterization can vastly increase file sizes, complicating storage and data transfer. Moreover, rasterization often involves application of an ICC color profile that adjusts the colors to conform to characteristics of the ultimate output device (e.g., an Epson SureColor P9570 printer). However, the ultimate output device may be unknown at the time that the watermark embedding takes place.

One aspect of the present technology concerns embedding watermark data in vector graphics artwork so that the embedded artwork remains in its original form, avoiding the just-noted difficulties associated with rasterization.

One particular embodiment that makes use of aspects of the present technology involves receiving artwork data and receiving a plural-symbol payload. The payload is transformed into one or more watermark vector graphics layers comprising vector graphics drawing instructions. The artwork data is stored as an artwork layer, together with the one or more watermark vector graphics layers, in a vector graphics file. By such arrangement the file defines artwork with a watermark pattern, yet the artwork layer is not changed by the watermark pattern. The file can then be rasterized, and raster output for different color separations can be used to create printing plates, e.g., for an offset press, which in turn are used to print packaging, e.g., for food or general merchandise items.

A further particular embodiment that incorporates aspects of the present technology involves receiving host color artwork, and then generating first and second color-shifted counterparts of the host color artwork. Generating the first counterpart includes increasing a first component color, such as cyan. Generating the second counterpart includes decreasing the first component color. Imagery in which a plural-symbol payload is encoded is then produced by a process that includes combining excerpts from these two color-shifted counterparts. The payload is encoded by a pattern formed by these first and second excerpts.

Still another particular embodiment that incorporates aspects of the present technology involves receiving an input vector graphics file that can be rendered to produce a first image. This file includes plural layers, where at least a first of the layers conveys artwork data, and at least a second of the layers conveys watermark information. The second layer is adjusted to change the watermark, yielding an adjusted vector graphics file. This adjusted vector graphics file can be rendered to produce a second image that is different than the first image. Yet adjusting this second layer does not change the first layer, nor change parameters characterizing the appearance of the first layer.

Yet another illustrative embodiment that incorporates aspects of the present technology involves decoding a payload, including a Global Trade Item Number (GTIN), from imagery depicting artwork on a consumer packaged good. A database lookup is then performed based on the GTIN, to obtain a name and price for the good. Name and price data are then added to a checkout tally for a shopper, and the shopper is charged for a total amount due—possibly including printing a confirmatory register tape. In such arrangement the imagery depicts a digital watermark pattern comprising an array of graphic primitives, including first and second primitives that differ from each other in size, fill color or transparency.

A still further illustrative embodiment that incorporates aspects of the present technology involves receiving artwork and a plural-symbol payload. A 2D array of message chip data is generated, corresponding to the payload. Each message chip datum has one of two values. Cyan-emphasized and cyan-deemphasized colors corresponding to colors in the artwork are generated. Finally, a 2D pattern of shapes are produced that are colored with the cyan-emphasized and cyan-de-emphasized colors, in accordance with values of the message chip data.

Yet a further illustrative embodiment that incorporates aspects of the present technology is a data structure stored in a non-transitory tangible medium, comprising a vector graphics file having plural layers. At least a first of the layers defines an artwork. At least a second of the layers comprises vector graphics drawing instructions that define an array of marks to be overlaid on the artwork for rendering, to encode a plural-bit payload in the rendered artwork.

Still another illustrative embodiment that incorporates aspects of the present technology comprises printed packaging artwork for a retail product, characterized by color artwork that is overlaid with first and second groups of vector graphics primitives that encode the product with a GTIN product identifier. The primitives in the first group differ in size, fill color and/or transparency from the primitives in the second group. Another embodiment is a product bearing such printed artwork.

The foregoing and many other features and advantages of the present technology will be more readily apparent from the following Detailed Description, which proceeds with reference to the accompanying drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIGS. 5 through 15 illustrate different arrangements by which vector graphic primitives may be overlaid on waxels of host artwork and colored with tinted variants of host artwork colors, to convey different signal values.

FIG. 16 shows an arrangement in which two layers of colored primitives are overlaid on host artwork, where one layer contains primitives tinted towards cyan to convey −1 signal values, and the other contains primitives tinted away from cyan to convey +1 signal values.

FIG. 21 shows negative and positive tweak images corresponding to host artwork, and enlargements of each.

FIG. 31 shows another variant process detailed herein, illustrating that one of the primitive layers can be a full 2D array, and a second primitive layer can overlay it, thereby saving memory.

FIGS. 32A and 32B show how cyan-emphasized and cyan-deemphasized primitives can be placed in spatial proximity to maintain constant luminance.

FIG. 34 shows a user interface for a software tool that defines watermark primitives for a vector graphics file.

DETAILED DESCRIPTION

By way of background, one popular digital watermarking technology sums pixels of a host artwork with corresponding pixels of a watermark block. The watermark block has two components: a reference signal, and a payload signal. The reference signal is a known pattern, such as an ensemble of 2D sinusoids of different frequencies and phases, which permits the scale, rotation, and translation (collectively, the "pose") of the watermark to be identified within distorted imagery (e.g., imagery captured with a camera from a watermarked product label, in which the pose of the watermark is initially unknown). The payload signal is a pattern of data elements in a 2D array that encodes a plural bit watermark payload. The pattern may comprise 16,384 elements, and serve to encode (redundantly) a 48-bit watermark payload.

Figure 1:
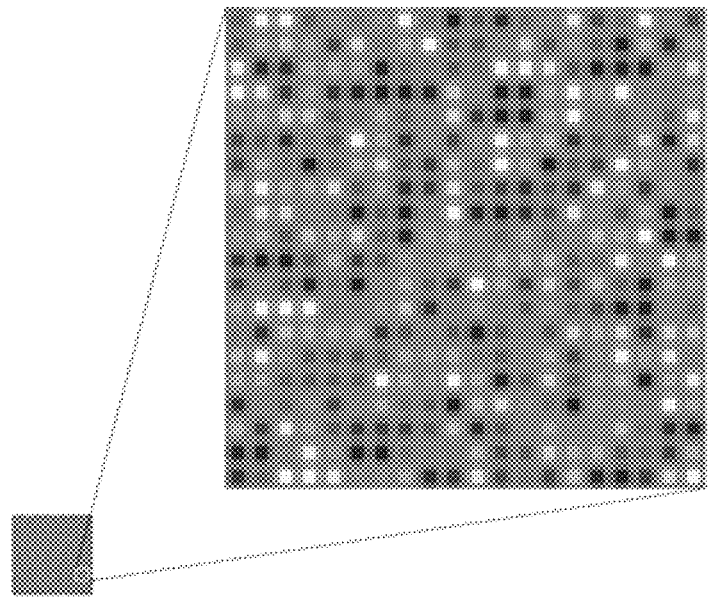
FIGS. 1 and 1A depict a prior art, rasterized digital watermark pattern, at different levels of magnification.
Figure 1A:
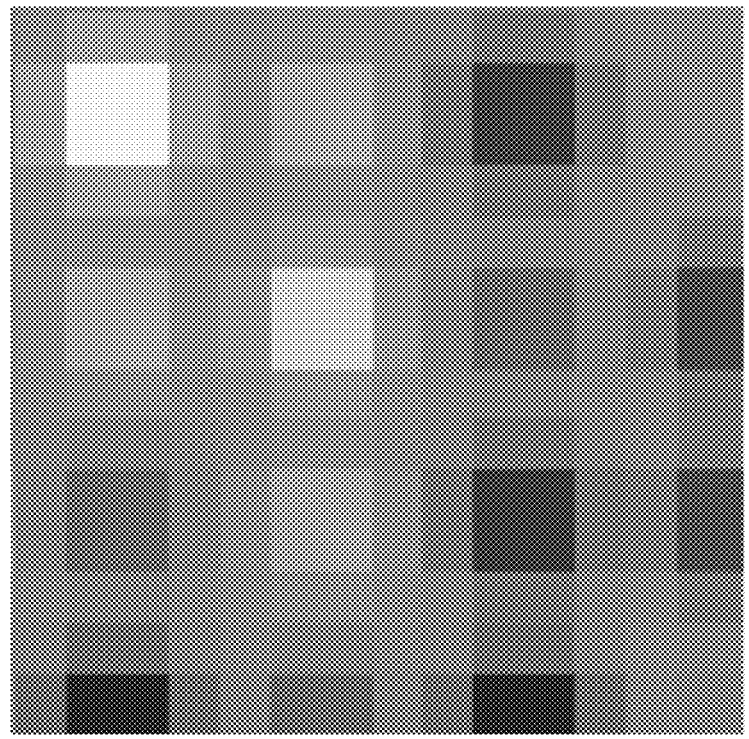

FIG. 1 shows an enlarged excerpt of an illustrative watermark block, with FIG. 1A showing a further enlargement.

The full block (to the far left of FIG. 1) is a 300×300 pixel pattern, defining a 128×128 array of "bumps" of darker and lighter grey, with mid-tone greys in-between. A process for forming such a block can be as follows:

An ensemble of 64 2D continuous spatial sinusoids spanning the watermark block, of different frequencies and phases, are summed together and sampled to form a reference signal component of 128×128 elements. The reference signal is commonly generated as a real number that varies between −1 and 1, but it is conventionally quantized and scaled to produce a value in an 8-bit greyscale range, e.g., 0 to 255.

The payload signal is formed by applying a payload (e.g., of 48 bits), together with associated CRC data (e.g. of 25 bits), to a convolutional encoder to produce a 1024-bit signature. This signature is randomized by XORing with a 1024-bit scrambling key. Each of the resulting 1024 randomized signature bits is modulated by XORing with a fixed 16-bit spreading key sequence, transforming each of the randomized signature bits into 16 "−1" and "1" "chips," yielding 16,384 such chips. Each chip is assigned a different location in a 128×128 array, based on mapping data in a scatter table. At locations where a "1" chip is mapped, a corresponding 8-bit greyscale value is assigned, e.g., 255. At locations where a "−1" chip is mapped, an opposite value is assigned, e.g., 0.

At each location in the 128×128 element array, the reference signal and payload signal are combined in a weighted ratio. For example, the reference signal may be weighted with a unitary factor, and the payload signal may be weighted with a factor of 0.55. Their sum is then divided by 1.55 to yield a combined signal in the 0-255 8-bit range.

In one particular implementation, this combined signal is next clipped, e.g., at the 13.5% and 86.5% percentile levels (corresponding to greyscale values of 34 and 221). That is, the value of any combined signal element having a value below 34 is changed to have a value of 34, and any combined signal element having a value above 221 is similarly changed to have a value of 221.

The resulting 128×128 array of data corresponds to a block of watermark pattern at a physical scale desired for embedding, such as 75 watermark elements ("waxels") per inch (WPI). A Gaussian bump shaping function can be applied to up-sample the 75 WPI block to a desired physical scale at which the host imagery (e.g., label artwork) will be printed, such as 300 dots per inch (DPI). To up-sample to a 300 DPI print resolution, the following 4×4 bump shaping function can be applied:

$$B = \begin{bmatrix} 1 & 4 & 4 & 1 \\ 4 & 16 & 16 & 4 \\ 4 & 16 & 16 & 4 \\ 1 & 4 & 4 & 1 \end{bmatrix}$$

If $T_{128}$ is the 75 WPI tile, the 300 DPI tile is obtained as follows $T_{512}=(T_{128} \otimes B)/16$, where $\otimes$ is the Kronecker tensor product. The 128×128 waxel block is thereby transformed into a 512×512 element block, defining a 128×128 array of waxel "bumps," each 4×4 pixels in size. Each pixel has an 8-bit value between 34 and 221.

Finally, pixel values in this 512×512 block are scaled and shifted for combining with the host artwork. More particularly, the pixel values are reduced in magnitude, and shifted in scale, to yield values in a small range, such as −4 to +4, or −20 to 20. Such small values serve as positive and negative "tweaks" for summing with pixel values of underlying pixel-based host artwork to subtly adjust their values, by levels too small to be casually noticed. (In one particular arrangement, a value of 128 is subtracted from each element value in the up-sampled 512×512 array, and each result divided by 8, to yield a tweak value of between −12 and +12 for each element.) Elements of this watermark pattern array are summed with respective values representing the local luminance (or chrominance) of the artwork pixels, to encode the watermark payload in the artwork.

Generation of pixel values for the artwork, of course, requires rasterization, if the artwork is provided in vector form. vector graphics instructions and tools can no longer be applied.

In one embodiment of the present technology, the watermark signal is generated as one or more vector graphics layers, for rendering with the layer(s) defining the host artwork. The watermark layer is defined by vector graphics instructions that cause an array of vector graphics primitives to be spread across the host artwork (or excerpt thereof), with sizes and/or fill colors calculated to convey the watermark and payload signals. The resulting artwork is fully-editable, using conventional instructions and tools, such as those provided by Adobe Illustrator software.

It will be recognized that rasterization is not essential to define a watermark block. The watermark reference signal (i.e., the superposition of multiple 2D sinusoids of specified spatial frequencies, amplitudes and phases, yielding a signal that ranges between −1 and +1) is defined by computer instructions. The values and positions of the "−1" and "+1" "chip" signals are similarly defined. Although such data can be scaled for representation in 8-bit greyscale form commonly associated with pixels, they need not be.

In an illustrative embodiment of the present technology, the 128×128 block construct described above is maintained, including both a 2D reference signal that spans the block, and the 128×128 array of binary "chips." These two data are combined, at each point in the 128×128 array, in a weighted ratio, as described earlier. For simplicity, both the reference signal and the chips can be in the range of −1 to +1. With a 1:0.55 weighting, their weighted sum yields values in the range of −1.55 to +1.55. These combined watermark signal values are each normalized to the range of −1 to +1 by dividing by 1.55.

In an exemplary implementation, we skip the Kronecker bump-shaping operation, and leave the watermark pattern signal as a 128×128 array of values. We now define an SVG document, 128×128 units in size. (Since any SVG document can readily be scaled, and converted in units, the workspace coordinate system is not critical.) Instructions define first and second groups of circles (vector primitives) from the computed array of 128×128 values. In particular, in the first group, the instructions place a circle of a first type at locations within the 128×128 array where the corresponding signal value is between −1.0 and −0.4 (i.e., negative extrema). In the second group, the instructions place a circle of a second type at locations where the corresponding signal value is between 0.4 and 1.0 (i.e., positive extrema). No circle is placed at locations for which the corresponding value in the 128×128 array is between these two ranges.

The circles of the first group serve to shift the host image local luminance or chrominance in one direction, e.g., darker. The circles of the second group serve to shift the host image local luminance or chrominance in the opposite direction, e.g., lighter. (Such arrangement may be termed "two-toned," since the added vector graphics elements make two different types of changes to the artwork.)

Figure 2:
FIG. 2 shows an excerpt of a product label, incorporating host artwork and overlaid watermarking elements, applied using one particular embodiment of the present technology.
Figure 2A:
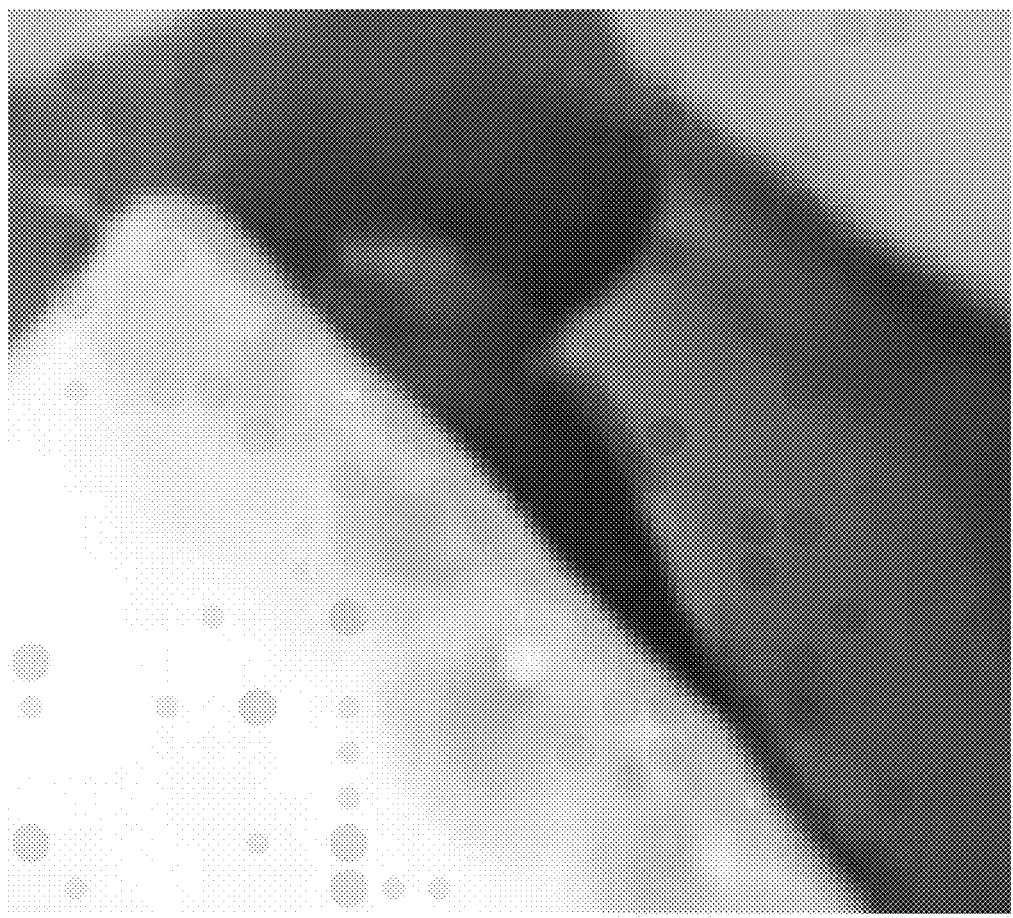
FIG. 2A shows a greatly-enlarged excerpt from FIG. 2, showing first and second groups of vector graphics circles overlaid on the host artwork.

FIG. 2 shows an example—an excerpt from artwork for a package of prepared rice. FIG. 2A shows a greatly-enlarged view, depicting circles of the first and second groups. The first group includes the larger, blue-green-ish (cyan-tinted) circles; the second group comprises the smaller, red-ish (magenta-tinted) circles.

(A quick refresher: cyan, magenta and yellow are the complements of red, green and blue, respectively. That is, cyan ink, printed on a white substrate, reduces the red component of white illumination that would otherwise be reflected from the substrate. Put another way, white light minus red leaves cyan. Likewise for magenta and yellow.)

One way to change the luminance or chrominance of the artwork is by changing the fill of the circle overlaid at a location (e.g., changing the luminance and/or chrominance of the fill). Another way to change such characteristic is by changing the size of the circle overlaid at a location.

Consider a first implementation involving greyscale host imagery. To darken a single location within the array of 128×128 waxels, a circle is overlaid at a corresponding location in the image, with a fill that is darker than the underlying imagery. (The square area within the host imagery to which a single waxel spatially corresponds may be termed an image cell.) The degree of darkness that is applied in the image cell can be controlled by controlling the size of the overlaid circle, or the darkness of its fill, or both. That is, either a larger circle that is slightly darker than the underlying image content in that image cell, or a smaller circle that is still more dark, can be overlaid on a subject location, to reduce its net luminance by a given amount. (The luminance of the underlying host artwork at each image cell can be determined by applying a rendering model, such as the SVG rendering model, which is based on the SVG Compositing and Blending Level 1 specification, W3C Candidate Recommendation, 13 Jan. 2015. This document is freely available and familiar to artisans, and is incorporated herein by reference. Additionally, it is attached as an appendix to application 62/869,509, which is also hereby incorporated herein by reference.)

Using 8-bit greyscale values, if a host image cell has a local luminance value of 170 (in a 0-255 scale), and it is to be reduced in value by 5 to effect a watermark tweak, this can be achieved by overlaying a circle covering half of the cell area, having a fill of luminance value 160. Alternatively, this can be achieved by overlaying a circle covering a quarter of the cell area, having a fill of luminance value 150. Reciprocally, if the host image call is to be increased in value by 5 to effect an opposite watermark tweak, this can be achieved by overlaying a circle covering half of the cell area, having a luminance value of 180; or by overlaying a circle covering a quarter of the cell value, having a luminance value of 190.

A second implementation of the technology applies a watermark pattern to a color host image. Color imagery typically includes multiple planes of information—each in a different color (e.g., red/green/blue, or cyan/magenta/yellow/black). Luminance can be reduced, without changing chrominance, by reducing the luminance of all component color planes proportionately. However, many watermark applications (e.g., supermarket checkout imagers) involve illuminating printed artwork with red light, and sensing with a monochrome sensor. In such case, certain colors are invisible to the camera system. That is, on a white substrate with red illumination, whether a patch is printed in solid red or left unprinted makes no change in the detected signal; essentially all of the incident red light is reflected to the sensor. To make a detectable difference in the captured imagery, the watermark variations must be included in a color(s), such as cyan, where the printed variations will be evident as variations in the reflected red light. Depending on what colors are present in a region of host imagery, changing luminance may or may not result in a signal that is detectable to a red light imaging system. This is a reason that luminance watermarking is sometimes disfavored.

Another reason that luminance watermarking is sometimes disfavored is that the human eye is relatively sensitive to changes in luminance. Human vision is less sensitive to changes in chrominance. Thus, to make a watermark less visible to human observers (e.g., to make a watermark less visibly intrusive on product packaging), it is preferable to locally tweak the chrominance of an image to effect watermark encoding, leaving the luminance unchanged (or mostly-so).

The luminance "Y" of a color image, to human viewers, is commonly described as a weighted sum of individual red, green and blue component channel values: Y=0.299R+0.587G+0.114B. Thus, to keep the luminance unchanged, an increase in red needs to be offset by a decrease in green and/or blue, and vice versa.

In this second implementation of the technology, circles are overlaid over elements of host imagery, at locations corresponding to positive and negative extrema in the watermark pattern, as before. Each is filled with a color chosen to effect a desired watermark tweak that can be sensed in the red color channel, while leaving the apparent luminance—to human viewers—unchanged.

At each location where is circle is to be drawn, the color of the underlying host imagery is determined, based on its component color planes. (Again, the SVG rendering model can be applied.) For example, a given location in the host image may be found have R/G/B values of 170/50/220. A human visual system luminance is computed, e.g., 0.299 (170)+0.587(50)+0.114(220)=105. To effect a tweak in the red channel of −5, a circle spanning half of the element area is filled with a color that has a red value that is 10 less than 170, or 160. By itself, this would diminish the element luminance by 0.299(170-160), or 3. To maintain constant luminance, the green or blue value is increased by an offsetting amount. Increasing the green value from 50 to 55 does the trick of achieving unchanged luminance. That is, 0.299(160)+0.587(55)+0.114(220)=105. Thus, a circle spanning half the element area, with R/G/B color of 160/55/220 achieves a desired tweak of −5 in the red channel, while leaving human perception of luminance unchanged.

In the just-discussed examples, a watermark tweak of −5 is applied to a subject location in the artwork. This value can be configurable—with a magnitude set larger or smaller to apply a stronger (more visible) or weaker (more imperceptible) watermark, via the artist adjusting a software parameter or user interface control. For example, a watermark strength parameter can vary between 0 and 10. When set at 0, no watermark tweaks are applied. When set at 10, circles in the first group (i.e., at array elements where the watermark pattern values are between −0.4 and −1.0) are sized or filled to effect an adjustment of −20 digital numbers in the red channel, and circles in the second group are sized/filled to effect an adjustment of +20. When set at 8, the circles are sized/filled to effect adjustments of −/+16, etc.

(As detailed more fully below, variation of red reflection is most commonly accomplished—in printed media—by varying the amount of cyan ink applied to the substrate. But the underlying concept is more easily explained above in R/G/B, e.g., as may be displayed on a computer monitor, rather than in the complementary C/M/Y/(K) system.)

In a first variant embodiment, the size of the tweak is dependent on a user-set control, as above, and is also dependent on the value of the corresponding watermark pattern element.

For example, instead of making a positive adjustment to local image luminance, of a fixed-size, when the watermark pattern element value falls between 0.4 and 1.0, the adjustment can depend on the watermark pattern element value. A scaling factor of 0.75 can be applied for watermark pattern elements having values between 0.4 and 0.6. A scaling factor of 0.85 can be applied for watermark pattern elements having values between 0.6 and 0.8. And a scaling factor of 0.95 can be applied for watermark pattern elements having values between 0.8 and 1.0. A corresponding set of scaling factors can be applied for watermark pattern elements having negative values. Such factors can be applied to the just-discussed watermark strength factor in establishing a net magnitude for the local adjustments (in this case yielding a "six-toned" arrangement).

These first and second implementations involve adapting the fill, and/or size, of the vector-drawn circles based on the luminance, or color, of the underlying host imagery. This generally requires rendering of the underlying vector graphics layers—to determine the luminance/chrominance of the visible host artwork elements.

Figure 3A:
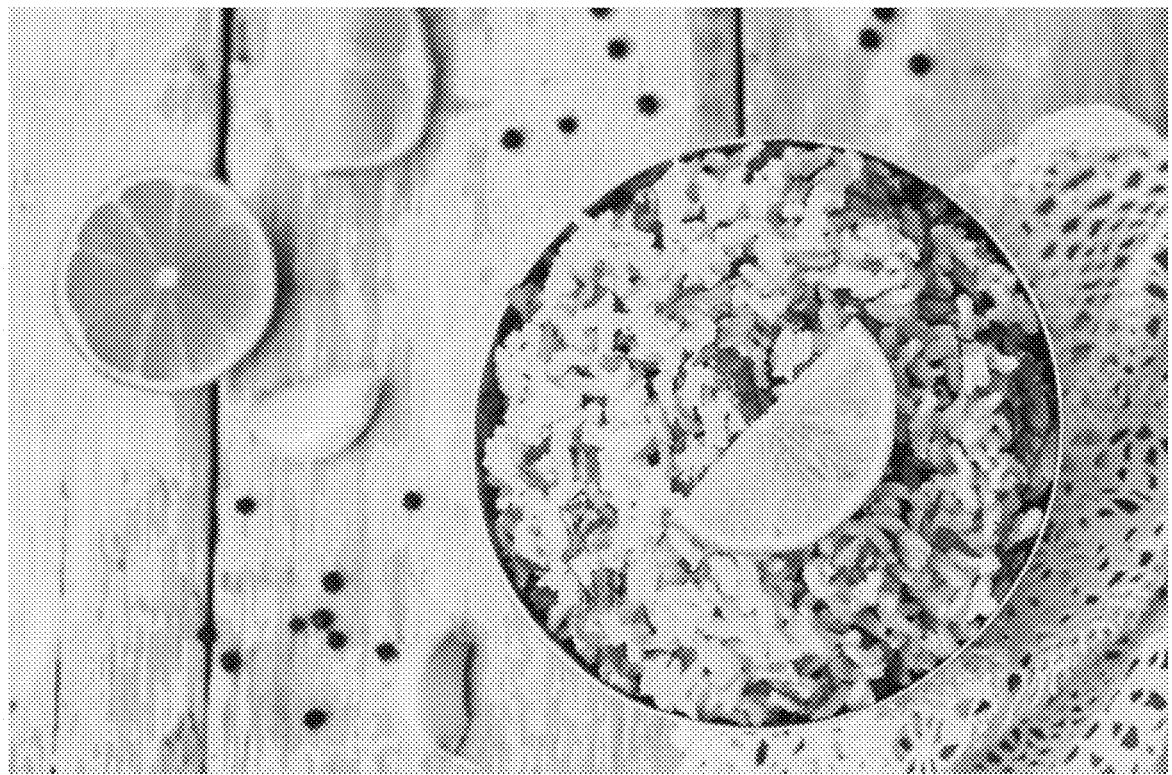
FIGS. 3A and 3B show tinted versions of the host artwork of FIG. 2, in magenta-diminished (cyan-enhanced), and magenta-enhanced forms.
Figure 3B:
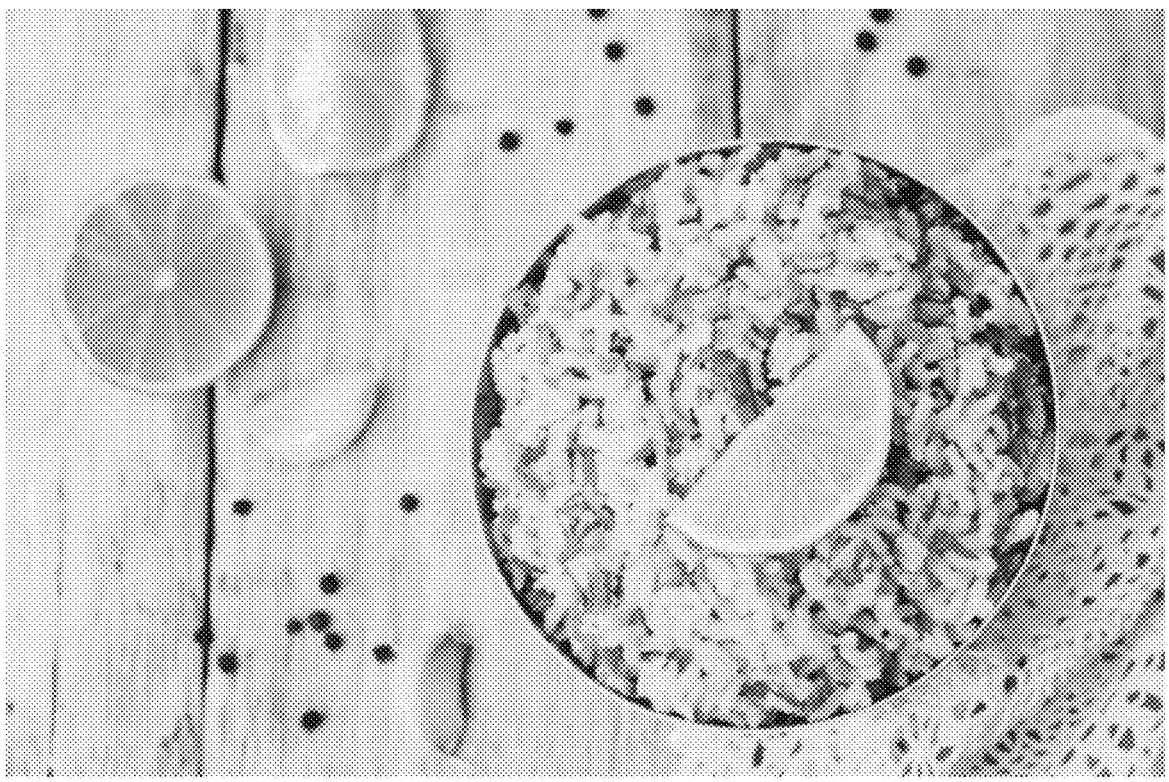

In one particular embodiment, the entire host image is rasterized, at a spatial resolution corresponding to the units of the 128×128 watermark tile (e.g., 75 or 150 watermark elements per inch). Two counterpart sets of image data are generated. The first is the reflected red channel decreased by a target tweak value (e.g., 10 digital numbers), with corresponding adjustment to the other color channels to minimize luminance change (e.g., cyan-emphasized). The second is the reflected red channel increased by a target tweak value (e.g., 10 digital numbers)—again with corresponding adjustments to the other channels (e.g., magenta-emphasized). Such images are shown in FIGS. 3A and 3B, respectively. The former may be termed a color mask for negative tweaks; the latter may be termed a color mask for positive tweaks.

When a circle of the first group is to be overlaid at a given location in the host artwork (to diminish its reflected red channel value), the corresponding location in FIG. 3A is sampled to determine the color that should be employed for the circle's fill. When a circle of the second group is to be overlaid at a given location (to increase its reflected red channel value), the corresponding location in FIG. 3B is sampled to determine the color circle's fill. This is the method used to generate the embedding depicted in FIG. 2A. (The circles of the first group have a diameter of 0.85 units; those of the second group have a diameter of 0.5 units. Cyan appears dark in red light camera systems; magenta appears light.)

It should be noted that FIG. 2A is shown greatly-magnified, captured from a digital rendering. When such a file is instead rendered on a physical press, the vector instructions are rasterized by a raster image processor (sometimes termed a "RIP engine"), which approximates the vector graphics by dots of ink. The pristine geometry of the tiny circles is lost in the mechanical realities of physical printing.

As is permitted in SVG, certain image components can be referenced using URLs. In a particular embodiment, the magenta- and cyan-tweaked mask images of FIGS. 3A and 3B are stored in this fashion, in a network repository—outside the data structure that includes the host artwork. These images are accessed at rendering time (across the network, using their URLs) to determine which colors should be applied as fills at different locations.

In a third implementation, the specified fill (or size) of the circles does not depend on the underlying host imagery. In one particular embodiment, for greyscale images, the tweaks are made by circles with black fills (for watermark pattern elements having values between −0.4 and −1.0), and by circles with white fills (for watermark pattern elements having values between 0.4 and 1.0). For color images, the tweaks are made by circles filled with one of two colors, such as cyan for circles of the first group, and magenta for circles of the second group. In this implementation, the sizes of the circles can be scaled in accordance with a user-set strength control. The sizes of the circles may additionally be scaled by factors dependent on the values of the corresponding watermark pattern elements (e.g., 0.75, 0.85, and 0.95, as in the example given above).

The speckling of black and white circles (or cyan and magenta circles) across an image, albeit circles of small size, can raise visibility concerns. In a variant embodiment, the SVG instructions specify an opacity, less than 1.0, for some or all the circles. That is, such circles are partially transparent. The opacity value can be set by the artist, such as by a software parameter or user interface control. Where the host imagery is light in appearance, the reduced opacity of the circles makes them relatively lighter in appearance, compared to the same circles positioned where the host imagery is dark in appearance (where the opacity of the circles makes them look relatively darker in appearance).

Applicant finds it convenient to generate two data structures—one containing vector graphics instructions defining circles making dark tweaks to the artwork, and one containing vector instructions defining circles making the light tweaks. Excerpts from two such data structures follow. (These instructions place vector graphic circle primitives at locations in a 512×512 array, with circles formed at row/column coordinates that are divisible by four. The circles span more than one cell in the array, e.g., with a radius of 1.7 indicating a diameter of 3.4 units, and a radius of 1 indicating a diameter of 2 units. The net result is essentially that of a 128×128 waxel array.)

```
<svg height="512" width="512">
    <rect x="0" y="0" width="512" height="512" fill="white" />
    <circle cx="4.000000" cy="12.000000" r="1.000000" stroke-width="0" fill="#000000" />
    <circle cx="4.000000" cy="36.000000" r="1.000000" stroke-width="0" fill="#000000" />
    <circle cx="4.000000" cy="84.000000" r="1.000000" stroke-width="0" fill="#000000" />
    <circle cx="4.000000" cy="104.000000" r="1.000000" stroke-width="0" fill="#000000" />
    <circle cx="4.000000" cy="200.000000" r="1.000000" stroke-width="0" fill="#000000" />
    <circle cx="4.000000" cy="216.000000" r="1.000000" stroke-width="0" fill="#000000" />
    <circle cx="4.000000" cy="264.000000" r="1.000000" stroke-width="0" fill="#000000" />
    <circle cx="4.000000" cy="368.000000" r="1.000000" stroke-width="0" fill="#000000" />
    <circle cx="4.000000" cy="404.000000" r="1.000000" stroke-width="0" fill="#000000" />
```

```
<circle cx="4.000000" cy="408.000000" r="1.000000" stroke-width="0" fill="#000000" />
<circle cx="4.000000" cy="424.000000" r="1.000000" stroke-width="0" fill="#000000" />
<circle cx="8.000000" cy="20.000000" r="1.000000" stroke-width="0" fill="#000000" />
<circle cx="8.000000" cy="24.000000" r="1.000000" stroke-width="0" fill="#000000" />
...
...
<svg height="512" width="512">
  <rect x="0" y="0" width="512" height="512" fill="black" />
  <circle cx="4.000000" cy="32.000000" r="1.700000" stroke-width="0" fill="#FFFFFF" />
  <circle cx="4.000000" cy="68.000000" r="1.700000" stroke-width="0" fill="#FFFFFF" />
  <circle cx="4.000000" cy="96.000000" r="1.700000" stroke-width="0" fill="#FFFFFF" />
  <circle cx="4.000000" cy="124.000000" r="1.700000" stroke-width="0" fill="#FFFFFF" />
  <circle cx="4.000000" cy="144.000000" r="1.700000" stroke-width="0" fill="#FFFFFF" />
  <circle cx="4.000000" cy="176.000000" r="1.700000" stroke-width="0" fill="#FFFFFF" />
  <circle cx="4.000000" cy="204.000000" r="1.700000" stroke-width="0" fill="#FFFFFF" />
  <circle cx="4.000000" cy="276.000000" r="1.700000" stroke-width="0" fill="#FFFFFF" />
  <circle cx="4.000000" cy="308.000000" r="1.700000" stroke-width="0" fill="#FFFFFF" />
  <circle cx="4.000000" cy="324.000000" r="1.700000" stroke-width="0" fill="#FFFFFF" />
  <circle cx="4.000000" cy="376.000000" r="1.700000" stroke-width="0" fill="#FFFFFF" />
  <circle cx="4.000000" cy="380.000000" r="1.700000" stroke-width="0" fill="#FFFFFF" />
  <circle cx="4.000000" cy="432.000000" r="1.700000" stroke-width="0" fill="#FFFFFF" />
  <circle cx="4.000000" cy="448.000000" r="1.700000" stroke-width="0" fill="#FFFFFF" />
  <circle cx="8.000000" cy="68.000000" r="1.700000" stroke-width="0" fill="#FFFFFF" />
  <circle cx="8.000000" cy="84.000000" r="1.700000" stroke-width="0" fill="#FFFFFF" />
  ...
  ...
```

Figure 4A:
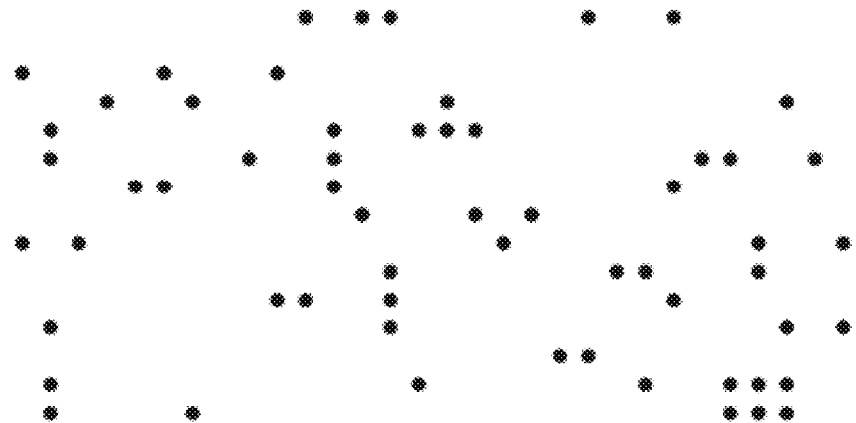
FIGS. 4A and 4B show renderings of exemplary SVG instructions defining first and second groups of vector graphics primitives.
Figure 4B:
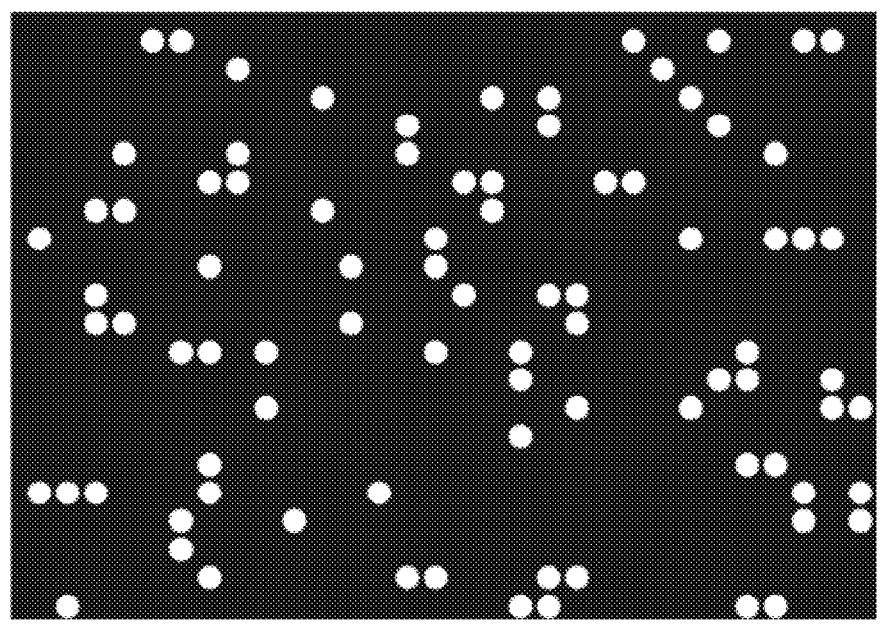

Excerpts from rendering of these vector graphics instructions are shown in FIGS. 4A and 4B. (The fill specification of "#000000" indicates black circles; "#FFFFFF" indicates white circles. The contrasting backgrounds of FIGS. 4A and 4B are simply to highlight the circles; in actual implementation, the backgrounds are transparent—permitting underlaying layers of host artwork to be rendered.)

Each of these two data structures can define a different layer in a vector graphics artwork file. Alternatively, the instructions can be merged into a single layer.

It will be recognized that instructions like the foregoing are readily generated from a software script, based on the calculated watermark pattern array data, together with parameters input from user controls (e.g., for strength, size and opacity).

The detailed first, second and third implementations employ circles of first and second groups, distinguished at least by their fill color. In a fourth implementation, only one such group of circles is employed. For example, a vector graphics image file can be marked only with circles of the first type, darkening local imagery at locations where the watermark pattern array has values between −0.4 and −1.0. Alternatively, such a file can be marked only with circles of the second type, lightening local imagery at locations where the watermark pattern array has values between 0.4 and 1.0. (Such embodiments may be termed "one-tone" arrangements.) The robustness (strength) of the watermark signaling suffers from absence of half of the elements, but in some applications the remaining signal strength is fully adequate.

Embodiments of the present technology enable an artist to encode a given watermark payload within host imagery artwork in a great variety of different ways, providing more freedom in tailoring the finished product than has been possible in raster-based methods. For example:

(a) The artist can control the magnitude of the watermark tweaks. E.g., should a given tweak reduce the luminance at a position by 5? 6? 10? 20? Etc.

(b) Another control is by size of the circles. A given reduction in luminance can be achieved by using a smaller circle (that is relative darker) or by using a larger circle (that is not so dark).

(c) A related degree of control involves defining the darkness/color of the fill. A given reduction in luminance can be achieved by using a darker fill (in a relatively smaller circle) or by using a less-dark fill (in a relatively larger circle).

(d) Similarly, the artist can vary opacities of the fills (which need not all be equal).

(e) Still another degree of control arises from setting the threshold that distinguishes watermark pattern elements for which circles are drawn, vs. those for which no circle is drawn. In the described implementation, circles are drawn for watermark pattern elements having values of −0.4 to −1.0 (and 0.4 to 1.0). But this −0.4 (0.4) value can be user-controlled. The artist can set it to, e.g., −0.6 (0.6), reducing the number of circles. Or the artist can set it to 0, causing a circle to be drawn at every element location in the array (assuming the positive and negative thresholds are set equally, which is not a requirement).

(f) The circles, themselves, are the artist's choice. A variety of other primitives are supported in SVG, such as ellipses, squares and rectangles (with or without rounded corners). And still other shapes can be user-defined. Combinations of shapes can be employed, e.g., circles for the first group of watermark adjustments, and squares for the second group of watermark adjustments.

(g) As shown in FIG. 2A, the circles of the first group can be set to have a size that is different than circles of the second group.

(h) Moreover, within the first (or second) group, there can be circles of different sizes. For example, if the watermark pattern element at a particular location has a value between 0.4 and 0.6, a circle of diameter 0.5 can be drawn there. If the element has a value between 0.6 and 0.8, a circle of diameter 0.75 can be drawn. And if the element has a value between 0.8 and 1.0, a circle of diameter 1.0 can be drawn. The range of watermark pattern element values for which circles are drawn can be quantized into any number of sub-ranges, and a different circle size (or luminance/color) can be assigned to each.

Raster-based image watermarking has a counterpart to (a), above, but to none of the other just-listed design freedoms.

It will be recognized that the various contrast control mechanisms allow watermark strength/contrast (visibility) to be adjusted at press time. A sample sheet of watermarked artwork can be printed, and the resulting print can be tested for watermark strength. If the dot gain or other parameter of the press is above or below expectations, the watermark strength can be adjusted accordingly. If found deficient, the strength can be adjusted upwards by increasing the contrast by any of the noted mechanisms. And vice versa. Raster graphics, in contrast, do not allow such ready adjustment of watermark strength. The embedding process must, essentially, be started anew if such change is required.

The easy editability of the detailed vector graphics approach offers a variety of other benefits.

One is computer system independence. In the prior art, watermark embedding is tightly tied to the particular computer system. In the present arrangement, a watermark can be defined by device-independent instructions—such as the SVG instructions excerpted above—and may be identified by a URL. Any graphic arts system can later make use of such watermark data, regardless of whether the system is based on Linux, Windows, or an Apple operating system.

Another benefit of editability concerns revision of artwork. Often an artist must secure approvals for proposed product artwork, e.g., from a product brand manager. Proposed artwork can be watermarked using a placeholder payload, to secure approval before a final payload is assigned. After approval, and after an identifier is assigned, the watermarked image can be easily revised to substitute watermark layers that encode the final payload, with no evident change to human observers.

A 128×128 waxel block of watermark signal, comprised of primitives colored in accordance with negative and/or positive tweak information, can be applied as a block color fill using tools such as Adobe Illustrator. Such a fill operation tiles the block across the defined canvas area. If the canvas is scaled or rotated, the watermarked fill pattern transforms in scale or rotation with it; no user alignment is required. The tweak colors may be fixed (e.g., cyan and magenta), or they can be functions of the colors of the underlying host imagery (e.g., using tweak tables as described above).

The detailed watermarking arrangements are fully reversible. If an artist wants to remove all watermark signal from a rendered output, the watermark-related layers can be hidden or deleted.

The watermark content of the printed output can be graded simply, e.g., as a count of the number of correctly-printed waxels per square inch.

In addition to the Adobe Illustrator software, there are a variety of other tools for working with vector format artwork (e.g., SVG files). These include Inkscape (and its online counterpart RollApp), BoxySVG, and SVG-Edit.

Although the technology is described in the context of printed artwork, it can be used in other contexts, including electronic imagery and video. For example, web browsers can render SVG files. Likewise with most social media platforms (Twitter, etc.) on mobile devices. A watermark of the sort described herein, added to artwork of video for posting to a web site or social media site, will persist in copies captured from the original, e.g., by screen-capturing. If the watermark has been corrupted, this is evidence that the captured content has been tampered-with. The present technology thus has applicability in authenticating that image or video content has not been altered, e.g., as in deepfake technology.

It will be understood that the 128×128 waxel pattern defined by the present techniques is desirably tiled, edge-to-edge, to span larger expanses of artwork than a single block of such pattern could cover.

Further Elaboration

The following discussion presents certain of the above material in a different light, and introduces further arrangements and modifications.

FIG. 5 is a schematic view of a first encoding arrangement, in which the presence of a dot overlying an area of imagery signifies a "0" bit (or "−1" bit), and the absence of a dot overlying an area of imagery signifies a "1" bit. As before, each area (cell) of imagery can be a single pixel, a patch of several pixels, an area of vector graphics artwork, etc. In watermark-based encoding, each such area is termed a waxel.

In this arrangement, the dot is formed of a single process color ink, here cyan. Cyan appears dark to red light scanners, causing the presence of the cyan dot to reduce reflectance from that area of imagery after rendering. The underlying imagery is here comprised of three process colors. The left image patch has a cyan component of 0.35, a magenta component of 0.45, and a yellow component of 0.55. To darken this patch, to a red light scanner, the intensity of the cyan dot is selected to be stronger than that of the cyan component of the underlying image patch, i.e., greater than 0.35. In this example the dot has a strength of 0.385. (The magenta and yellow inks in the underlying image patch are essentially transparent, i.e., invisible, to red light.) The strength of a dot can be varied by physical means, such as by "screening" so that only 38.5% of the dot area is inked, in aggregate. (Other techniques can less-commonly be employed, such as diluting cyan ink with clear varnish.)

The image patch to the right of FIG. 5 is again comprised of three process inks, having a cyan strength of 0.7, a magenta strength of 0.6, and a yellow strength of 0.5. No dot overlies this patch, so its red light reflection is not diminished.

When rendered into print form, the cyan-emphasized dot overlying the left image patch reduces the red light reflectance from that patch, serving to signal part of a payload (e.g., a "−1" chip of a digital watermark signal). As before, the size of the dot is set to establish a desired reduction in net light reflectance, e.g., from 65% to 63%, or a 2% difference. The absence of a dot overlying the right image patch leaves the red light reflectance from that patch unchanged, serving to signal a complementary payload element (e.g., a "+1" chip of a digital watermark signal).

An image may be virtually divided into thousands of such patches, some of which have dots and some of which don't. Collectively, the dots and absences define a 2D indicia, such as a digital watermark pattern, which may include multiple digital watermark blocks tiled edge-to-edge. (Alternatively, the pattern may define a different type of 2D indicia, such as a linear barcode, a 2D barcode, etc.)

FIG. 6 is a schematic view of a second encoding arrangement, in which the presence of a first type of dot overlying an area of imagery signifies a "1" bit, and the presence of a second type of dot overlying an area of imagery signifies a complementary "−1" (or "0") bit.

The first type of dot is the same as the dot in FIG. 5, i.e., having a cyan component stronger than that of the underlying imagery (e.g., 0.385 vs. 0.35). Such dot causes red light reflection from the left image patch to be reduced. The second type of dot is the opposite. Its cyan component is weaker than that of the underlying imagery. In this case the underlying imagery has a cyan component of 0.7 intensity, and the overlying cyan dot has a strength of 0.63. This causes the red light reflectance from the right patch to be increased, since the cyan dot of strength 0.63 reflects more red light than the underlying cyan of the right image patch, having a strength of 0.70.

Again, an artwork may comprise thousands of such image patches—each overlaid with a dot of the first or second types, collectively defining a binary machine-readable indicia.

FIG. 7 is a schematic view of a third encoding arrangement. This arrangement forms a ternary code, in which each image patch can signal one of three states ("trits")—not just two, i.e., −1, 0 and +1. One state is signaled by reduced reflectance of red light (i.e., overlaid by a dot of increased cyan strength). One state is signaled by increased red light reflectance (i.e., overlaid by a dot of decreased cyan strength). And the intermediate third state is signaled by unchanged red light reflectance (by no overlaid dot, or by an overlaid dot whose cyan strength matches that of the underlying imagery).

Three image patches are illustrated in FIG. 7, which permit 3×3×3, or 27 different signaling states to be encoded. In contrast, if binary signaling is used, three patches permit encoding of 2×2×2=8 different states. The information conveyed by a 2D indicia, such as a watermark, is typically binary in nature. However, it can be error-correction encoded for transmission in a ternary form, as is familiar to artisans. The decoding process applies a complementary operation to extract the original binary information.

The arrangements of FIGS. 5-7, with their use of overlaid cyan dots, effects a commonly-undesirable shift in the coloration of the underlying artwork (i.e., towards cyan). FIGS. 8-10 show fourth, fifth, and sixth arrangements that correspond to FIGS. 5-7. However, instead of using cyan-only dots, the overlaid dots use cyan, magenta and yellow inks.

In the given examples, the magenta and yellow dots strengths are set to match the magenta and yellow strengths in the underlying patches of imagery. Thus, in the left image patch of FIG. 8, the image has a cyan value of 0.35, a magenta value of 0.45 and a yellow value of 0.55, and the overlaid dot has a cyan value of 0.385, a magenta value of 0.45 and a yellow value of 0.55. As can be seen, the magenta and yellow values are unchanged. To a red light scanner, the increased cyan strength in the overlaid dot will cause the patch to reflect less red light (just as in FIG. 5), but the unchanged magenta and yellow values cause the dot to have less of a discoloring effect on the underlying patch than in the arrangement of FIG. 5. Likewise for the fifth and sixth arrangements of FIGS. 9 and 10 (c.f., FIGS. 6 and 7). The dots of these fourth, fifth and sixth arrangements are thus cyan-adjusted counterparts of the local image patch colors.

The dots overlaid in FIGS. 8-10 change the colors of the underlying image patches (although less-so than the dots of FIGS. 5-7). Importantly, they also change the human-perceived luminance of each image patch. As noted earlier, the human eye is more sensitive to luminance change than color change. Accordingly, it is sometimes desirable to reduce the change in luminance caused by the overlaid dots, even if it means increasing the change in color. FIGS. 11, 12 and 13 illustrate seventh, eighth and ninth encoding arrangements that mitigate luminance changes.

As indicated above, the apparent luminance (brightness) of an image patch to human viewers is a weighted combination of the three primary colors red, green and blue according to the formula:

$$L=0.2126R+0.7152G+0.0722B$$

Cyan is the complement of red, magenta is the complement of green, and yellow is the complement of blue, so this equation, expressed in terms of cyan, magenta and yellow, becomes:

$$L=0.2126(1-C)+0.7152(1-M)+0.0722(1-Y)$$

or $$L=1-0.2126C-0.7152M-0.0722Y$$

Considering the left image patch in FIG. 11, its luminance is:

$$L=1-0.2126(0.35)-0.7152(0.45)-0.0722(0.55)=0.564$$

We would like to increase the cyan value, e.g., to 0.385, to reduce the red light reflectance of this image patch, while keeping the human-perceived luminance essentially unchanged. To do this, we decrease the magenta and/or yellow values to counteract the reduction in luminance caused by increasing cyan. The resultant color shift in FIG. 11 is greater than in counterpart arrangement FIG. 8, but the luminance change is much less; essentially nil. Thus, the presence of encoded data is less apparent to human observers in the arrangement of FIG. 11 than in the arrangement of FIG. 8.

The decreased values of magenta and yellow shown in the dot of FIG. 11 are illustrative placeholders. It will be recognized that the change in luminance of the left image patch caused by overlaying a dot having a cyan component of 0.385 can be counteracted by a virtually infinite number of combinations of different adjustments to magenta and yellow.

Applicant's preferred procedure for determining the component colors of the overlaid dot, based on the colors of the host image patch and the desired change in red light reflectance, is detailed in pending patent application 62/933,042, filed Nov. 8, 2020, which is incorporated by reference, and is also bodily attached as an appendix to priority application 62/938,872. Additional such disclosure is found in application Ser. No. 16/703,601, filed Dec. 4, 2019, and 63/029,297, filed May 22, 2020. These applications are also incorporated herein by reference.

The algorithm just-described, of adjusting red reflectance by a desired amount by adjusting cyan (or black), and compensating for luminance change by adjusting magenta and/or yellow in an opposite direction, introduces changes into the a* and b* components when the color is considered in the CIELAB L*a*b* color representation. This can lead to an undesired visible color shift. A variant process seeks a different balance between (a) achieving a desired change in red reflectivity, (b) maintaining unchanged luminance, and (c) avoiding visible color shift.

The variant process, detailed in the 63/029,297 application, is an iterative process. In L*a*b*, cyan can be considered to correspond to an a* value of −1 and a b* value of −1. Target values of a* and b* are set based on the desired change in red reflectivity, relative to the artwork (initial) values of a* and b*. Gradients are estimated for L*, a* and b* relative to cyan, magenta and yellow, at the initial artwork color. From these gradients a plane can be located, in CMY space, that is orthogonal to the L* gradient. Within this plane a vector direction, in CMY, is determined that moves closer to the target a*b* values. The values of CMY are adjusted, along the direction of this vector, by an amount dependent on the distance to the target a*b* location. A check is made that this adjusted CMY location is still within the available gamut (the printer ICC profile is used). The L* value at this adjusted CMY location is then checked, and compared against the original L* value of the artwork. An adjustment is then made, by moving in CMY space in a direction that changes L* back towards the original L* value of the artwork, while minimizing the changes to a*b*. These steps repeat (e.g., next estimating gradients for L*,a*,b* at the current location, etc.), inching in CMY space towards the target location that changes red reflectivity by the desired amount, while alternately correcting consequent drift in L* and a*b*.

Applicant terms the earlier detailed procedure, and this just-detailed variant, "CME," for Color Managed Embedding. This procedure modifies artwork to include a code that can be detected by a red light scanner, while minimizing perceptibility of the code to a human's visual system. The detailed CME procedure works with "process" colors: cyan, magenta, yellow and black. Although black ink has not been mentioned in the just-discussed arrangements, it can be an additional component of the host imagery and/or the overlaid dot in all of the detailed arrangements, and can serve to change the red light reflectance of an image patch.

One particular implementation of the CME method begins by establishing a desired change in red light reflectance of a patch of artwork, to effect a desired element of signal encoding. For example, it may be desired to change red light reflectance (e.g., at 670 nm) by +10% compared to the unencoded artwork. The strength of cyan (or black) is adjusted downwardly, e.g., in an overlaid dot, to achieve this 10% increase in red light reflectance.

Reducing the cyan strength alters the luminance L* of the patch, brightening the patch. (L* is one of three components of color representation in the L*a*b* color space.) A next operation increases the magenta strength of the patch, e.g., by the overlaid dot, so that net change in patch luminance is zero. Yellow can then be adjusted to reduce change in the a* direction caused by the previous adjustments, and magenta can be further adjusted to keep L* unchanged.

The CME technology is employed in certain embodiments to generate two arrays (planes) of color "tweak" data from host imagery. One "negative" plane is a color-shifted counterpart image with colors adjusted to increase cyan and/or black, to effect a given change in red light reflectance (e.g., −10%), while the other "positive" plane is a counterpart color-shifted image adjusted to decrease cyan and/or black to effect an opposite change in red light reflectance (e.g., +10%)—both changing luminance minimally (e.g., less than 1.5%) if at all. To encode one signal state (e.g., a positive chip) at a given location in the host imagery, a dot or other mark having the color of the positive tweak plane (channel) at that location can be placed in the host imagery. To encode a complementary signal state (e.g., a negative or zero chip), a dot or mark whose color is taken from the negative tweak plane at that location can be placed in the host imagery.

The foregoing approaches can be used in the FIG. 12 arrangement. For example, the left image patch is overlaid with a dot of one color, selected from a corresponding location in the negative tweak plane, while the right image patch is similarly overlaid with a dot of a different color, selected from a corresponding location in the positive tweak plane. The arrangement of FIG. 13 is similar, but provides ternary embedding, with three different twits respectively represented by: (1) a dot colored in accordance with the negative tweak plane; (2) no dot; and (3) a dot colored in accordance with the positive tweak plane.

In the just-discussed arrangements, the signal encoding is effected by a dot or no dot. Where present, a dot changes red light reflectance by a fixed amount, such as +10% or −10%. This is useful, e.g., when the signal to be encoded is a binary (or ternary) signal—having only a few possible states.

Sometimes, however, the signal to be encoded has a continuous form. For example, the signal may comprise an ensemble of dozens of spatial sinusoids (e.g., a spatial registration signal), summed in weighted fashion with a binary information signal. Such a composite signal may be scaled to have values that range continuously between −1 and +1. While such a signal may be quantized into just a few discrete states (e.g., 2, 3, 4 or 5), fidelity of the signal is enhanced by maintaining the full (or a fuller) range of variation.

Continuously-variable information signals can be encoded using the just-discussed positive and negative planes of image tweaks. For example, to encode an information element having a value of +0.7 at a location, a dot color can be chosen that is 70% of the way towards the positive image plane tweak color, from the host image color, at that location. Put another way, the cyan, magenta, yellow and black components for an encoded dot are each a sum of (a) 70% of the tweak component in that positive image plane tweak channel, and (b) 30% of the host component in that color channel.

FIG. 14 illustrates such an arrangement. At the leftmost image patch, an information signal value of −0.85 is to be encoded. A dot that is 85% of the way between the host image color components and the negative image tweak components (shown in the leftmost dot of FIG. 13) is used. Thus, the cyan component of the dot is 85% of the way between 0.35 (the host image) and 0.385 (the negative tweak cyan component). Likewise, the magenta component of the dot is 85% of the way between 0.45 (the host image) and 0.42 (the negative tweak magenta component), and the yellow component of the dot is 85% of the way between 0.55 (the host image) and 0.54 (the negative tweak yellow component).

Similarly, the middle image patch in FIG. 14 is to be encoded with an information signal value of 0.3. In this case the positive image tweak components for that location of the host imagery are consulted, and dot components are set to 30% of the way between the host image and such positive image tweak components. In like fashion, the rightmost image patch is to be encoded with an information signal value of 0.62, so the dots components are set to a 62% weighting of the positive tweak component values for that location, plus a 38% weighting of the host image components.

FIG. 15 shows a similar arrangement but not using CME. Instead, a full negative tweak (i.e., of value 1.0) is represented by a positive 10% change in cyan value, with the other color channels unchanged. (FIG. 15 is kin, in this respect, to the arrangements of FIGS. 8-10.) Likewise, a full positive tweak is represented by a −10% change in cyan value, with the other color channels unchanged. In such case, a continuous-tone information signal of value −0.85 is represented by a dot having cyan strength increased 85% towards the negative tweak cyan value from the host cyan value (i.e., to 0.35*1.085=0.38). Magenta and yellow components of the dot are unchanged from the host imagery.

Similarly, in the middle image patch in FIG. 15, the cyan component of the dot has a value 30% of the way towards a full negative tweak of 10%, or a 3% reduction below the value of the host image cyan component. Similarly, in the rightmost image patch in FIG. 15, the cyan component has a value 6.2% below the value of the host image cyan component.

While such continuous variation of encoding strength finds utility with encoding methods that produce continuous values, such approach additionally—and alternatively—finds utility when it is desirable to locally vary the strength of the information encoding for aesthetic or other signaling reasons. For example, host artwork may offer good camouflage for signal embedding changes in certain areas (e.g., a region of host imagery depicting a pile of autumn leaves), while offering poor camouflage for signal embedding changes in other areas (e.g., a region of host imagery depicting a sky of uniform blue). The magnitude of the reflectance change in the former area can be increased to enhance encoded signal robustness (strength), while the magnitude of the reflectance change in the latter area can be decreased to avoid visible speckling of different colors in the sky.

In one such embodiment, each encoding location within host imagery is assigned a data hiding metric between 0 and 1.0, indicating a relative ability of the location to conceal alteration. One simple metric is a relative measure of high frequency content within a neighborhood around the location (e.g., a 5×5 waxel area). A metric of 0 may indicate a perfectly flat neighborhood of imagery, having no spatial frequency content above one cycle per degree at a viewing distance of 18 inches. A metric of 1.0 may indicate a chaotic neighborhood of imagery, having more than a threshold magnitude of spatial frequency content above one cycle per degree at that viewing distance. The metric is used to scale the degree of red light reflectivity change to be effected at that location. At locations where the metric is smaller, a smaller change is made (e.g., as with the continuous-tone value of 0.3 in the earlier example). At locations where the metric is larger, a larger change is made (e.g., as with the continuous tone value of −0.85 in the earlier example).

(Naturally, a metric based on high frequency image content is just one alternative. More sophisticated models of human visual sensitivity can be employed, e.g., also based in part on color, edges and/or brightness, and can be used for the data hiding metric.)

FIG. 16 more particularly details an embodiment of the above-referenced eighth encoding arrangement. Two color-shifted counterparts of the host imagery are depicted. One is produced by the CME procedure to define an array of colors with increased cyan and/or black to change the red light reflectivity of the host image in one direction (with minimal change to luminance), and the other is similarly-produced to define an array of colors with decreased cyan/black to change red light reflectivity in the opposite direction (with minimal change to luminance).

For the avoidance of doubt, it should be understood that the color-shifted counterparts of the host image, which form these positive and negative color tweak images, need not be defined by a linear process that is invariant across the host image. That is, a linear transform that describes the values of the positive tweak color components as a function of the host image color components, at one location in the host image, may not similarly describe the values of the positive tweak color components at a second, different location in the host image. However, in the aggregate, a human viewer would recognize that each such color-shifted counterpart to the host image is a derivative image formed from the host image, e.g., with spatially corresponding contours and textured areas, and not an unrelated image.

In the FIG. 16 embodiment, a set of dots formed with colors selected from the positive tweak image plane ("+1") are applied to the host image to encode +1 information markings, and a complementary set of dots, with colors selected from the negative tweak image plane ("−1") are applied to the host image to encode −1 information markings. The selected dot colors are outlined in bold in the "+1" and "−1" tweak image planes.

Figure 17:
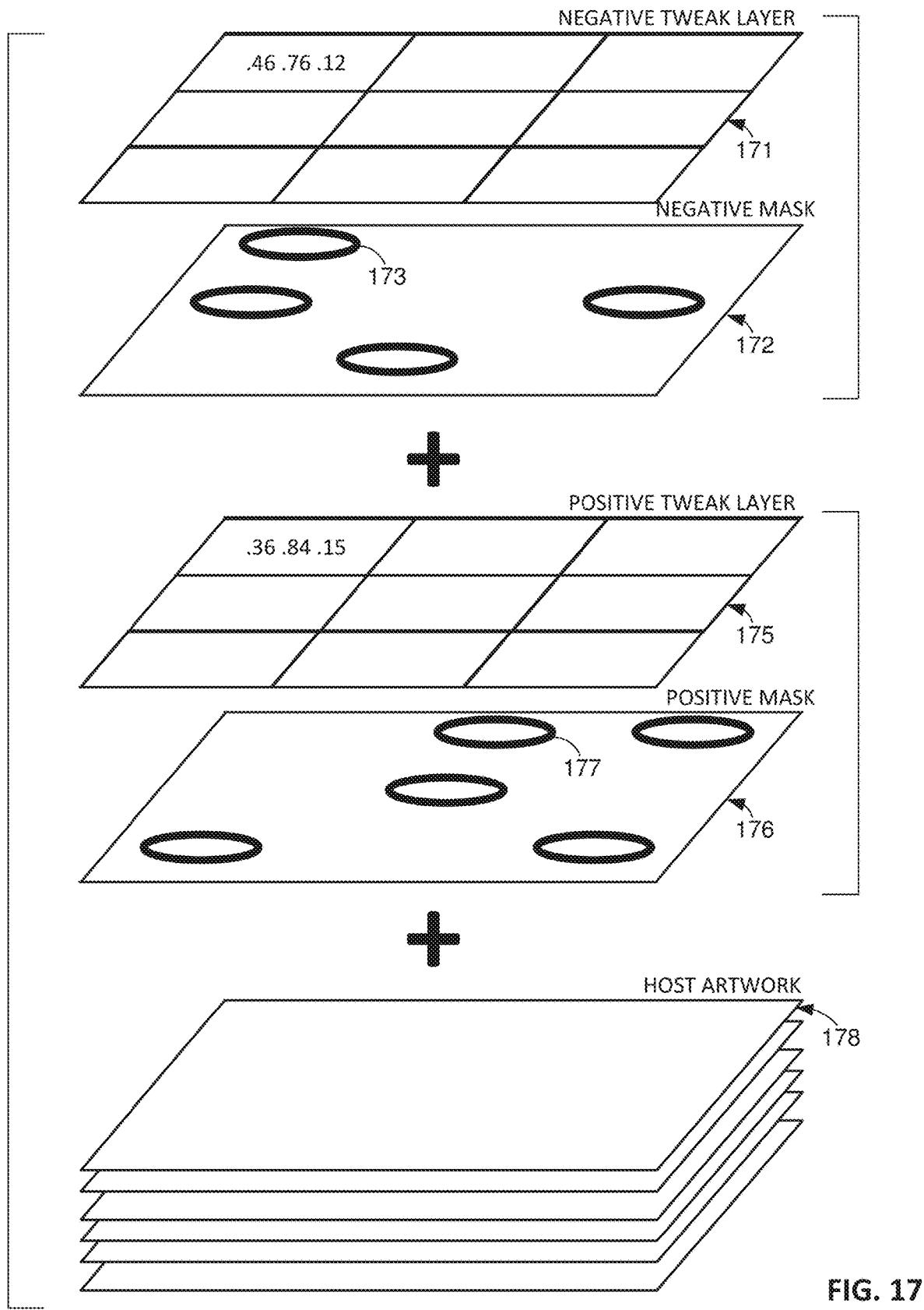
FIG. 17 shows how masking can be achieved with differently-tinted tweak layers to achieve an effect like that shown in FIG. 16.

FIG. 17 illustrates a particular implementation, in a vector graphics data structure. A negative tweak layer 171 is included as one layer in the data structure and defines an array of color tweaks, e.g., determined by the CME procedure, including increased cyan and/or black. (Color component values for only one waxel are shown, for clarity of illustration.) This negative tweak color layer is paired with an associated layer 172 that serves as a negative shape mask. The negative shape mask 172 includes vector graphics primitive shapes 173 (e.g., dots) at locations where the host imagery is to be encoded with a −1 datum. A graphics program, such as Adobe Illustrator, uses the latter layer to mask the former, yielding a spatially-distributed set of primitives colored per negative tweak data for combining with the host imagery, causing red light reflectance at such areas to be reduced A positive tweak layer 175 is included as a further layer in the data structure and defines an array of color tweaks derived from the host image colors (e.g., again determined in accordance with the CME procedure), including decreased cyan and/or black. This positive tweak color layer is paired with an associated layer 176 that serves as a positive shape mask. This mask layer again includes vector graphics primitive shapes 177 (which may be of the same sort as included in layer 172, or different) at locations where the host imagery is to be encoded with a +1 datum. Again, a graphics program uses layer 176 to mask the positive color tweak layer 175, to produce a spatially-distributed set of primitives for combining with the host imagery, causing red light reflectance at such areas to be increased.

Although included in a vector graphics data structure, it should be understood that the illustrated layers need not, themselves, be vector graphics. The host artwork 178, for example, may comprise a raster image (e.g., a TIF image), or may include both vector and raster elements (e.g., text defined by vector graphics, combined with one or more R/G/B raster photograph images—possibly having different DPI resolutions). Likewise, the color tweak layers may be raster images in certain embodiments.

Reference was earlier-made to achieving continuously-variable tweaks, e.g., for continuous tone encoding, or for scaling embedded signal strengths in accordance with local data hiding capacity of the host imagery. In still other embodiments, the color components of the dots are not adjusted to effect such continuously-variation of the red light reflectivity. Instead, the sizes of the dots are varied. The positive color tweak (e.g., CME-determined) for a given location in the host image can establish the color composition of a relatively smaller dot to effect a relatively smaller change in red light reflectivity, and can establish the (same) color composition of a relatively larger dot to effect a relatively larger change in red light reflectivity.

Figure 18:
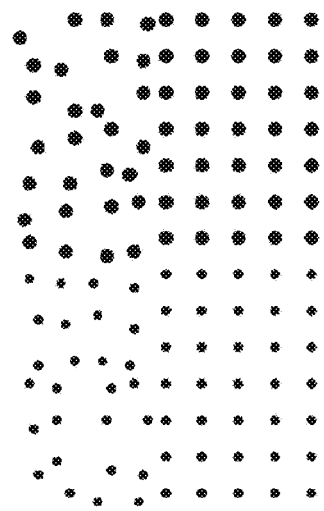
FIG. 18 shows circle primitives of different sizes, arrayed in a regular 2D pattern, and in a stochastic pattern.

FIG. 18 shows, in the lower left, an array of relative smaller dots, and in the lower right an array of relatively larger dots.

FIG. 18 also shows, in the upper left and upper right regions, that the dots (or other primitives) need not fall on vertices of a regular square lattice. Instead, the centers of the dots can be placed at a pseudo randomly-established offsets from such lattice points. This can sometimes be desirable to avoid moiré and other effects due to use of strictly periodic elements.

Figure 19:
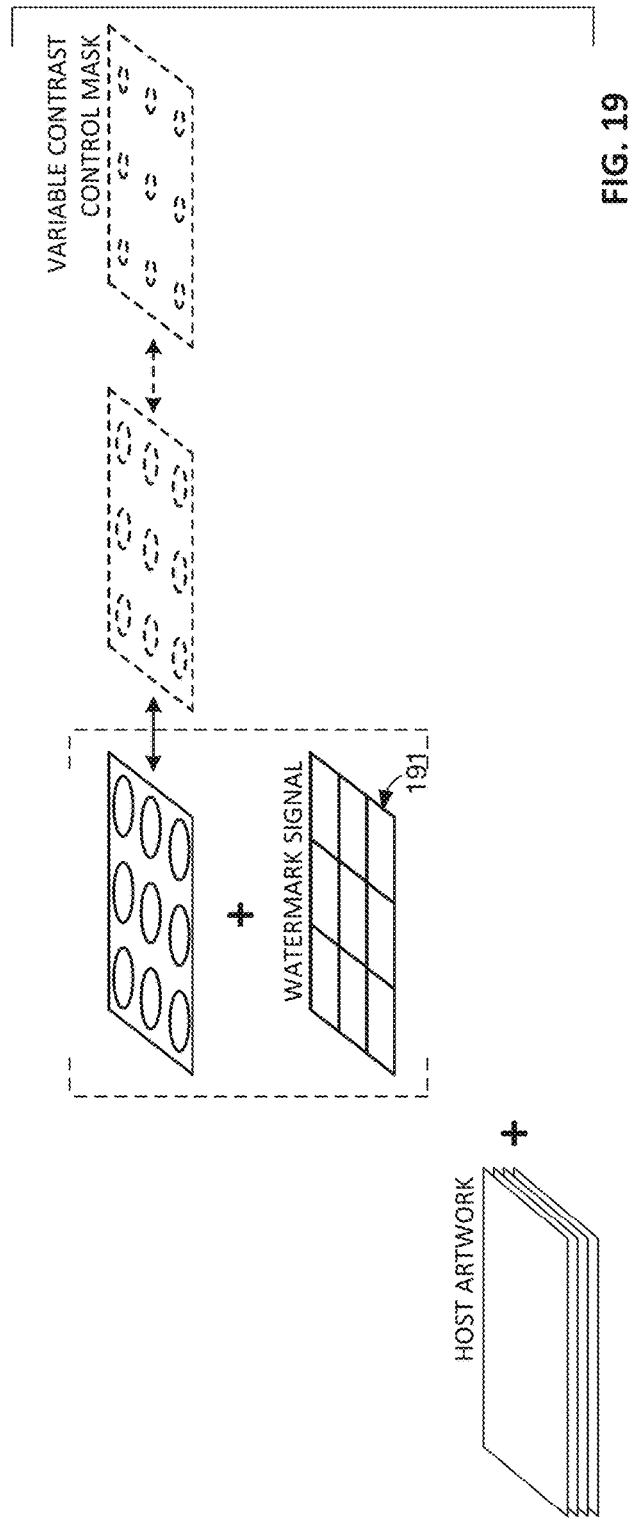
FIG. 19 illustrates how signal strength conveyed by overlaid primitives can be made larger or smaller by changing the size of applied masks.

FIG. 19 illustrates an embodiment in which the strength of encoding applied to host artwork is controlled by selection of a masking pattern to a watermark signal (or other signal-carrying pattern), where the masking pattern has elements of larger or smaller sizes. Such arrangement can be employed to vary the contrast of the marking (encoding) pattern—stronger or weaker—as the application may require. (Each such mask may be defined as a single graphic primitive within a single defined area, with associated instructions to replicate that combination to span an array of M×N location. Positive and negative color tweak layers may use masks of the same or different sizes.)

In the FIG. 19 embodiment the watermark signal is defined by a signal pattern, in layer 191, comprised of contrast or color variations encoding the desired payload. This pattern may comprise an array of black and white squares (or black and transparent squares, or cyan and white squares, or cyan and transparent squares, etc.). Alternatively, layer 191 may comprise a greyscale information-carrying pattern, e.g., with squares having an average greyscale value of 128 (out of 255) with a distribution of other greys around this average value. (A variety of such signal-carrying patterns are detailed in applicant's previously-published works, such as U.S. Pat. No. 6,590,996 and publications 20170024840 and 20190332840. These documents are incorporated herein by reference.)

Figure 20D:
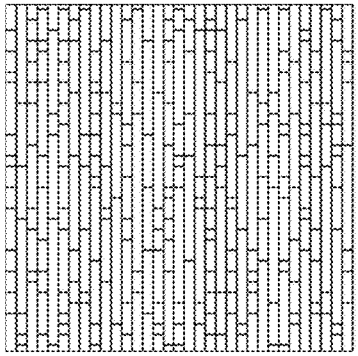
FIGS. 20A through 20H show different signal-carrying binary signals which can be used, e.g., as masks (as in FIG. 17).
Figure 20C:
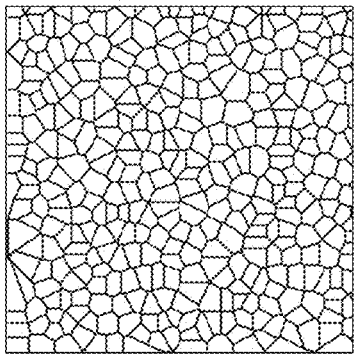
Figure 20B:
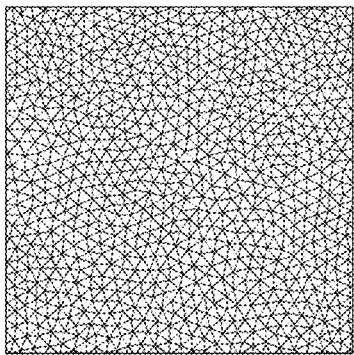
Figure 20A:
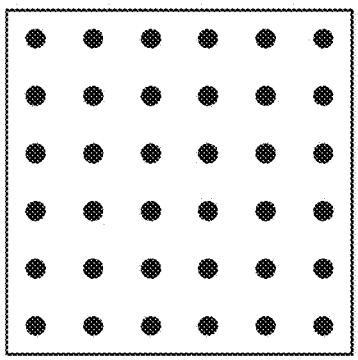
Figure 20H:
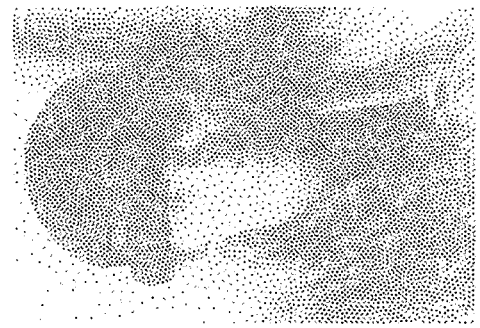
Figure 20G:
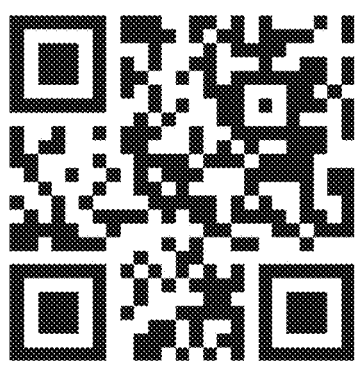
Figure 20F:
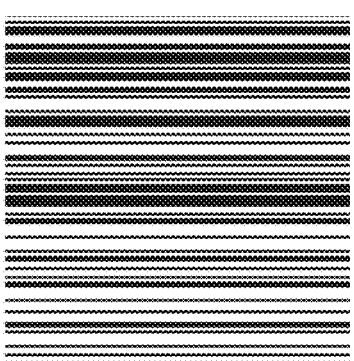
Figure 20E:
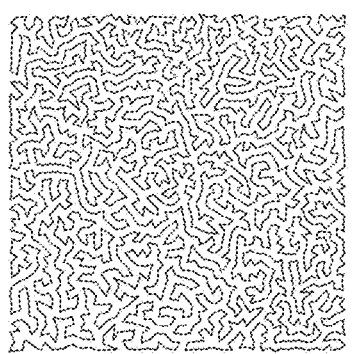

The masking pattern of FIG. 19 need not be a regular array of dots (e.g., FIG. 20A). In addition to arrays of primitives of other shapes, the masking pattern can take the form of a second signaling pattern that encodes additional information (or encodes information partly or wholly redundant of the payload of the watermark in layer 191). Examples include a Delaunay triangulation pattern based on an array of sparse dots representing maxima of a continuous-tone watermark signal (FIG. 20B), a corresponding Voronoi pattern (FIG. 20C), a bricks pattern having the noted array of sparse dots as vertices (FIG. 20D), a traveling salesman pattern based on the noted array of sparse dots (FIG. 20E), a 1D barcode (FIG. 20F), a 2D barcode such as a QR code (FIG. 20G), or a stipple dot rendering of a greyscale image (FIG. 20H). More information on the patterns of FIGS. 20 B-E and H can be found in patent application Ser. No. 16/435,164, filed Jun. 7, 2019 (published as 20190378235), the disclosure of which is incorporated herein by reference.

An ID or other information conveyed by this second signaling pattern can serve, e.g., for product identification or counterfeit deterrence.

FIG. 21 further illustrates aspects of the technology described above. The upper left shows a negative tweak color layer 211 for a food package (i.e., color-shifted towards cyan, with increased cyan and diminished magenta and/or yellow, per the CME procedure). A greatly-enlarged excerpt from this negative tweak layer is shown to its right.

The middle left shows a positive tweak color layer 212 for the food package (i.e., color-shifted away from cyan, with diminished cyan and increased magenta and/or yellow, per the CME procedure). Again, a greatly-enlarged excerpt from this positive tweak layer is shown to its right.

The bottom left shows a watermarked package 213 incorporating vector primitives colored per the negative and positive tweak color layers. A much-greatly-enlarged excerpt is shown to its right.

As noted, this excerpt in the lower right includes primitives (dots) colored per the negative and positive tweak color layers 211, 212. There are six different varieties of dots. There are positive-color dots of small, medium and large size. And there are negative-color dots of small, medium and large size. The small dots have a radius of 2/9 waxel. The medium dots have a radius of a third of a waxel. The large dots have a radius of 4/9 waxel. Additionally, some waxel regions have no dot.

Such arrangement is achieved by generating a continuous-tone watermark signal having waxel values ranging from −1.0 to 1.0, and quantizing it into seven ranges:

| | |
|---|---|
| A: | 1.0 to 0.6 |
| B: | 0.6 to 0.43 |
| C: | 0.43 to 0.1 |
| D: | 0.1 to −0.1 |
| E: | −0.1 to −0.43 |
| F: | −0.43 to −0.6; and |
| G: | −0.6 to −1.0. |

Waxels in range A are marked by high contrast positive dots, i.e., large dots taken from corresponding locations in the positive tweak layer 212. Waxels in range B are marked by mid-contrast positive dots, i.e., medium dots taken from corresponding locations in the positive tweak layer. Waxels in range C are marked by low-contrast positive dots, i.e., small dots taken from corresponding locations in the positive tweak layer.

At the opposite end of the range, waxels in range G are marked by high contrast negative dots, i.e., large dots taken from corresponding locations in the negative tweak layer 211. Waxels in range F are marked by mid-contrast negative dots, i.e., medium dots taken from corresponding locations in the negative tweak layer. Waxels in range E are marked by low-contrast negative dots, i.e., small dots taken from corresponding locations in the negative tweak layer.

Waxels in the middle range, i.e., having values near zero, are not marked with a dot.

Naturally, the use of seven ranges for quantization, A-G, is arbitrary. A greater or smaller number can be used. The numeric span of each of the ranges can be equal. Alternatively, as in the illustrated case, different ranges can have different spans. The positive and negative ranges can be symmetrical (as here), or not.

Host artwork, such as layer 213 in FIG. 21, is sometimes provided at a much higher resolution than is required for printing, e.g., 800 dpi. The color tweak layers 211 and 212, in contrast, need only provide one color for each waxel. Waxels may be overlaid at resolutions of 75×75, or 150× 150, waxels per inch. Thus, the color tweak layers can be provided at lower resolutions, such as 75 of 150 dpi. This can effect a significant economy in the resulting file size.

Figure 22:
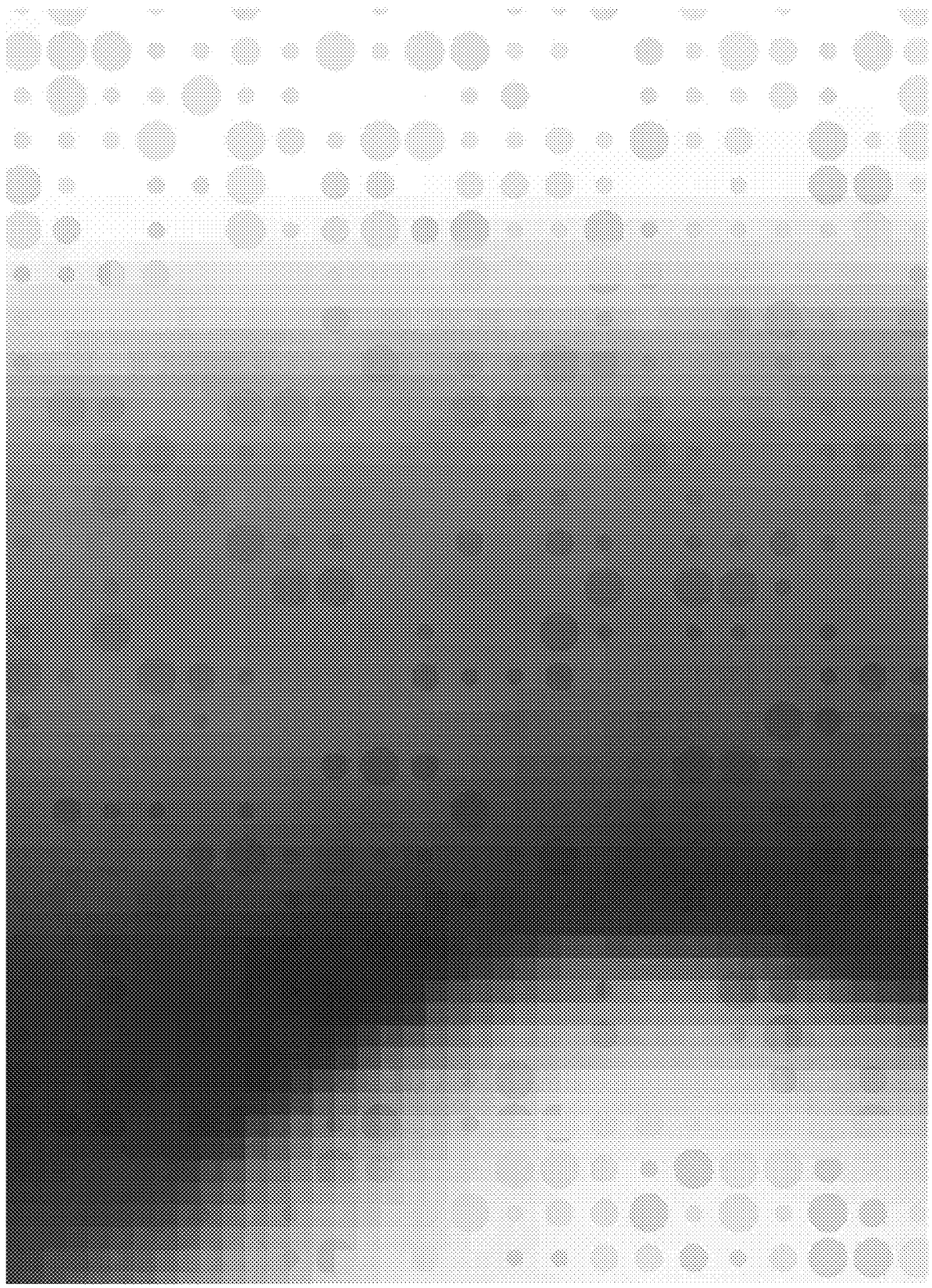
FIG. 22 shows an enlarged pattern of colored vector graphic primitives, conveying a plural bit watermark signal, overlaid on host artwork.

FIG. 22 is a still-greater enlargement from the marked package 213 of FIG. 21. As can be seen by the "jaggies" evident in the lower part of the illustration, the underlying artwork is rasterized, such as a photo image defined by pixels of different R/G/B values.

Figure 23:
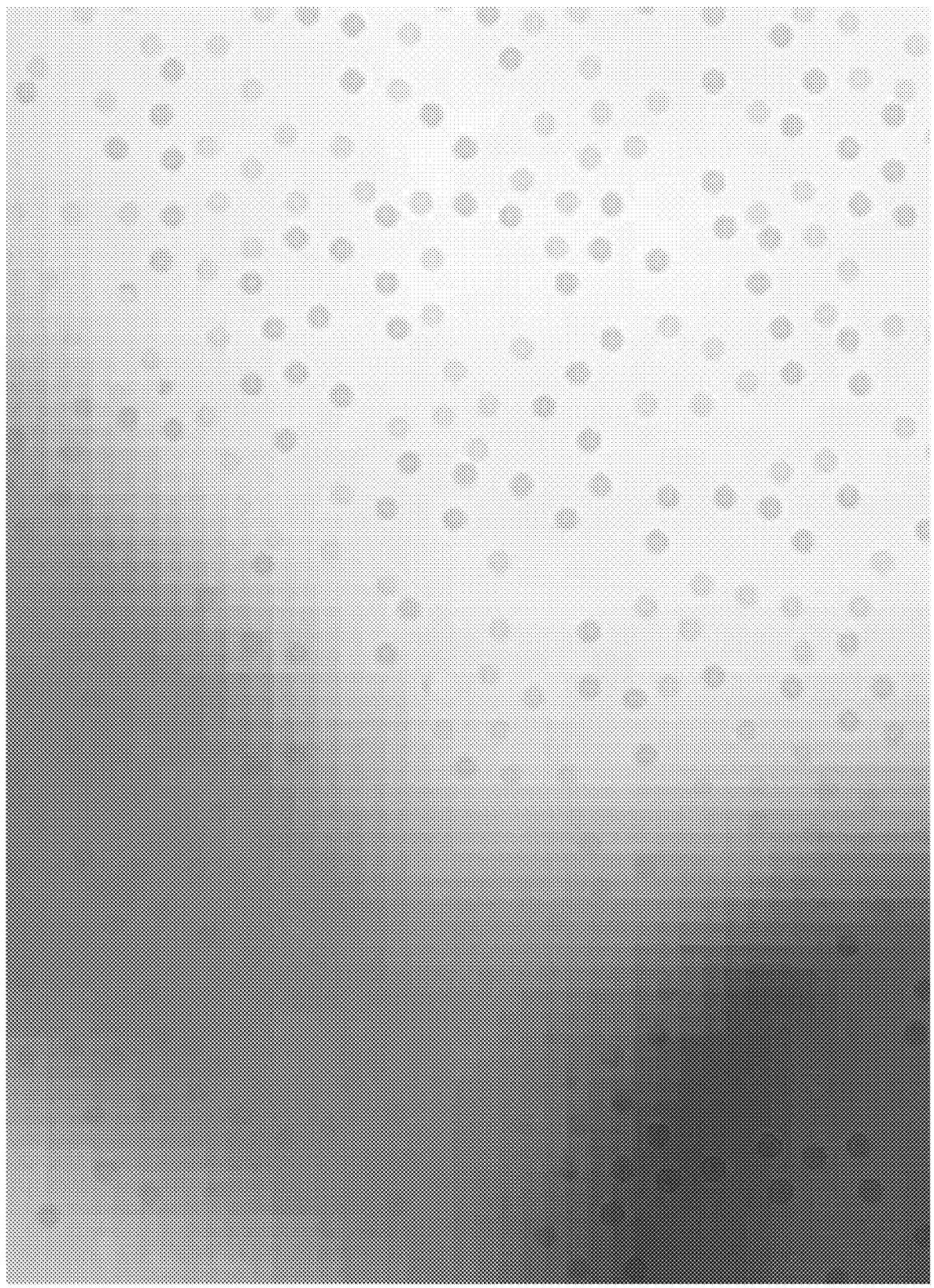
FIG. 23 is similar to FIG. 22, but showing a different pattern, with stochastic placement of the primitives.

FIG. 23 is a greatly-enlarged excerpt from another marked package. In this example, all the dots are the same size. However, they are stochastically placed. The center of each dot is within a square region corresponding to a waxel, but the placement of each dot center is pseudo-randomly determined.

Figure 24:
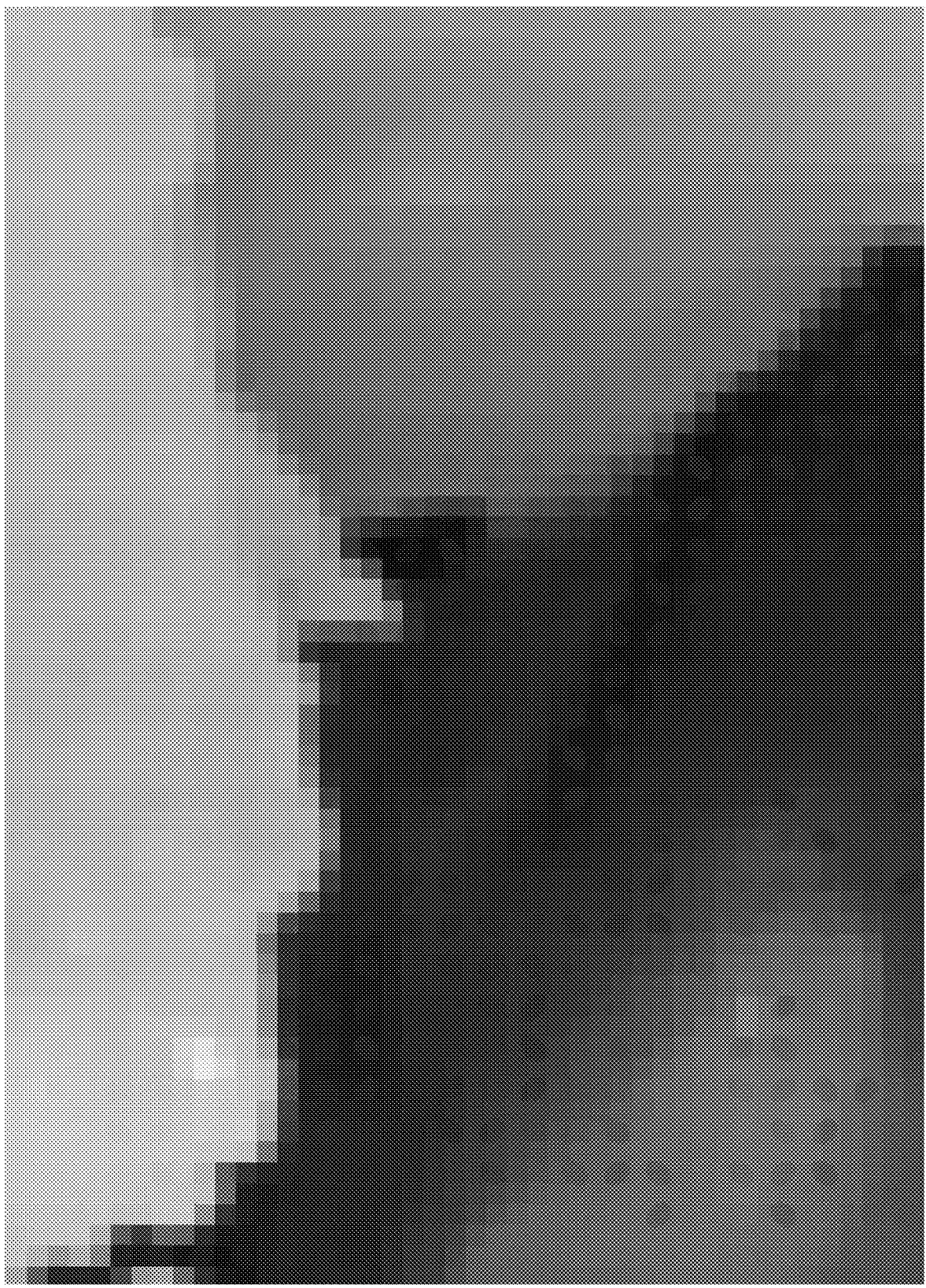
FIG. 24 is similar to FIG. 22, but showing a different pattern, in which the primitives are ellipses oriented at different angles.

FIG. 24 is a greatly-enlarged excerpt from still another marked consumer packaged good. In this example the primitives are ellipses, filled with colors selected from the negative and positive tweak layers 211, 212, in accordance with the digital signal to be encoded. The ellipses alternate between two orientations (northeast-southwest, or northwest-southeast) at successive waxel positions along horizontal rows and along vertical columns.

Figure 25:
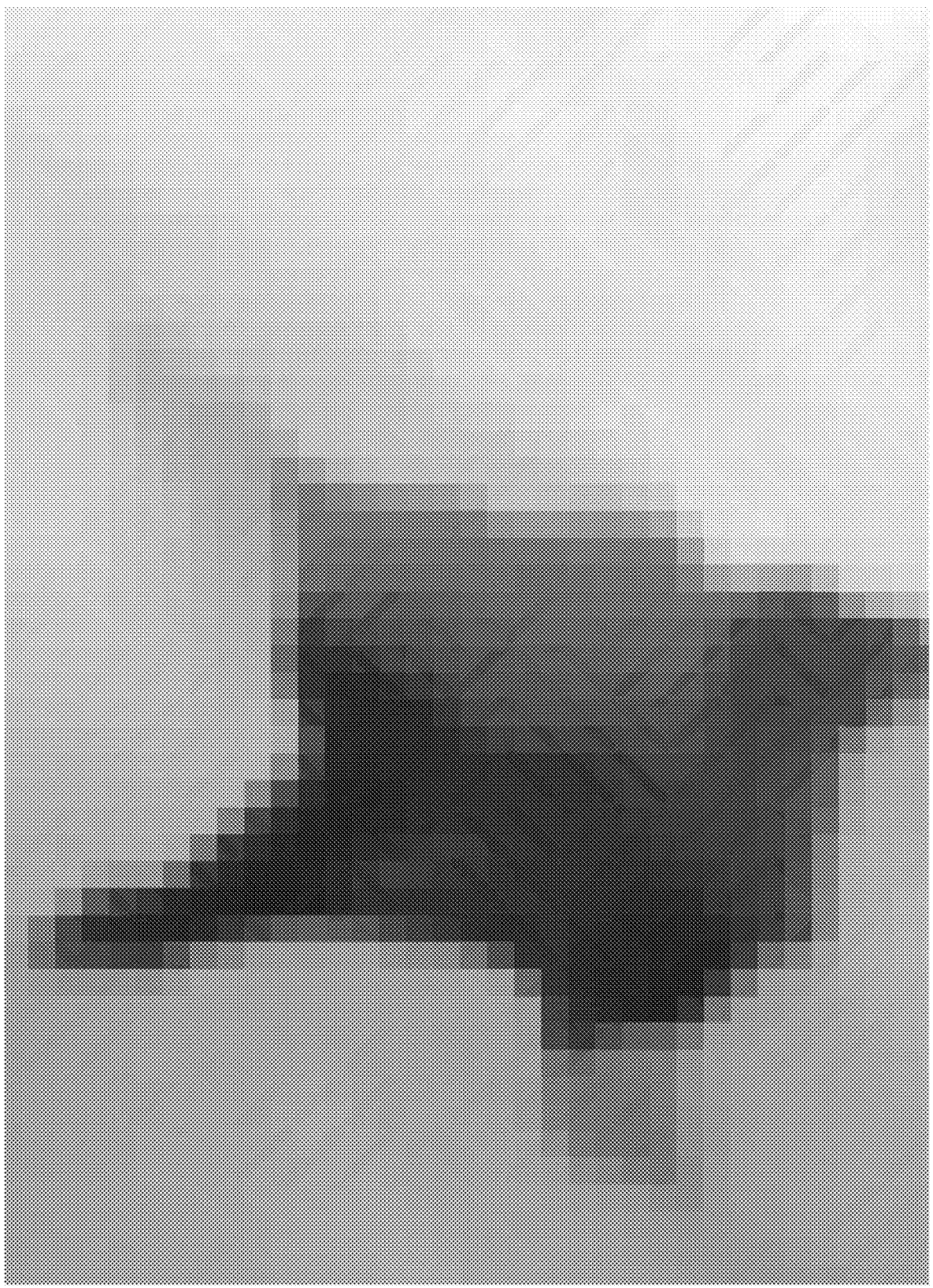
FIG. 25 is similar to FIG. 22, but showing still another pattern.

FIG. 25 is a greatly-enlarged excerpt from yet another marked package. In this example, each waxel of negative value is represented by a short line excerpt colored in accordance with a corresponding location in the negative tweak channel 211, while each waxel of positive value is represented by a short line excerpt colored in accordance with a corresponding location in the positive tweak channel 212. The lines colored with negative tweak colors are oriented northeast-southwest, while the lines colored with positive tweak colors are oriented northwest-southeast. Referring back to FIG. 17, this arrangement can be achieved by using lines oriented northeast-southwest as the primitive shapes 173 in the negative shape mask 172, and by using line segments oriented northwest-southeast as the primitive shapes 177 in the positive shape mask 176. (If examined closely, FIG. 25 and other figures will be found to have some rendering anomalies, which are not belabored.)

Figure 25A:
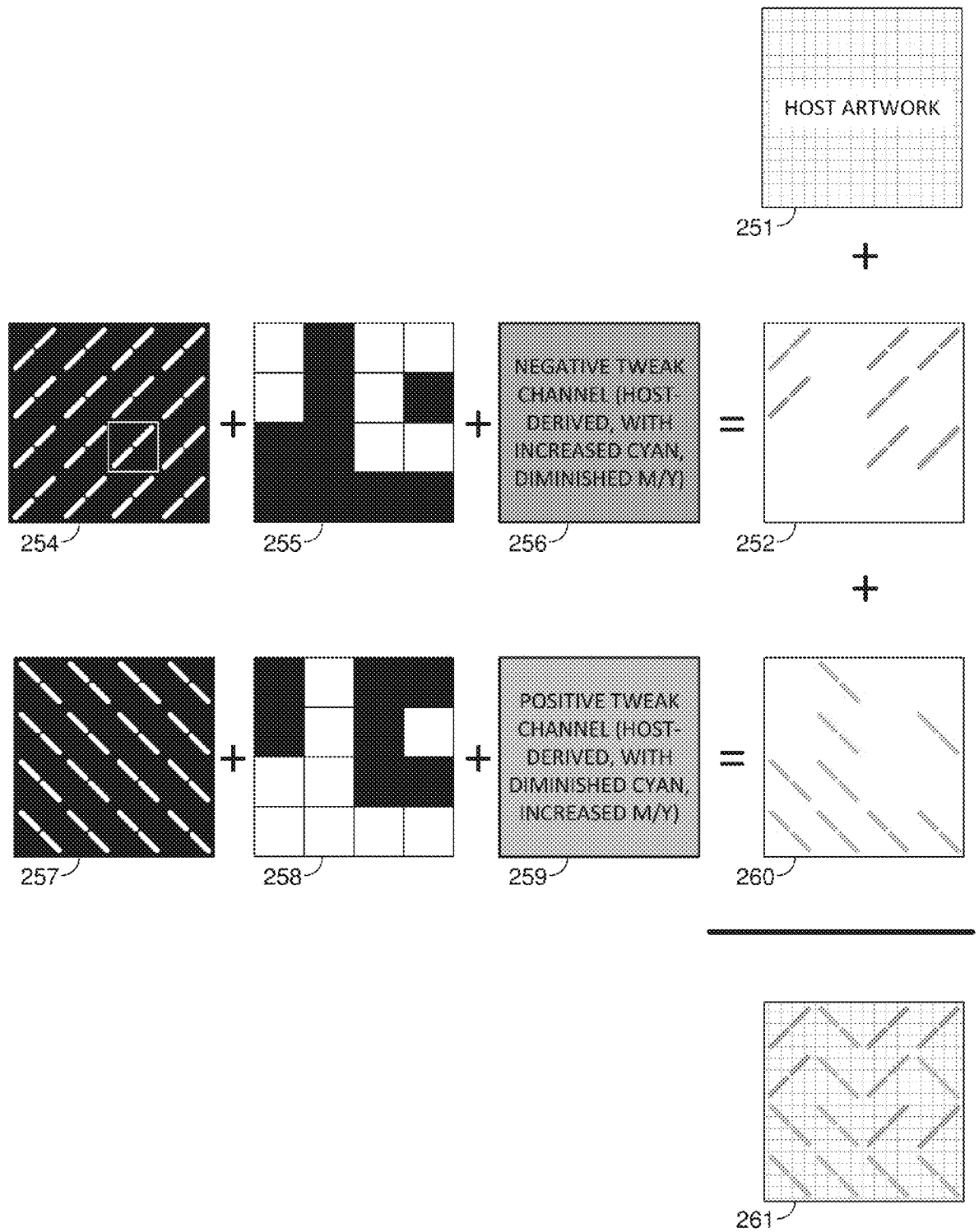
FIG. 25A details a procedure for generating the encoded imagery shown in FIG. 25.

FIG. 25A graphically illustrates the masking (transparency masking) and superposition of layers that results in encoded artwork like FIG. 25. The composition starts with host artwork 251, as a back layer. On top of this is added a layer of northeast-inclined line excerpts 252 that are colored per the negative tweak channel. This layer 252 is itself a composite of several layers. First is a shape pattern 254 of northeast-inclined line excerpts. Each excerpt has two segments, which collectively diagonally span a single waxel, shown by the small white square overlay. (The use of two segments, with a gap in between, is useful in later embodiments in which the waxel is diagonally crossed in both directions, in which case the gap assures that one segment doesn't overlie another, which would lead to an imbalance in matched inking.) Next is a binary signal block 255 in which "−1" elements are white and "+1" elements are black. (Block 255 may be termed a negative signal block.) There are typically an equal number of +1 and −1 elements in the block, and each is usually centered-on and spans a waxel. Then comes a negative tweak color layer 256, derived from the host image and color-shifted towards cyan (i.e., an increase in cyan, with a luminance-offsetting decrease in magenta and/or yellow). This negative tweak color layer 256 is shown as uniformly-colored in FIG. 25A, but typically its chrominance varies in accordance with variation in host image chrominance—as shown by layer 211 in FIG. 21. Layers 254 and 255 serve as transparency masks that leave line excerpts of the tweak layer 256 showing-through. It's these masked excerpts of the tweak layer that form layer 252—an intermediate layer in the stack.

(For purposes of illustration, the drawings illustrate the mask layers as being white to indicate transparency where other layers show-through. In actual practice, a contrary convention can be adopted.)

In similar fashion, a shape pattern of northwest-inclined line excerpts 257, and a positive binary signal block 258 (which is the complement, or inverse, of block 255), collectively mask a positive tweak color layer 259, yielding the colored line segment-excerpts shown at 260. Layer 260 serves as the front layer of the illustrated stack.

Layers 252 and 260 thus overlay original host artwork layer 251 to yield the encoded artwork 261.

Such masking and compositing of multiple image layers, in spatially-registered alignment, is a basic feature of many commercial and open source graphics software packages, such as Adobe Illustrator, SVG-Edit, Inkscape, GIMP, and OpenOffice Draw. Such software may be scripted to automate such operations.

As noted, the information signal is conveyed by the cyan color channel. A surplus (or deficit) of cyan—relative to the original host artwork, results in less (or more) red light being reflected to an imager, enabling different signal states to be represented. Magenta (and to a lesser extent yellow) are desirably varied in opposition to cyan to maintain minimal variation in human-perceived luminance despite the cyan variation.

Figure 26:
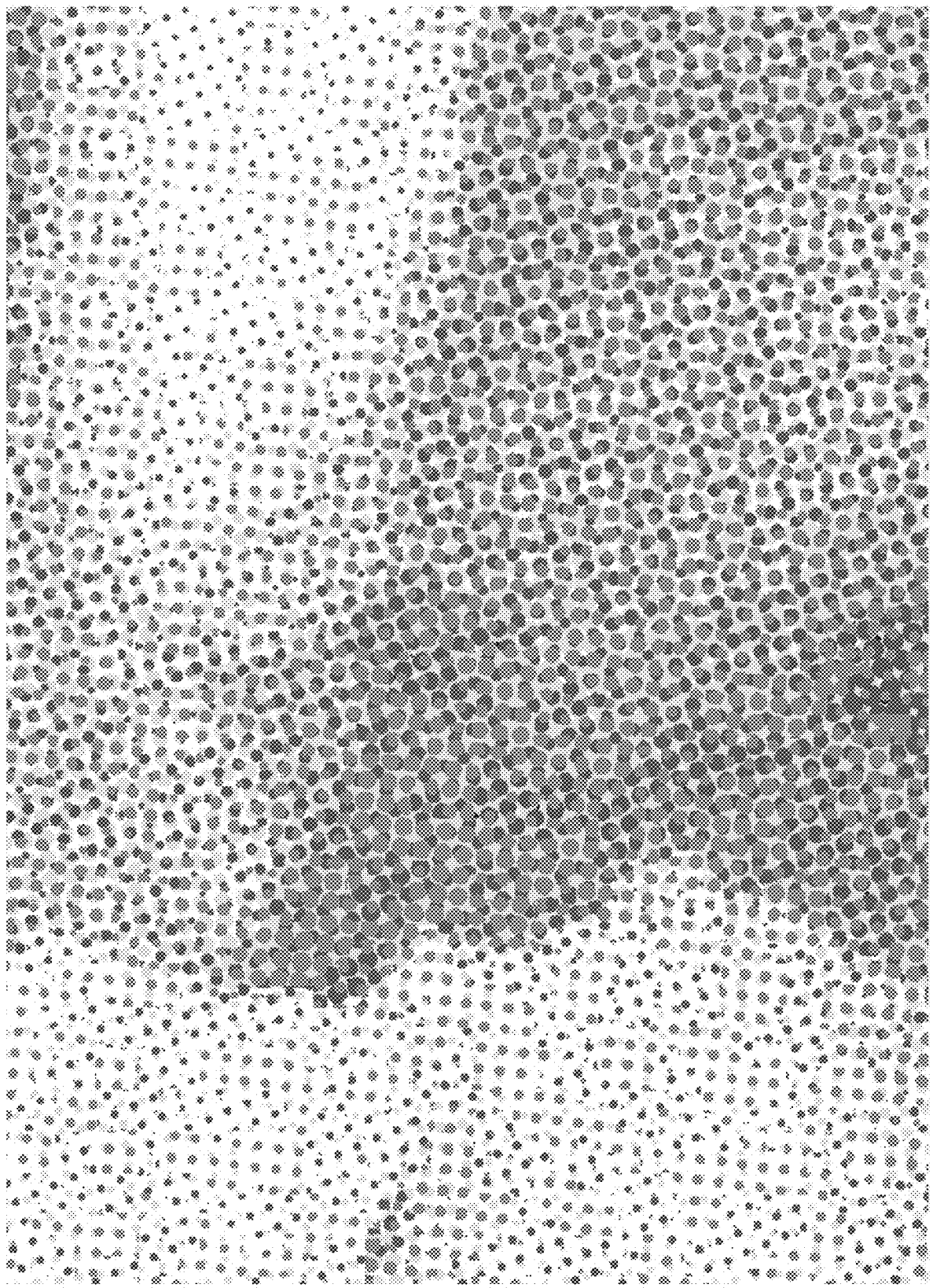
FIG. 26 illustrates how, in the RIP process, the component cyan, magenta and yellow elements can become spatially separated.

The cyan component and the offsetting magenta/yellow components are ideally co-located. In the arrangements discussed earlier, the positive tweak color channel includes both the cyan component, and the compensating magenta/yellow components, in exactly the same location. Likewise for the negative tweak color channel. That is, the printed primitives (e.g., dots or line segments) comprise a combination of multiple ink colors. In the mechanics of printing, however, the cyan, the magenta, and the yellow—even of a single dot—are commonly split apart. FIG. 26 shows a greatly-enlarged illustration of an illustrative printing process, in which the cyan, magenta and yellow inks are applied with different screening or dither patterns. Moreover, the cyan, magenta and yellow ink layers are never printed in perfect alignment—there is always a small error in layer registration, e.g., due to mechanical tolerances. As a result, the sought-for goal of compensating local luminance so it is unchanged from the original artwork is rarely perfectly met. Keeping the luminance change to within less than 2%, or less than 5%, however, can generally be achieved.

Sometimes better results may be achieved by deliberately splitting-apart the cyan and magenta/yellow channels by appropriate masking The positive and negative tweak color channels that serve to color elements of the encoded artwork each typically comprises multiple colors, e.g., cyan, magenta and yellow. The cyan part of each tweak channel may be split out from the magenta/yellow parts (i.e., the non-cyan part). There are then four channels instead of two; there is a positive cyan channel, a positive non-cyan channel, a negative cyan channel, and a negative non-cyan channel. (The letters P and N can be used to designate positive and negative to obscure a possible source of confusion, namely that the positive cyan channel comprises a deficit of cyan relative to the original artwork, and that the negative cyan channel comprises a surplus of cyan relative to the original artwork.)

Figure 27:
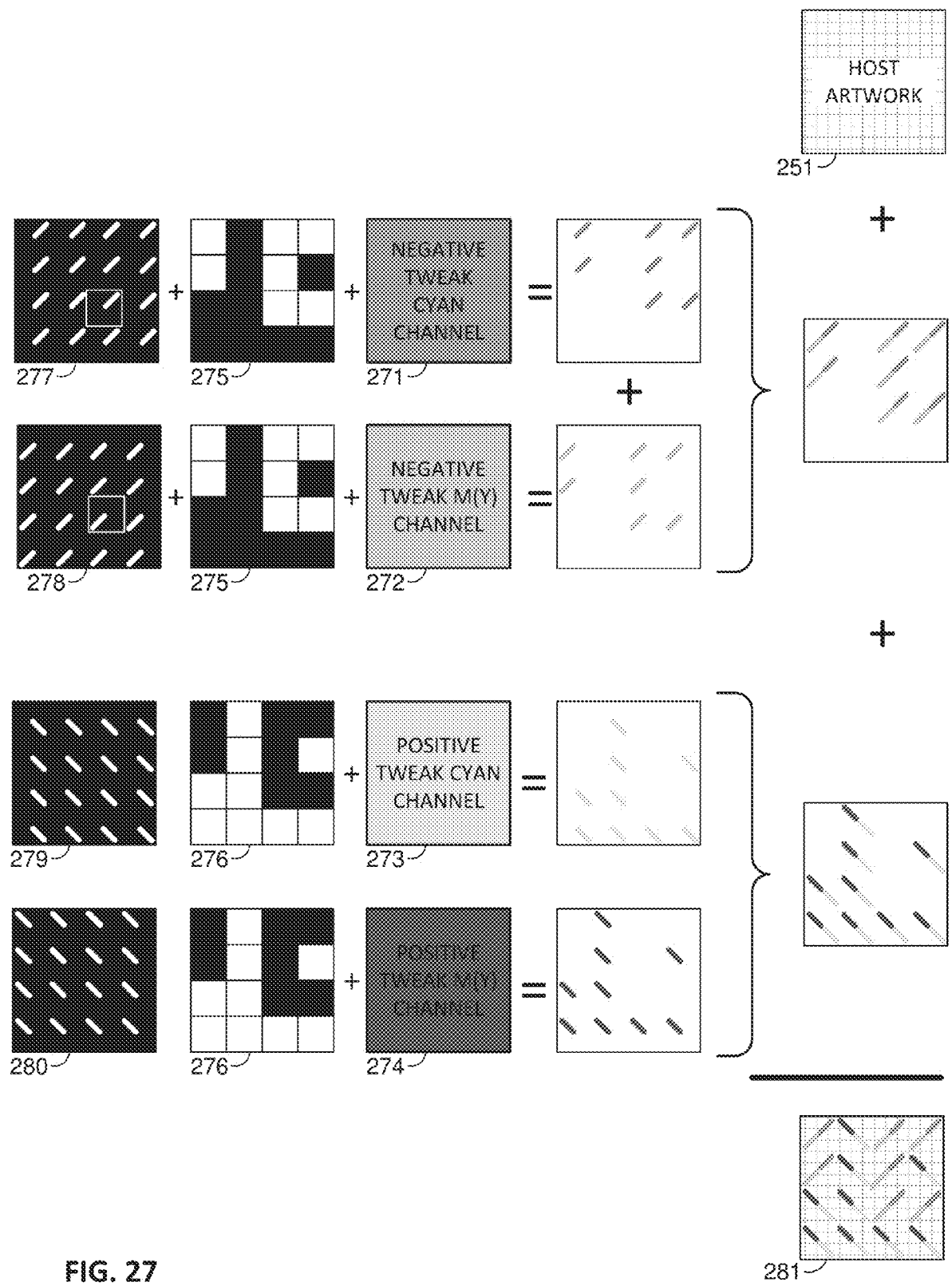
FIG. 27 details a procedure for generating a different variant of encoded imagery.

FIG. 27 illustrates one such embodiment. Four masked images are layered on top of the host image, rather than the two of FIG. 25A. Each of the four images is differently colored—respectively with N(cyan), N(not cyan), P(cyan), and P(not cyan) components, 271, 272, 273, and 274, of the two tweak layers. In addition to the negative and positive binary signal masks 275 and 276, four different shape masks are likewise used, one with the northeast line segments (277), one with the southwest line segments (278), one with the southeast line segments (279), and one with the northwest line segments (280), respectively. Each waxel is now spanned by a line excerpt having two segments—one segment colored with the cyan component of a tweak layer, and one segment colored with the non-cyan component of that same tweak layer. Typically half of the waxels are spanned by diagonal line excerpts oriented in one direction (representing +1 elements of the digital signal), and half are spanned by diagonal line excerpts oriented in the perpendicular direction (representing −1 elements of the digital signal). An encoded image 281 results.

Figure 28:
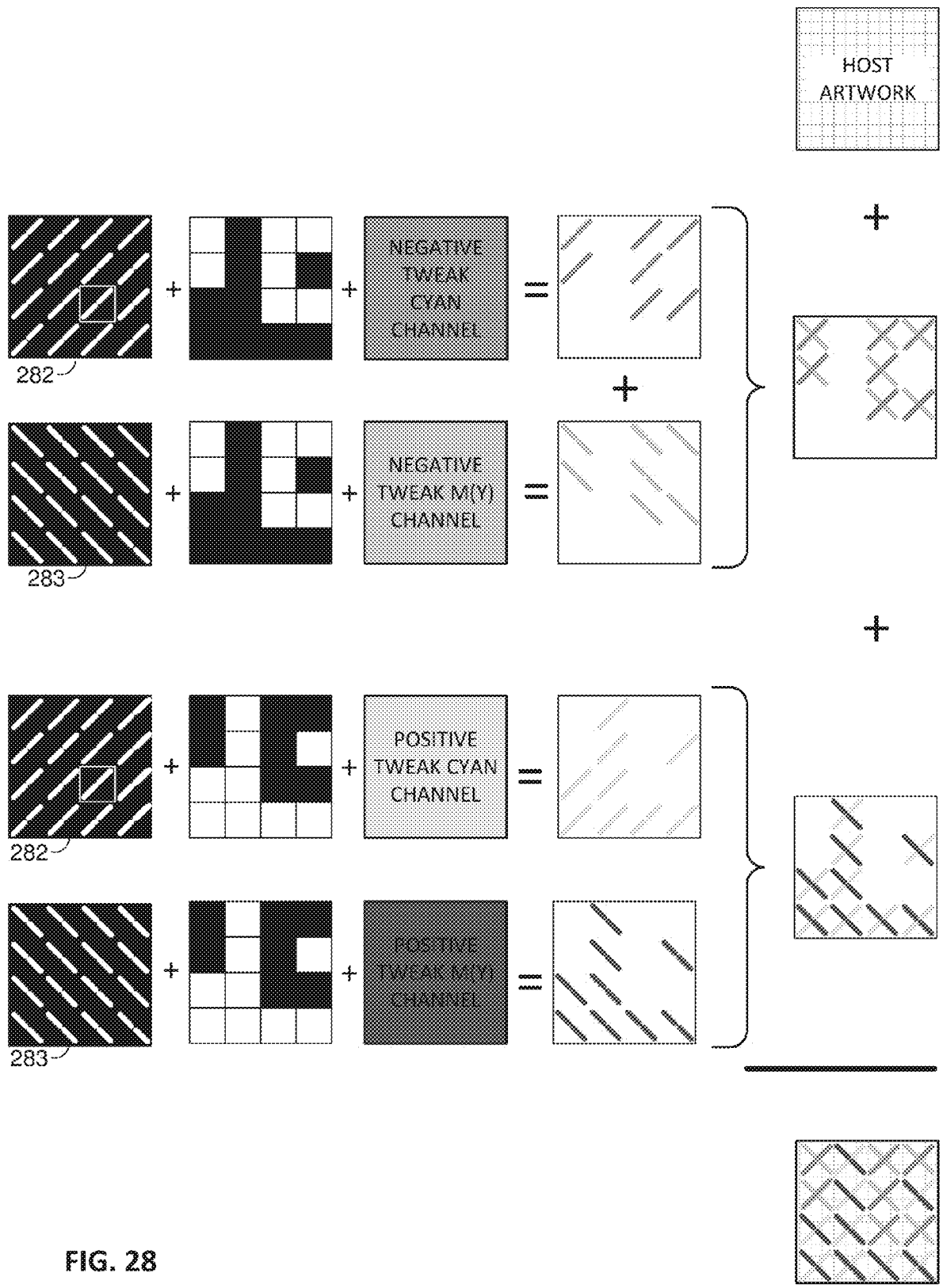
FIG. 28 details still a further procedure for generating still another variant of encoded imagery.

FIG. 28 shows another such embodiment. Here, however, each waxel of the resultant encoded graphic includes not one diagonal line excerpt, but two—crossing to form "X"s. This is achieved by applying two identical shape masks 282 for the negative and positive cyan tweak layers. Likewise, two identical shape masks 283 are applied for the negative and positive non-cyan tweak layers. Each shape mask defines complete line excerpts—having two co-linear segments. As a result, each waxel is crossed by two orthogonal line excerpts, colored by either the two components of the negative tweak channel (i.e., cyan and non-cyan) or of the positive tweak channel.

Figure 28A:
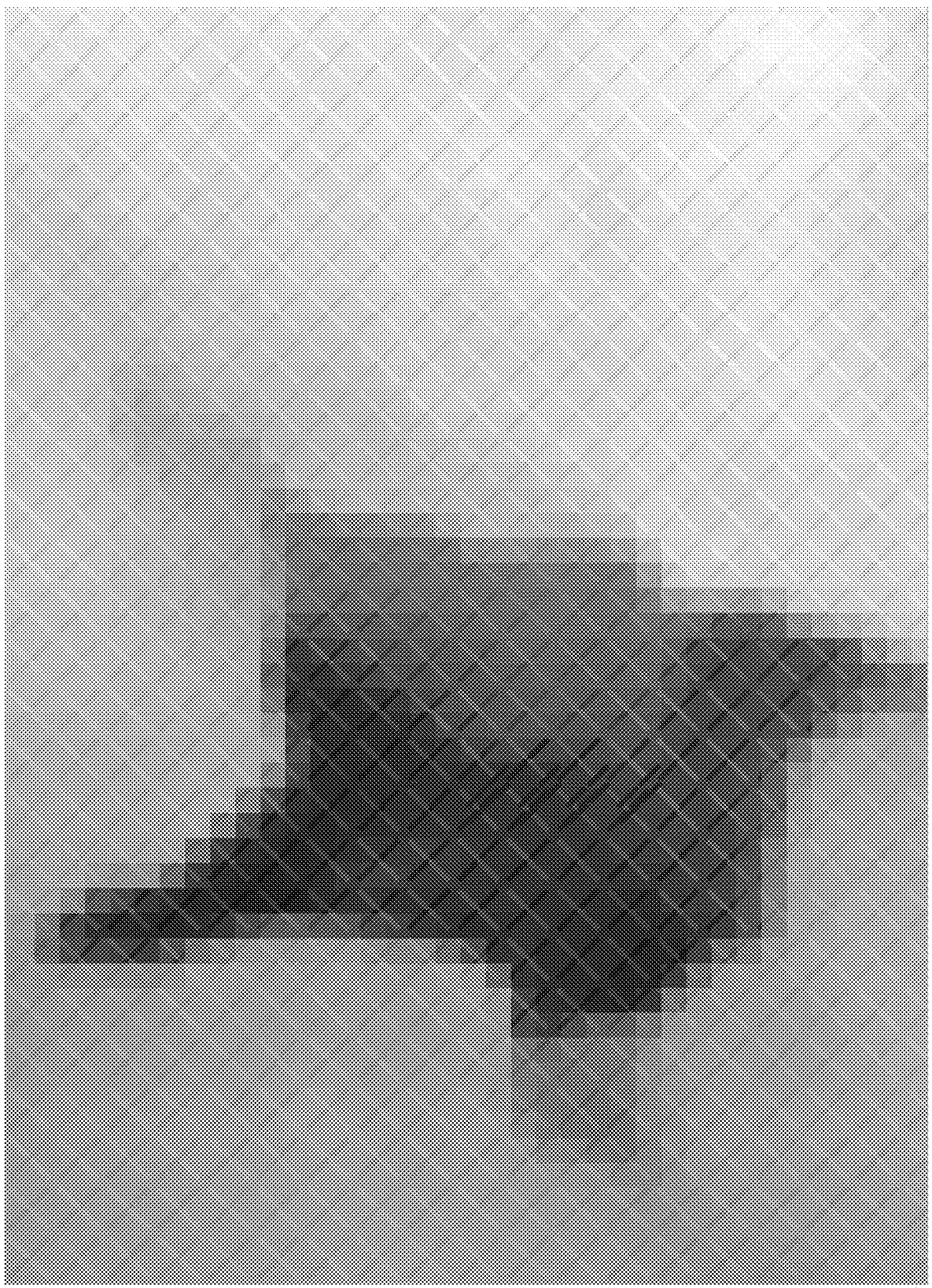
FIG. 28A shows imagery of the sort produced by the procedure of FIG. 28.

FIG. 28A is a greatly-enlarged excerpt of host artwork encoded according to the FIG. 28 principles.

In other embodiments, the magenta and yellow inks may be masked with different shapes, in different layers, rather than being masked together in a common layer. In one such embodiment there are thus six tweak layers: P(cyan), P(magenta), P(yellow), N(cyan), N(magenta), and N(yellow). Each may be masked with a different respective pattern of line segment shapes, e.g., respectively extending at angles of 0, 60, 120, 180, 240, and 300 degrees from a common original (analogous to the FIG. 27 arrangement but with six masks instead of four). Alternatively, just three shape masks can be used—each repeating a primitive of two colinear line segments, e.g., the first extending from the origin in the 0 and 180 degree directions, the second extending from the origin in 60 and 240 degree directions, and the third extending from the origin in 120 and 300 degree directions (analogous to the FIG. 28 arrangement, but with three masks instead of two). In this latter arrangement the first mask is used both for the P(cyan) and N(cyan) tweaks; the second mask is used both for the P(magenta) and N(magenta) tweaks; and the third mask is used both for the P(yellow) and N(yellow) tweaks. Such arrangement is particularly suited for arrangements in which the waxels have shapes of hexagons rather than squares.

Just as dots can be stochastically-placed (as in FIG. 23), so can other masking shapes, such as the line segments of the just-discussed arrangements.

Figure 29:
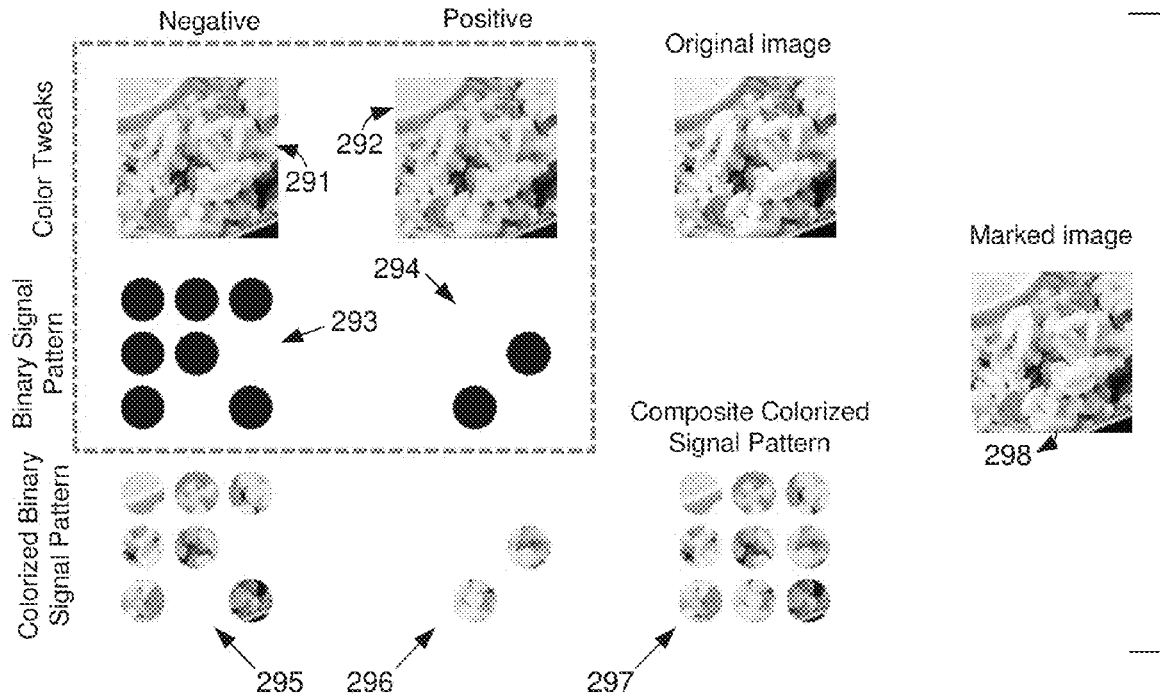
FIG. 29 summarizes an illustrative process detailed herein.

FIG. 29 reviews aspects of the foregoing. Negative and positive tweak images 291, 292 are generated, e.g., by applying the CME procedure to host imagery (artwork). A first shape mask 293 defines a spatial arrangement of −1 binary signaling elements, and a second shape mask 294 defines a spatial arrangement of +1 binary signal elements. The first mask 293 is applied as a transparency operator on the negative tweak layer 291, and the second mask 294 is applied as a transparency operator on the positive tweak layer 292. (In this depiction, black indicates transparency of the masks.) Resulting from these operations are a first pattern 295 of colorized shapes corresponding to the −1 binary signal elements, and a second pattern 296 of colorized shapes corresponding to the +1 binary signal elements. These two patterns of colorized binary signal element shapes are combined to yield a composite colored signaling pattern 297. This composite colored signaling pattern is combined (e.g., overlaid) on the host artwork to yield encoded artwork 298.

In some embodiments, the encoded artwork is distributed in an electronic format (e.g., as a PDF file), rather than printed. If distributed in electronic format, the file may include each of the layers depicted in FIG. 29 (i.e., they have not been "flattened" into one or a fewer number of layers). A skilled hacker might access the binary signal patterns 293 and 294 from the electronic file, and alter these patterns to encode a different payload or message desired by the hacker. Such tampering with the encoded payload is commonly undesirable.

Figure 30:
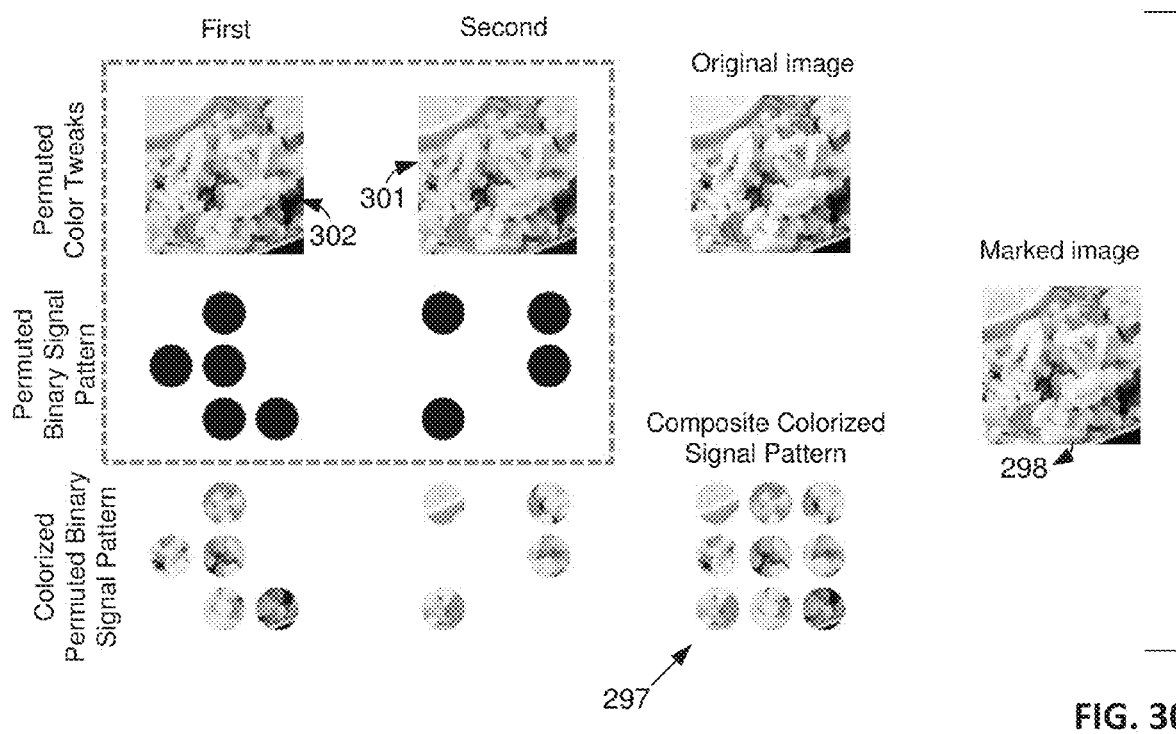
FIG. 30 shows a variation of the FIG. 29 process in which permutation is employed to obfuscate the patterns that are being placed into the host imagery, to deter tampering.

As a safeguard against such tampering, one or more of the layers can be changed to make it more difficult for a hacker to change the payload. One approach is by obfuscation. FIG. 30 illustrates.

In the illustrated arrangement, the two tweak color layers are modified, and the two binary signal masks are modified in a compensatory manner. No longer does one tweak layer consist of negative color tweak data exclusively, and the other tweak layer consist of positive color tweak data exclusively. Instead, in a first tweak layer, a first set of regions has negative tweak data (i.e., cyan-increased), while a second set of regions has positive tweak data (i.e., cyan-decreased). A second tweak layer is spatially-complementary: the corresponding first set of regions has positive tweak data, while the corresponding second set of regions has negative tweak data. This is shown by the complementary patterns of tweak layers 301 and 302 in FIG. 30.

A permutation operator, which may be dependent on a plural-bit permutation key, defines this scrambling of negative and positive tweak data in each of the two tweak layers. In a simple example, the permutation key may be a pseudo-random sequence having as many bits as the signal has elements. For example, if the signal is a digital watermark configured as blocks of 128×128 waxels, then a permutation key of 16,384 bits can be used. Each successive bit in the sequence is respectively associated with a successive waxel-sized region in the first tweak layer (numbered across rows from top to bottom). For those waxels where the bit is "1," the first tweak layer has positive tweak data (e.g., a cyan-decreased version of the host artwork), and where the bit is "0," the first tweak layer has negative tweak data. The second layer follows the opposite convention, i.e., where the permutation key bit associated with a waxel region is "1," a cyan-increased version of the host artwork is included in the layer, and where the permutation key bit associated with a waxel region is "0," positive color tweak data is included in the layer.

Put another way, the color tweak data in the first tweak layer is normally negative tweak data, except for those waxels where the associated permutation key has a "1" value. And the color tweak data in the second tweak layer is normally positive tweak data, except for those waxels where the associated permutation key has a "1" value. That is, where the permutation key has a "1," value, associated waxels in the first and second layers flip from their normal data to the opposite variety.

The same is true for the binary signal patterns (masks). Negative and positive binary signal patterns 293, 294 (as in FIG. 29) are defined as before, with the presence or absence of a shape (e.g., dot). First and second permuted binary signal patterns are respectively produced from these negative and positive binary signal patterns, in accordance with the permutation key.

Each position in the first and second binary signal patterns corresponds to a waxel location, and thus corresponds to an associated bit of the permutation key. The first binary signal pattern is the same as the negative binary signal pattern, except at those waxel locations where the permutation key has a "1," value. At such locations the pattern state flips (i.e., from a dot to no-dot, or from no-dot to a dot).

The flipping of certain locations in the tweak layers from one state to the opposite, paired with the flipping of certain locations in the binary signal patterns from one state to the opposite, effectively restores the net encoding operation to its FIG. 29 form. However, the intermediate data layers are different. As can be seen, the binary signal patterns in FIG. 30 are different from their counterparts in FIG. 29. So are the two sets of colorized binary signal patterns. In particular, the first colorized binary signal pattern includes some dots that are cyan-increased and some dots that are cyan-decreased. Likewise with the second colorized binary signal pattern. When such patterns are combined, however, the resulting composite colorized signal pattern 297 is the same in both FIGS. 30 and 29, as are the encoded images 298. But the digital file produced from the layers of FIG. 30 is much more difficult to tamper with.

FIG. 31 illustrates a further embodiment. In this arrangement a regular, full array of shapes (e.g., dots, without any gaps in the 2D array), colored in accordance with one of the tweak layers (e.g., negative), overlies the host artwork, with one colored dot per waxel. A sparse array of shapes (i.e., without a shape at every cell in the 2D array), forming a positive binary signal pattern, colored in accordance with the opposite tweak layer (e.g., pattern 296 in FIG. 29) is applied as a further top layer. The compositing of these layers yields the same encoded image 298 as shown in FIG. 29. However, this arrangement is more memory efficient than the FIG. 29 arrangement, because no storage needs to be allocated to the negative binary signal pattern (which may normally be a 128×128 data array). No storage is required for this negative binary signal pattern because visibility of its primitives are determined by the presence or absence of primitives in the positive binary signal pattern above.

This data savings strategy can be applied to others of the foregoing arrangements.

One exemplary embodiment may proceed according to the following pseudocode:

1) Load Package Artwork: X inch by Y inch Canvas of N Raster Components (layers) and M Vector Elements (layers)

2) Create a 150 wpi virtual center-point array, the baseline Pattern Array covering the Canvas 3) Create 128×128 watermark pattern Tile of binary TweakValues (including reference and payload signals, like tile 275 in FIG. 27)

5) Assign TweakValues across the whole Canvas Pattern Array, by tiling

6) For all N Raster Components:
  a) Create pImage and nImage layers using CME process, where the dimensions, dpi and placement are identical for each new raster Component: N Components become 3N Components (counting the original Raster Component)

7) Create pMasks and nMasks in accordance with a RasterOperator and the TweakValue array
  a) in a simple embodiment the RasterOperator simply applies a binary graphic, such as a circle, as discussed above; or
  b) in other embodiments, the RasterOperator can perform more sophisticated operations, such as blending different layers, on a point basis, or by applying a filtering kernel to an area of one or more layers and using the filtered output value. One such blend operator may use a formula such as a*p+b*n+c*Original, where a+b+c=1.0;

8) Create N enhanced Raster Components: Original+masked pImage+masked nImage
  a) If the host artwork is raster-input only, just replace the N original Raster Components with the new enhanced components and write out the file, including the original M Vector Elements; Finished Other embodiments can include still more acts, such as:
I) For Raster Enhancement AND Vector Element Enhancement
  a) Choose one or more Vector Component Operators
    i) Size
    ii) Density
    iii) Attract/Repel
    iv) Create/Destroy
  b) Operate across all points in Canvas Pattern Array
    i) find 'local' neighborhood of Vector Elements and Operate
  c) replace original Vector Elements with Enhanced Vector Elements; or
II) Combine multiple Raster/Vector Methods and include 'Screening' integration also
  a) Also include 'generation' artwork such as stipple, Voronoi, and other explicit signal rich art.

Additional Disclosure

While the embodiment of FIG. 21 includes a host image and a corresponding negative tweak image and a corresponding positive tweak image, other embodiments can effect a substantial savings in memory and/or processing time by replacing the tweak images with data from one or more tweak look-up tables.

In a simple embodiment there are two tweak look-up tables, one for positive tweaks and one for negative tweaks. Each acts in a manner akin to a ICC color profile table. ICC color profile tables are familiar to artisans and characterize a color input or output device (e.g., a printer) according to the International Color Consortium standard. That is, an ICC color profile table defines a mapping between two color spaces, e.g., one used by a software program, and a variant one that reflects the actual output rendered by a printer. Given a particular set of color coordinates produced by the software, the table outputs corresponding color coordinates that should be used by the printer to yield a best color match in the rendered output.

In similar fashion, each color in the artwork image 213 of FIG. 21 corresponds to a particular negative tweak color in image 211 and a particular positive tweak color in image 212. If 100 pixels in the artwork image have color coordinates {135,201,87,212} then the corresponding positive tweak color can be looked-up in the positive tweak table and used 100 times, instead of computing and storing the corresponding tweak color 100 times.

In a 32-bit C/M/Y/K color system (i.e., each channel represented by an 8-bit datum), there are about 4 billion color combinations (i.e., 2^32). ICC profile tables deal with this large number by providing mappings at a sampling of color coordinates across the color space, and then interpolating between these samples as needed to approximate the output coordinates for any of the 2^32 input coordinates. The same approach can be used here. Tables of a few tens of kilobytes to a few megabytes may most commonly be used. For example, if the color space is uniformly quantized in increments of 16 (e.g., possible values for each coordinate are 0, 16, 32 . . . 240), then each color component can be represented by 4 bits instead of 16, so a full C/M/Y/K color representation spans 16 bits. There are then 65,536 possibilities in the input color space, each of which yields a 16-bit coordinate in the tweak (output) color space. The total memory required for the positive tweak table is thus 1,048, 576 bits. (Likewise for the negative tweak table.) If a pixel in the host image has C/M/Y/K values of {135,201,87,212}, then positive tweak output data is retrieved from the lookup table at the 16 nearest coordinate points (e.g., at cyan values of 128 and 144, at magenta values of 192 and 208, at yellow values of 80 and 96, and at black values of 208 and 224), and interpolation is applied based on relative distances of the input coordinate to these available coordinate data points from the lookup table. The resulting interpolated value is used to define the positive tweak color for that input color. Likewise for the negative tweak color.

The data in each tweak look-up table can be computed by the CME process (or another process) in an offline operation specific to each color profile, say CRACol2006_coated1v2. Once computed, this data can be used for any image; it is image independent.

In embodiments in which different watermark strength is achieved by varying the fill colors of the graphic primitives (instead of their spatial areas), several alternate tweak tables may be used. For example, if a software user interface for watermark control allows 12 different levels of watermark strength, then 24 different tweak tables can be employed, 12 for positive tweaks at the 12 different strength levels, and 12 for negative tweaks. Or fewer tables can be involved, with more use of interpolation. For example, positive tweak tables can be established for strength levels of 4, 8 and 12. If the user sets the watermark strength level to 6, then tweak values for input artwork color values are determined from the strength-4 and strength-8 tables, and the cyan, magenta, yellow and black components that are output from each can be respectively averaged. (A strength of 0 corresponds to no tweak, i.e., the original image color components are used as the output color components.)

It will be recognized that such a table(s)-based approach avoids the need to calculate watermark pattern colors the fly, and to re-calculate them each time a change is made to artwork color. Instead, simple look-up operations suffice.

FIG. 34 is a representation of a software user interface 341 that may be included in a vector graphics editing program to enable a user to specify desired parameters of a watermark. The different controls are shown in a default state, before a user has made any selection.

An existing vector graphics artwork file is loaded using the Browse control at the top. This may be, e.g., an Adobe Acrobat (PDF) or Illustrator (AI) file. (If no file is specified, but a file is already open in the program, then operation on the already-open file is assumed.) The desired watermark strength is set by the next control, e.g., with a user typing a desired strength level between 0 and 12 (or operating a drop down dialog or graphical control). This particular interface further enables the user to specify how different strength levels are to be achieved: by varying colors of graphic elements, or by varying their areas. The user clicks one of the two option buttons to make a selection.

The interface next allows the user to select the desired shape of watermark primitives, from circle, square or star alternatives. Since strength control is set by color, the area of the primitive is left to the user, and is specified by the fractional area of a waxel that is occupied by the primitive. A next control enables the user to toggle dithered placement of the primitives on or off. A further control allows the user to specify whether watermarking should be accomplished with just negative (cyan-ish) or just positive (magenta-ish) tweaks, or both. Finally, the bottom dialog is where the user types the desired watermark payload, such as a Global Trade Item Number (GTIN).

When the user presses the APPLY button of the interface, the software generates watermark layers in accordance with the specified parameters, and presents the watermarked artwork on a display in conjunction with the host artwork for the user to review. If desired, the user can return to the interface to adjust parameters, and view the changed results.

It will be recognized that other embodiments can allow for control of more or less parameters than those shown in this particular example.

Figure 35:
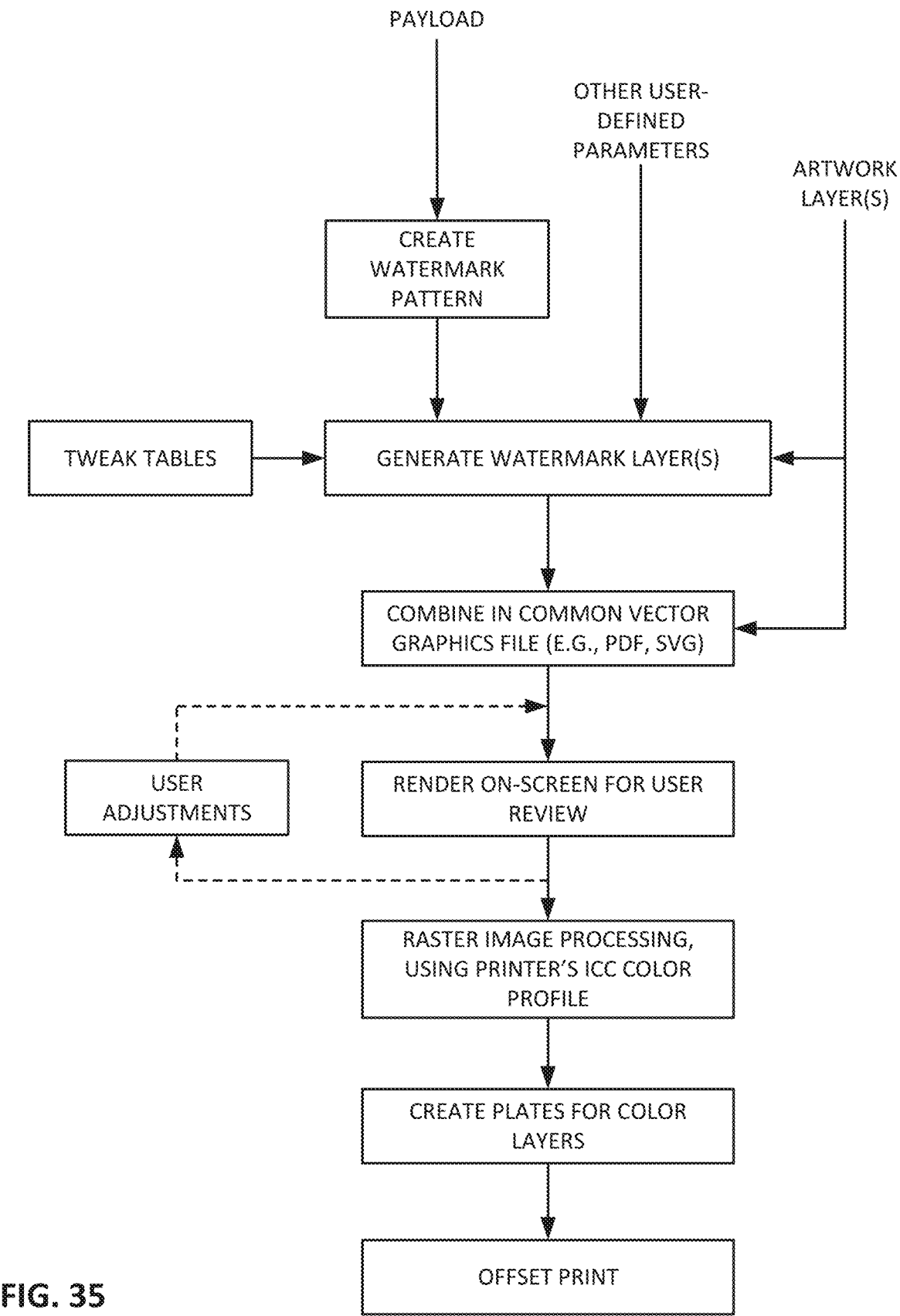
FIG. 35 summarizes an illustrative process according to the present technology.

FIG. 35 shows principal operations performed by the software system, as more particularly detailed elsewhere. The user enters the desired watermark payload (e.g., GTIN) and other parameters, such as by user interface 341. The system defines a watermark pattern from the GTIN, e.g., of binary or continuous-tone form. Tweak tables, as discussed above, are queried to determine color values for positive and negative tweaks, at locations across the artwork at which primitives are to be placed to create the just-defined watermark pattern. One or more vector graphics watermark layers are thus formed, each comprising an array of graphic primitives of one or more colors and sizes. The watermark layer(s) are then added as new layers to the original artwork file, and rendered with the artwork on-screen for user review. After any desired user adjustments, the file is saved (e.g., as a PDF or AI file), then passed to a raster image processor for print rendering printer's ICC color profile. Finally, printing plates are made for the various rendered color separations (e.g., C/M/Y/K), and sheets of physical media are then offset printed.

In some embodiments, part or all of the systems exemplified by FIGS. 34 and 35 can execute on systems remote from the user, e.g., as a cloud service (or as a cloud plug-in to a local copy of Adobe Illustrator).

Figure 36:
FIG. 36 is an enlarged view of an image produced by one embodiment of the present technology.

If a negative or positive tweak is applied to every waxel over an image, and is applied as a square that occupies 100% of the waxel area, then the entire image is occluded by square waxels of negative and positive colors corresponding to the waxels' respective locations in the image. In such case, the underlying image need not be retained if file size is an issue; it is completely obscured by the overlaid watermark waxels. Such an arrangement is shown in FIG. 36.

Figure 37:
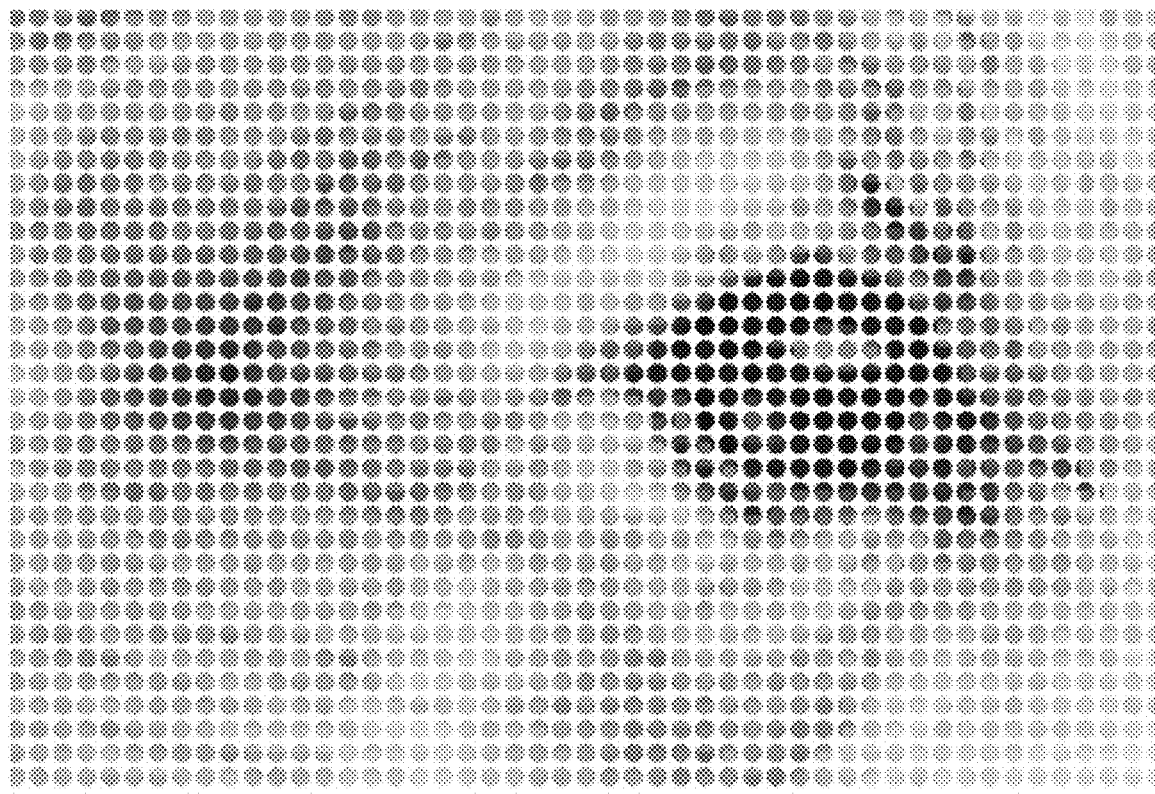
FIG. 37 is an enlarged view of the primitive layers in a vector graphics file produced by one embodiment of the present technology.

If the tweaks are applied as primitives (e.g., circles) that occupy less than 100% of the waxel areas, and the underlying image is hidden, the result can be as shown in FIG. 37.

Figure 38:
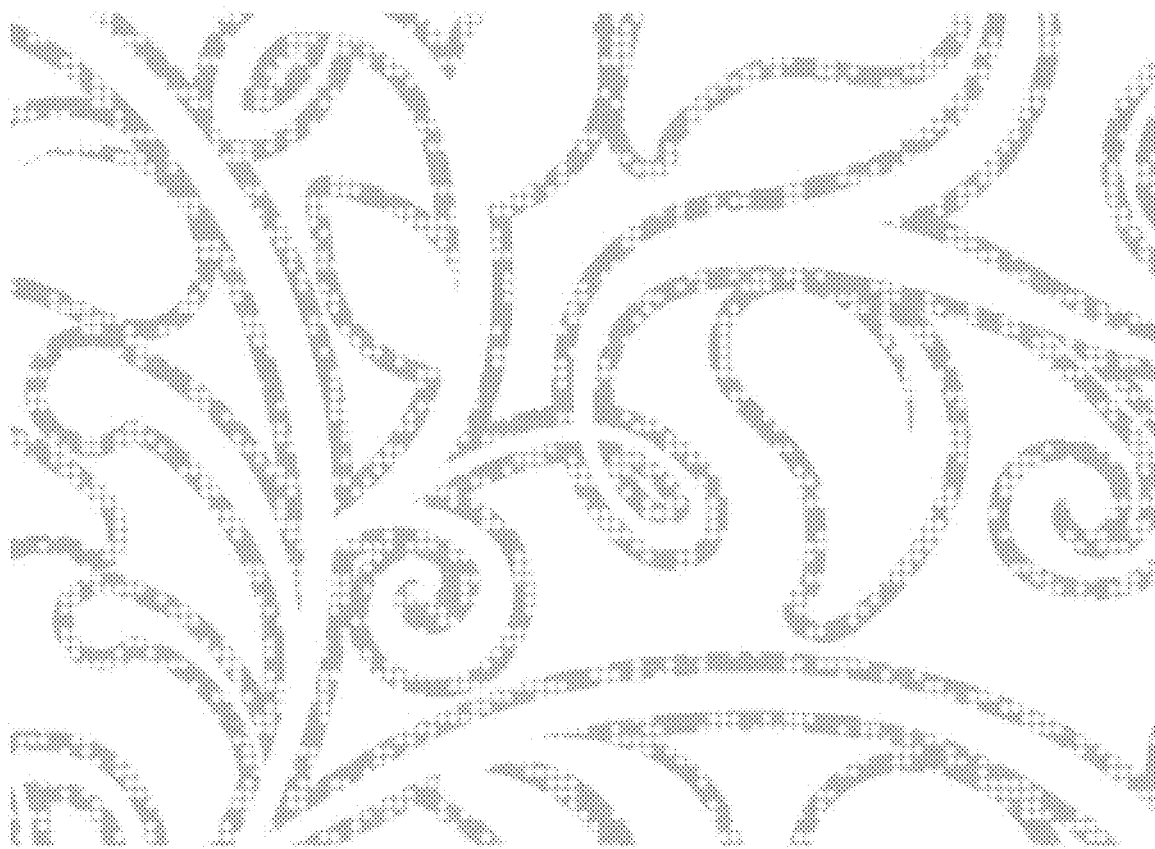
FIG. 38 illustrates how a layer of spot color artwork can be overlaid with a layer of primitives to convey a watermark pattern.

Some vector graphics artwork elements may be defined with a single color, such as a spot color ink. Watermarking such elements can be accomplished by poking holes in the inked area to reveal a contrasting color (e.g., the white substrate) showing through, providing the contrast variation that conveys the watermark signal. Such arrangement is shown in FIG. 38, where holes are poked at locations corresponding to the positive tweaks, to make the artwork reflect more red light (higher luminance) at such locations. Alternatively, the spot ink artwork may be half-toned, which allows for adjustments in both positive and negative directions. In still other arrangements a spot color layer is replaced with an approximation of that color formed using C/M/Y/(K) inks, which permits adjustments as described herein. See, e.g., U.S. Pat. Nos. 6,763,124, 6,993,149 and 9,449,357.

CONCLUDING REMARKS

Having described and illustrated the principles of the technology with reference to specific implementations, it will be recognized that the technology can be implemented in many other, different, forms.

For example, while the array of watermark pattern data is described in certain embodiments as comprising values between −1 and 1, this is arbitrary. The data can be defined by real numbers or integers. The bounds can be set as desired. In some arrangements, integer data ranging from 0 to 255 can be used.

Although many of the embodiments detailed above are predicated on so-called continuous-tone watermarks, in other embodiments a so-called binary (or "sparse") watermark pattern can be used. In many such marks (as detailed, e.g., in publication 20190332840), most waxels are left unmarked, and a dot or other primitive is formed at the remaining waxel locations. (Commonly 2%-30% of the waxels are marked.) In such case, only a single tweak color, or colors from a single tweak table, may be applied, typically the negative tweak color corresponding to each mark's location in the host artwork.

In a variant embodiment, the dots are separated into two patterns. Fifty percent of the dots comprise a fixed pattern corresponding to the reference signal and fifty percent comprise a variable pattern depending on the message payload. In an illustrative implementation in which each waxel in a 128×128 block is marked with either a primitive of the first tweak color or the second tweak color, the corresponding 16,384 values of the reference signal are examined, and the darkest quarter (4096 locations) and the lightest quarter locations are determined (e.g., by sorting). These locations are marked with primitives of negative and positive tweak colors, respectively, and such markings comprise the fixed pattern. The remaining 8192 locations comprise the variable pattern and are marked with negative or positive tweak primitives in accordance with the −1 and +1 chip values respectively assigned to such locations by the scatter table. (There are about equal numbers of each, but not necessarily exactly.)

Such arrangement is well-suited for applications in which multiple versions of watermarked artwork must be quickly generated, e.g., as when producing serialized product packaging—each payload conveying a unique identifier. The fixed pattern does not vary, item to item. The variable pattern is rapidly determined based on the payload, and those primitives are assigned tweak colors accordingly, e.g., from the negative and positive tweak images of FIGS. 3A and 3B.

Figure 39:
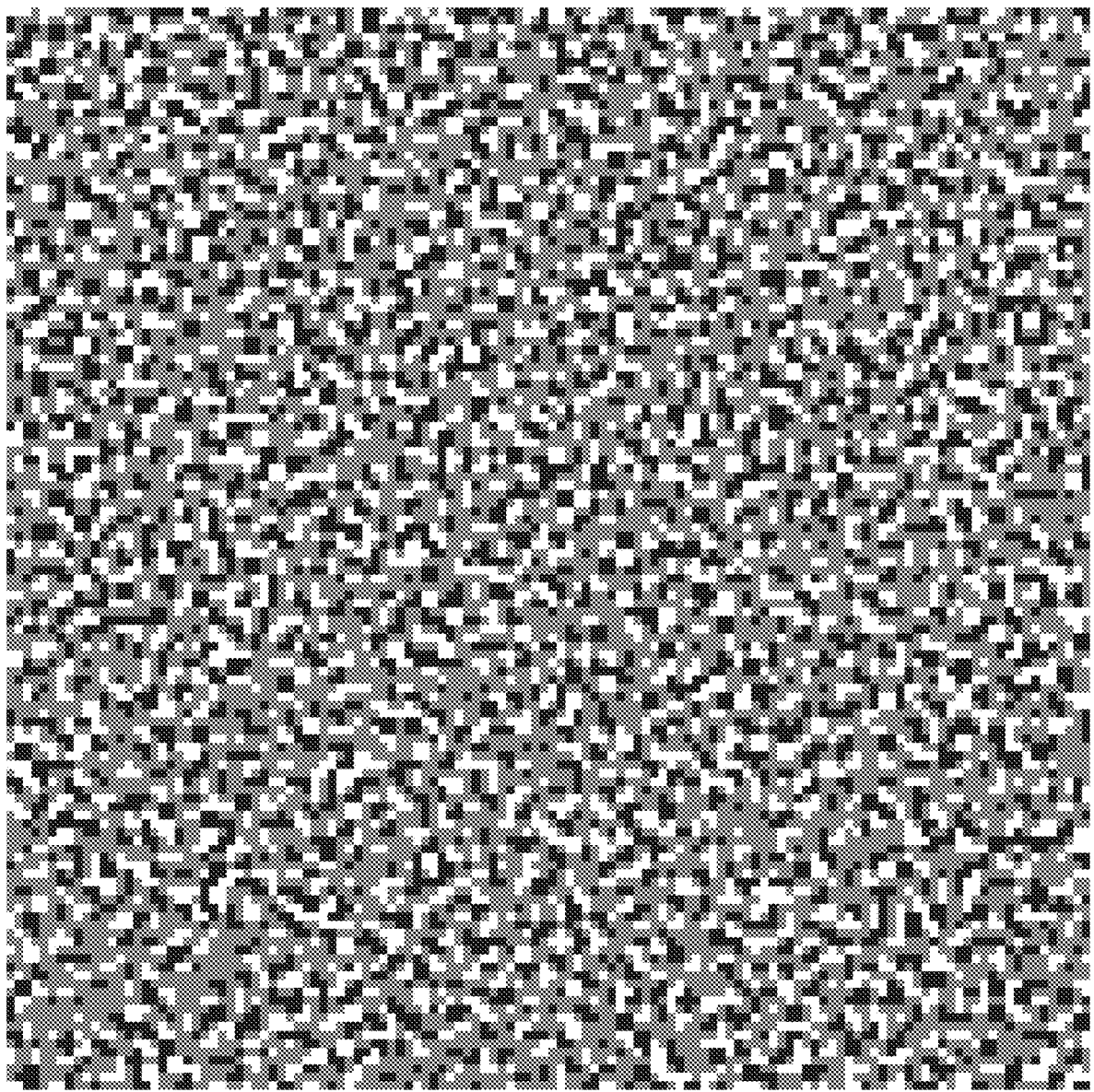
FIG. 39 shows a watermark pattern detailing fixed and variable locations.

(FIG. 39 shows such a 512×512 element watermark block, to which flat bump shaping has been applied, showing the different patterns of dot locations. The black locations are the darkest quarter, which are always marked with the negative tweak color. The white locations are the lightest quarter, which are always marked with the positive tweak color. The grey locations are the other half, which are marked with the negative or positive tweak color depending on whether their assigned values are darker (i.e., greyscale value below 128) or lighter.)

The use of cyan and magenta (and yellow) for the purposes respectively stated is illustrative. Naturally other colors can be used, as may suit different applications.

Although the detailed implementations concern blocks of signal data, arrayed in rows and columns, it should be recognized that this is not essential. For example, a signal block can be comprised of elements arrayed in hexagonal cells, etc.

While the specification describes a reference signal component as being comprised of sinusoids of different spatial frequency, this is not essential. Other synchronization techniques are known to artisans—including some that exploit patterns inherent in expression of the payload data for synchronization purposes.

In some of the detailed embodiments, circles (dots) are placed at each location where there is an extremum in the watermark pattern array (e.g., a signal value between −0.4 and −1.0. In other embodiments, only a fraction of such locations are marked by circles.

Although the focus of the specification has been on codes comprised of isolated dots and other primitives, this is not essential. In other embodiments the vector graphics instructions define artwork patterns such as Voronoi, Delaunay and stipple patterns.

While bump shaping is not employed in the illustrative embodiments of the present technology, it can naturally be employed if desired. Clipping may or may not be used in particular embodiments, as best suits the application.

In some arrangements, signaling is achieved by variation of the a* channel, in an L*a*b* representation. In other embodiments, signaling is achieved by variation of the b* channel.

In some embodiments a file includes a raster layer defining host artwork, together with two tweak raster layers (e.g., P and N counterparts of the host artwork). The primitive shape is a dot. In other embodiments a vector "hole" can be used within each waxel, i.e., the complement of a dot. (A dot may be regarded as a black circle in a white square, while a hole may be regarded as a white circle in a dark square, where the square represents a waxel.) Such arrangement opens up additional possibilities via the permutations of such layers.

As one example, a positive color tweak layer screened by holes will embed a negative signal. Another example comprises a magenta-emphasized counterpart of the host artwork that serves as a base raster layer, overlaid with a cyan-emphasized counterpart raster layer than is screened with both dots and holes. The emphases of the magenta and cyan layers are tailored, in conjunction with the sizes of the dots and holes, to assure that the local color and luma of the original raster image are preserved to within some tolerance (e.g., with a JND). But in such embodiment the host image needn't be included, reducing the file size due to the inclusion of two raster images, instead of the three as formerly.

While a variety of arrangements are detailed for presenting pairs of primitives (e.g., cyan-enhanced and magenta/yellow diminished) in proximity to maintain constant luma, still others are shown in FIGS. 32A and 32B. Each of these arrangements can be used as a primitive in a waxel, with one cross-hatching signifying cyan ink, and the other signifying magenta and yellow ink.

Figure 33A:
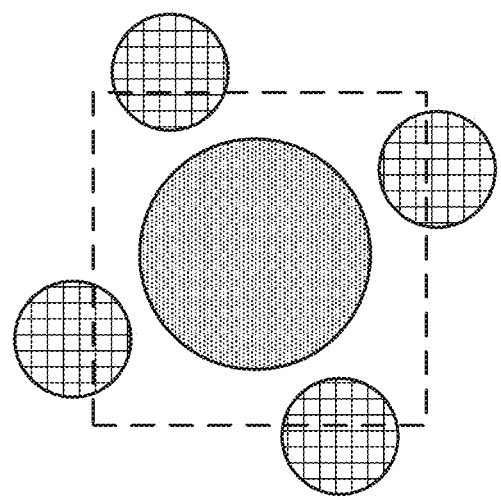
FIGS. 33A and 33B show how the arrangement of FIG. 32B relates to a single waxel cell, and adjoining such arrangements.
Figure 33B:
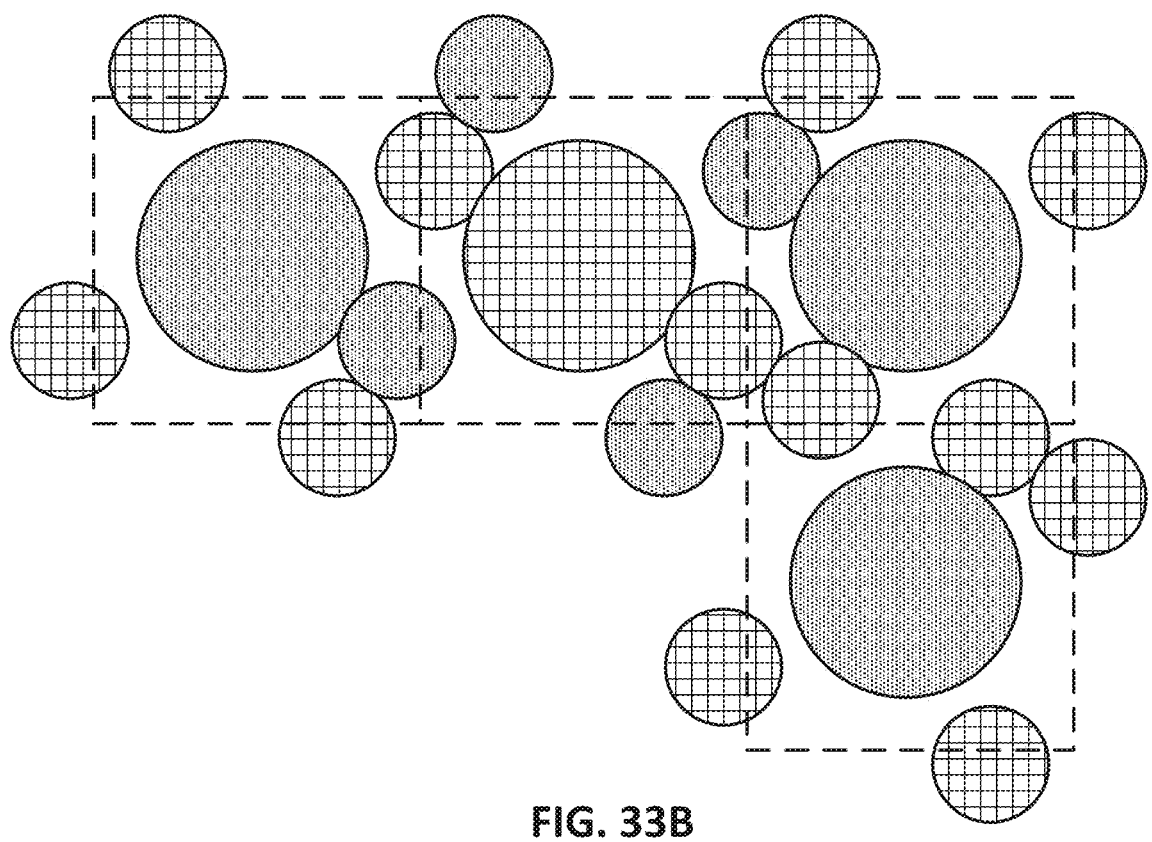

In the detailed arrangement, the primitive shapes are usually confined to within the boundary of a waxel. However, this need not be the case. FIG. 33A shows a primitive that extends outside the boundary of a waxel. FIG. 33B shows how such primitives are arranged in the aggregate.

Certain of the foregoing embodiments achieve so-called equal robustness embedding. That is, at each waxel location, the watermark signal is expressed with a fixed amplitude (such as a change of either +5 or −5 digital numbers, or 5% or −5%, in the red channel). In other embodiments the watermark signal can be tailored so as to achieve so-called equal visibility embedding, in which the degree to which image change is visible to the human eye is maintained constant across the image. Such techniques are detailed in U.S. Pat. No. 9,565,335, the principles of which are applicable here.

While creation of the positive and negative tweak colors by application of a CME process is preferred, it is not necessary. For example, colors of such tweaks can be defined by alternate arrangements, such as those detailed in FIGS. 5-10.

In alternative embodiments, the lookup tables discussed above can be approximated by a first small array of matrix coefficients (e.g., of 4×4 size) that defines a mapping between the host image color coordinates, and those of the negative color tweak layer. A second small array of matrix coefficients can likewise define a mapping between the host image color coordinates and those of the positive color tweak layer. At boundaries of the respective color space gamuts this approach suffers somewhat in accuracy, but it can serve well in many situations.

Naturally, in table-based embodiments, a single table can be expanded to provide two sets of output data corresponding to each set of input host image color coordinates: one for the negative tweak color and one for the positive tweak color.

The operations detailed herein can be automated to a high degree. Assume, for example, that artwork is in a PDF file with multiple groups of objects, with raster data, vector elements and masks. A software application steps through each group and layers an appropriate form of vector watermark over the artwork. For example, a sparse mark with fixed color tweaks can be applied for spot color layers, and a chrominance mark with adaptive color tweaks can be applied for raster layers. The masks in each group are applied automatically to the vector watermark layer as well.

While many of the detailed embodiments are optimized for print rendering followed by red light scanning, it will be recognized that the disclosed principles are likewise applicable to other forms of rendering, and imaging under different color illumination (including white light, as may be assumed with mobile phone camera imaging absent flash).

A problem that has arisen with raster-based watermarking of packaging artwork is that graphic artists are accustomed to sharing image assets among related products within a particular retail brand family (e.g., Heinz, Kellogg's, Smuckers, Campbell's, etc.). A can of chicken stock, and a low-sodium version of the can of chicken stock, for example, may both include many of the same graphical elements—such as a color image of a steaming bowl of broth—and differ only by a "LOW SODIUM" banner on the latter product (and different ingredient lists). In raster-based watermarking the steaming bowl of broth image on the former product label may be watermarked with a payload identifying that product, and that image may be later re-used when the graphic artist, or another artist, is composing artwork for the latter product—unaware or forgetting that the raster image file is indelibly marked with the GTIN of the former product. This can lead to no end of confusion. By the present technology, in contrast, the artwork layers are not altered. They can be freely swapped among brandmates as before—without risk that any has been irreversibly encoded with a GTIN that may be inappropriate for the later use.

Although not belabored, it will be understood that one application of the present technology is to mark packaging for consumer packaged goods, to speed checkout. At a point of sale (POS) station, an imaging system (sometimes termed a scanner) captures a frame of data depicting the packaging. The watermark information included in the package artwork is decoded by a processor in the imaging system, and payload data is output. This payload data commonly comprises a GTIN, which may comprise a string of decimal digits (e.g., 016000123151). This number is used to query a store database, to retrieve a name and price of a corresponding retail product (e.g., Honey Nut Cheerios 19.5 oz box, $3.64). This retrieved information is added to a checkout tally for a shopper, and is typically printed on a register tape by the POS station. After all items presented by the shopper for checkout have been tallied, the shopper presents a bank or credit card, and the total fee due from the tally is transferred from the shopper's account to a store account.

The payload information with which a package is encoded may include information in addition to a GTIN, such as one or more GS1 Application Identifiers. Additional such information is detailed in patent publication 20190385034.

(Encoded data on consumer packaged goods can be used for purposes other than checkout. For example, it can be used for consumer engagement, to deliver container recycling information, for product authentication and lot code tracing, etc.)

The watermarks illustrated in the drawings can be decoded by the Digimarc Discover app, available in the Apple and Android app stores.

It will be recognized that vector artwork has been watermarked in the prior art not by adding one or more separate layers of watermark signal patterns as detailed herein, but rather by changing existing elements of the artwork, or parameters characterizing their appearance. For example, U.S. Pat. No. 5,629,770 teaches that text can be watermarked to convey a hidden payload by subtly shifting the spacings of words or lines of text. Relatedly, patent publication 20040001606 teaches a watermark font that includes multiple different, but visibly-similar representations for each character, e.g., respectively associated with different message bits (e.g., 0 or 1). An input text document is altered by replacing original text characters with different ones of these corresponding character representations to encode a desired message. U.S. Pat. No. 6,449,377 teaches that lines and other elements in artwork patterns can be shifted in position, or modulated in width, to convey bits of watermark data.

In contrast, embodiments of the present technology effect watermark encoding by adding one or more layers to a vector file, while leaving pre-existing layers that define the visible appearance of the rendered file (e.g., defining lines, characters, etc.) undisturbed.

It will be recognized that software instructions can define a scripted sequence of operations that take, as input, host artwork and desired payload data, and produce an SVG output file that includes the layers shown in the detailed embodiments.

Just as image content can be marked by the detailed arrangements, audio content can be marked by analogous methods. Instructions defining audio features can be rendered in overlaid fashion with host audio—supplanting or contributing to elements of the host audio, to effect embedding of auxiliary data.

It should be understood that the present technology builds on applicant's earlier watermark-related work, e.g., as detailed in the earlier-cited patent documents as well as in patent documents U.S. Pat. Nos. 6,590,996, 6,754,377, 7,027,614, 7,142,691, 7,738,673, 7,991,182, 9,449,357, 10,356,274 and 20170024840, and pending application Ser. No. 16/405,621, filed May 7, 2019, and 62/989,496, filed Mar. 13, 2020, and can be used in conjunction therewith.

This specification has discussed several different embodiments. It should be understood that the methods, elements and concepts detailed in connection with one embodiment can be combined with the methods, elements and concepts detailed in connection with other embodiments. While some such arrangements have been particularly described, some have not—due to the number of permutations and combinations. Applicant similarly recognizes and intends that the methods, elements and concepts of this specification can be combined, substituted and interchanged—not just among and between themselves, but also with those known from the cited prior art. Moreover, it will be recognized that the detailed technology can be included with other technologies—current and upcoming—to advantageous effect. Implementation of such combinations is straightforward to the artisan from the teachings provided in this disclosure.

While this disclosure has detailed particular ordering of acts and particular combinations of elements, it will be recognized that other contemplated methods may re-order acts (possibly omitting some and adding others), and other contemplated combinations may omit some elements and add others, etc.

Although disclosed as complete systems, sub-combinations of the detailed arrangements are also separately contemplated (e.g., omitting various of the features of a complete system).

While certain aspects of the technology have been described by reference to illustrative methods, it will be recognized that apparatuses configured to perform the acts of such methods are also contemplated as part of Applicant's inventive work. Likewise, other aspects have been described by reference to illustrative apparatus, and the methodology performed by such apparatus is likewise within the scope of the present technology. Still further, tangible computer readable media containing instructions for configuring a processor or other programmable system to perform such methods is also expressly contemplated.

The methods, processes, and systems described above may be implemented in hardware, software or a combination of hardware and software. For example, the processing operations for generating the watermark array pattern and for producing the vector graphics instructions are implemented as instructions stored in a memory and executed in a programmable computer (including both software and firmware instructions). Alternatively the operations are implemented as digital logic circuitry in a special purpose digital circuit, or combination of instructions executed in one or more processors and digital logic circuit modules. The methods and processes described above may be implemented in programs executed from a system's memory (a computer readable medium, such as an electronic, optical or magnetic storage device).

To provide a comprehensive disclosure, while complying with the Patent Act's requirement of conciseness, Applicant incorporates-by-reference each of the documents referenced herein. (Such materials are incorporated in their entireties, even if cited above in connection with specific of their teachings.) These references disclose technologies and teachings that Applicant intends be incorporated into the arrangements detailed herein, and into which the technologies and teachings presently-detailed be incorporated.

Also attached as an appendix to incorporated application 62/869,509 is an introductory tutorial to SVG by Joni Trythall, entitled Pocket Guide to Writing SVG.

In view of the wide variety of embodiments to which the principles and features discussed above can be applied, it should be apparent that the detailed embodiments are illustrative only, and should not be taken as limiting the scope of the invention.

The invention claimed is:

1. A data structure stored in a non-transitory tangible medium, comprising a vector graphics file including plural layers, wherein:
a first of said plural layers defines an artwork;
a second of said plural layers comprises vector graphics drawing instructions that define an array of marks to be overlaid on said artwork for rendering, to encode a message pattern signal in the rendered artwork, wherein the message pattern signal includes several elements, with each of the elements being spatially associated with a corresponding location within the artwork, including a first element spatially associated with a first location and a second element spatially associated with a second location; and
a third of said plural layers defining color tweak data, the third of said plural layers defining corresponding color tweak data for the several elements, including first color tweak data for the first element and second color tweak data for the second element;
wherein the first color tweak data and the second color tweak data are different, and are derived, at least in part, from colors of the artwork at the first location and at the second location.

2. The data structure of claim 1 in which the message pattern signal represents a plural-bit payload, that when decoded by a watermark decoder from the data structure or from a rendered counterpart thereto, causes a hardware system, of which the watermark decoder forms a part, to: (a) perform a database lookup to determine a name and price for an item corresponding to the plural-bit payload, (b) add said name and said price to a checkout tally for a shopper, and (c) charge the shopper for a total amount due and/or printing said name and said price on a register tape.

3. The data structure of claim 1 wherein the message pattern signal represents a plural-bit payload that includes a product identifier for a retail product, wherein said vector graphics drawing instructions enable an imager-equipped point of sale system to decode the plural-bit payload, and determine therefrom a price to charge a shopper for the retail product.

4. The data structure of claim 1 wherein the array of marks comprises a first set of vector graphics primitives that are defined, by said vector graphics drawing instructions, to have a first fill color.

5. The data structure of claim 4 the array of marks comprises a second set of vector graphics primitives that are defined, by said vector graphics drawing instructions, to have a second fill color different than the first fill color.

6. The data structure of claim 1 wherein the array of marks comprises two or more vector graphics primitives that each has a different fill color.

7. The data structure of claim 1 wherein the array of marks comprises three or more vector graphics primitives that each has a different fill color.

8. The data structure of claim 1 wherein the array of marks comprises two or more vector graphics primitives that each has a different size.

9. The data structure of claim 1 wherein the array of marks comprises three or more vector graphics primitives that each has a different size.

10. The data structure of claim 1 wherein the artwork comprises color artwork, and the first color tweak data and the second color tweak data are different, based at least in part on a color of the color artwork at the first location and at the second location.

11. The data structure of claim 1 in which:
the message pattern signal represents a plural-bit payload;
the plural layers jointly define artwork in which the plural-bit payload is encoded; and
a layered file structure of said plural layers permits the plural-bit payload to be changed by changing the second of said plural layers, without changing the third of said plural layers.

12. The data structure of claim 11 in which the layered file structure permits the plural-bit payload to be changed by changing the second of said plural layers, without changing any other layer of said data structure.

13. A non-transitory computer readable medium comprising instructions stored thereon that, when executed by one or more processors, cause said one or more processors of a computer system, cause the computer system to perform operations comprising:
 access a vector graphics file including plural layers, wherein: a first of said plural layers defines an artwork; a second of said plural layers comprises vector graphics drawing instructions that define an array of marks to be overlaid on the artwork for rendering, to encode a message pattern signal in the rendered artwork, wherein the message pattern signal includes several elements, with each of the elements being spatially associated with a corresponding location within the artwork, including a first element spatially associated with a first location and a second element spatially associated with a second location, and a third of said plural layers defining color tweak data, the third of said plural layers defining corresponding color tweak data for the several elements, including first color tweak data for the first element and second color tweak data for the second element, wherein the first color tweak data and the second color tweak data are different, and are derived, at least in part, from colors of the artwork at the first location and at the second location; and
 executing the vector graphics drawing instructions such that the array of marks is overlaid on the artwork for rendering.

14. The non-transitory computer readable medium of claim 13 in which the message pattern signal represents a plural-bit payload, when decoded by a watermark decoder from a rendered counterpart to the artwork including the overlaid array of marks, causes a hardware system, of which the watermark decoder forms a part, to: (a) perform a database lookup to determine a name and price for an item corresponding to the plural-bit payload, (b) add said name and said price to a checkout tally for a shopper, and (c) charge the shopper for a total amount due and/or printing said name and said price on a register tape.

15. The non-transitory computer readable medium of claim 13 wherein the message pattern signal represents a plural-bit payload that includes a product identifier for a retail product, wherein said vector graphics drawing instructions enable an imager-equipped point of sale system to decode the plural-bit payload, and determine therefrom a price to charge a shopper for the retail product.

16. The non-transitory computer readable medium of claim 13 wherein the array of marks comprises a first set of vector graphics primitives that are defined, by said vector graphics drawing instructions, to have a first fill color.

17. The data structure of claim 16 the array of marks comprises a second set of vector graphics primitives that are defined, by said vector graphics drawing instructions, to have a second fill color different than the first fill color.

18. The non-transitory computer readable medium of claim 13 wherein the array of marks comprises two or more vector graphics primitives that each has a different fill color.

19. The non-transitory computer readable medium of claim 13 wherein the array of marks comprises two or more vector graphics primitives that each has a different size.

20. The non-transitory computer readable medium of claim 13 wherein the artwork comprises color artwork, and the first color tweak and the second color tweak data are different, based at least in part on a color of the color artwork at the first location and at the second location.

21. The non-transitory computer readable medium of claim 13 in which:
 the message pattern signal represents a plural-bit payload;
 the plural layers jointly define artwork in which the plural-bit payload is encoded; and
 a layered file structure of said plural layers permits the plural-bit payload to be changed by changing the second of said plural layers, without changing the third of said plural layers.

22. The non-transitory computer readable medium of claim 21 in which the layered file structure permits the plural-bit payload to be changed by changing the second of the plural layers, without changing any other layer.

23. A method comprising:
 obtaining a first layer for a vector graphics file, the first layer defining artwork;
 providing a second layer for the vector graphics file, the second layer comprising vector graphics drawing instructions that define an array of marks to be overlaid on the artwork for rendering, to encode a message pattern signal in the rendered artwork, wherein the message pattern signal includes several elements, with each of the elements being spatially associated with a corresponding location within the artwork, including a first element spatially associated with a first location and a second element spatially associated with a second location; and
 defining a third layer for the vector graphics file, the third layer defining color tweak data, the third layer defining corresponding color tweak data for the several elements, including first color tweak data for the first element and second color tweak data for the second element;
 wherein the first color tweak data and the second color tweak data are different, and are derived, at least in part, from colors of the artwork at the first location and at the second location,
 and wherein the first layer, the second layer and the third layer comprise a layered file structure within the vector graphics file.

24. The method of claim 23 in which the message pattern signal represents a plural-bit payload, that when decoded by a watermark decoder from the data structure or from a rendered counterpart thereto, causes a hardware system, of which the watermark decoder forms a part, to: (a) perform a database lookup to determine a name and price for an item corresponding to the plural-bit payload, (b) add said name and said price to a checkout tally for a shopper, and (c) charge the shopper for a total amount due and/or printing said name and said price on a register tape.

25. The method of claim 23 wherein the artwork comprises color artwork, and the first color tweak data and the second color tweak data are different, based at least in part on a color of the color artwork at the first location and at the second location.

26. The method of claim 23 in which the layered file structure permits the plural-bit payload to be changed by changing the second layer, without changing any other layer of the layered file structure.

* * * * *